United States Patent [19]

Rodgers et al.

[11] Patent Number: 4,672,154
[45] Date of Patent: Jun. 9, 1987

[54] LOW POWER, HIGH RESOLUTION DIGITIZING SYSTEM WITH CORDLESS PEN/MOUSE

[75] Inventors: James L. Rodgers; Charles A. Waterbury, both of Mesa, Ariz.

[73] Assignee: Kurta Corporation, Phoenix, Ariz.

[21] Appl. No.: 719,351

[22] Filed: Apr. 3, 1985

[51] Int. Cl.⁴ ............................................. G08C 21/00
[52] U.S. Cl. .................................................... 178/19
[58] Field of Search ........................... 178/18, 19, 20; 340/365 C, 365 S, 365 R; 235/451

[56] References Cited

U.S. PATENT DOCUMENTS 4,034,155 7/1977 Muller et al. ........................ 178/19
4,158,747 6/1979 Muller et al. ........................ 178/19

*Primary Examiner*—Stafford D. Schreyer
*Attorney, Agent, or Firm*—Cahill, Sutton & Thomas

[57] ABSTRACT

A cordless pen emits a directional electric field from the tip of a conductive pen cartridge. The pen tip is capacitively coupled to embedded major X and major Y conductors in a digitizer tablet, which are scanned to determine which three X conductors and which three Y conductors have the greatest resulting signal levels. A microprocessor calculates the precise pen location from the three largest X signals and the three largest Y signals. A resistive path to ground is provided for each X and Y conductor. A plurality of minor conductors are disposed between each pair of X and Y conductors. A resistive divider circuit linearly distributes the voltage across the pair of conductors among the minor conductors therebetween, and improves the capacitively coupled signal levels and also "localizes" noise signals. The frequency of the pen signal is modulated by several pen switches. Circuitry in the digitizing tablet discriminates the pen frequency to decode the commands represented by switch closures between data scanning operations. In one embodiment of the invention a keyboard is placed on the digitizer tablet. The keyboard includes a groud plane through which a plurality of conductive tips actuated by keys extend to capacitively couple an electrical signal to embedded X and Y conductors. The microprocessor interprets the scanned data to determine the identity of each depressed key.

38 Claims, 15 Drawing Figures

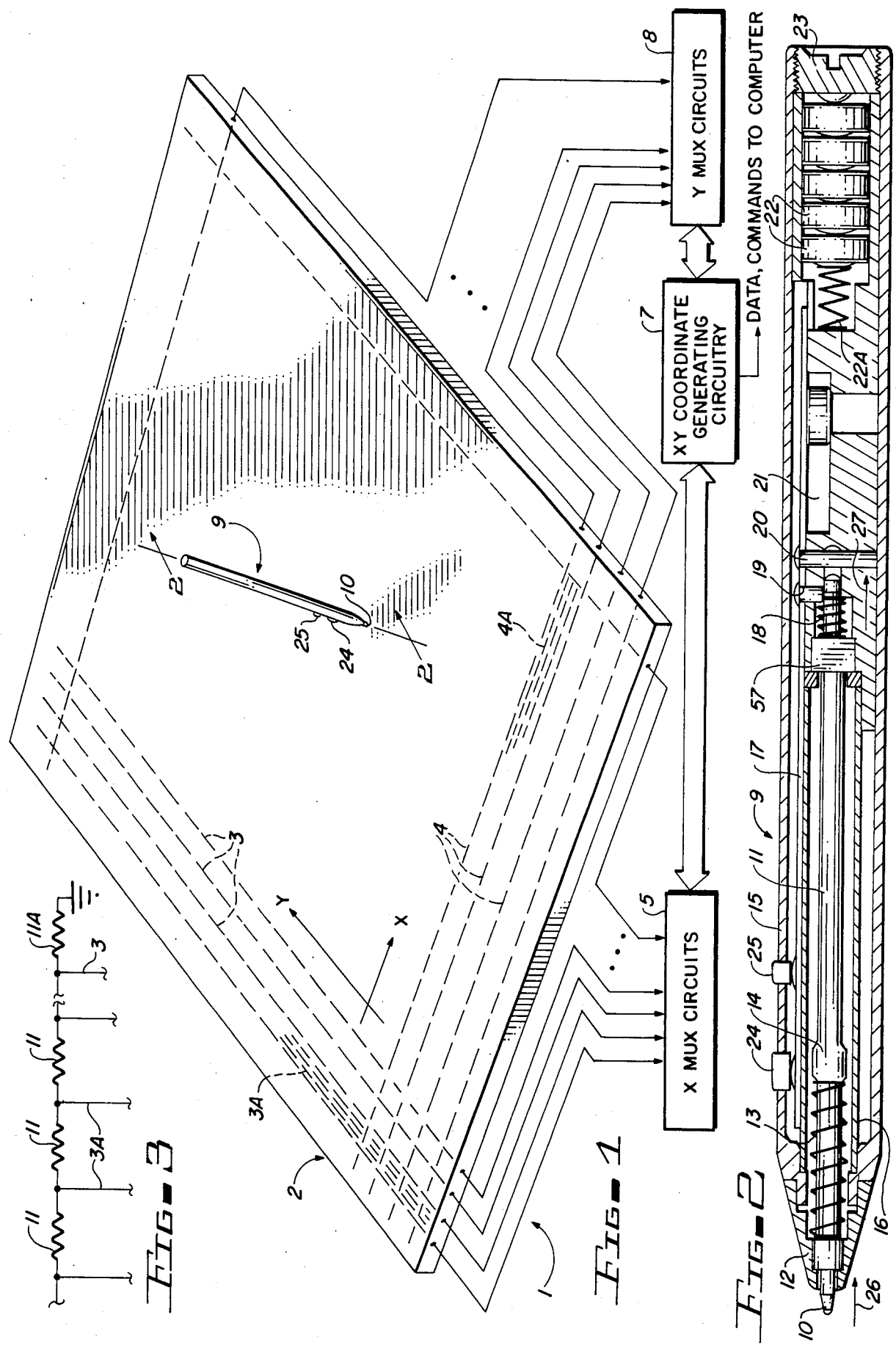

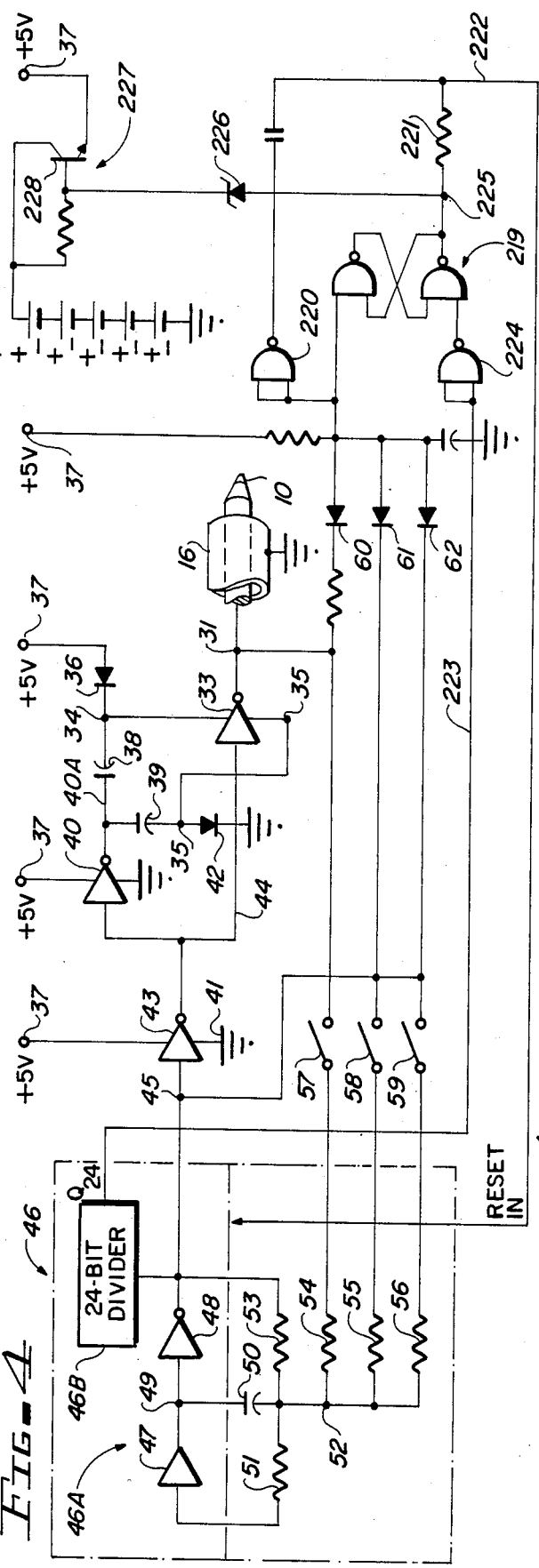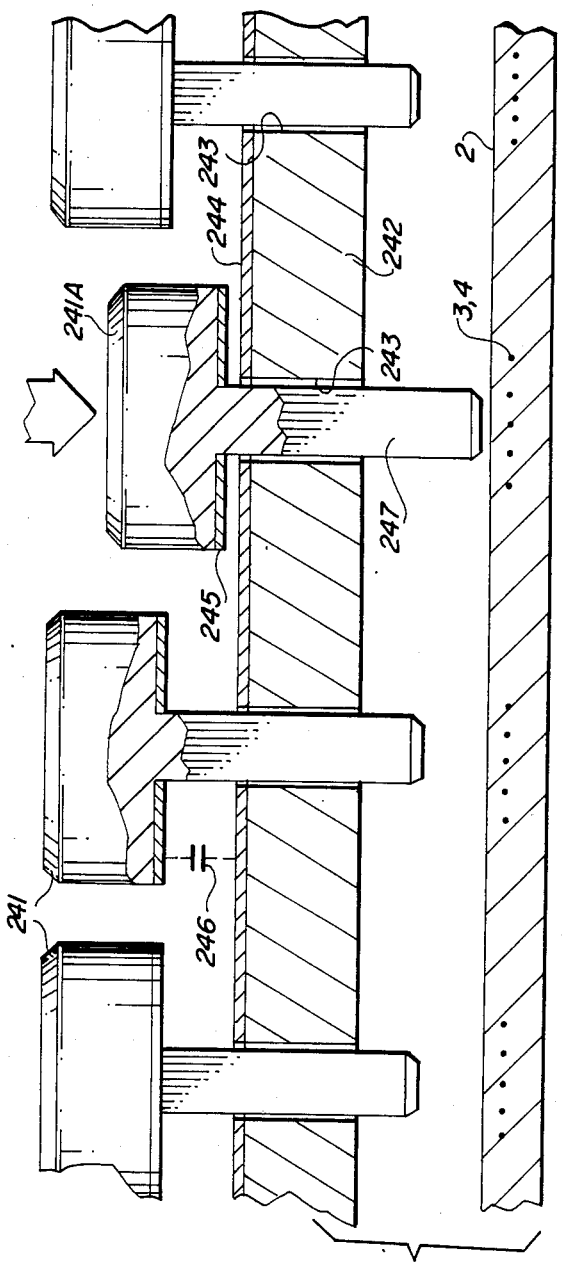
FIG-8
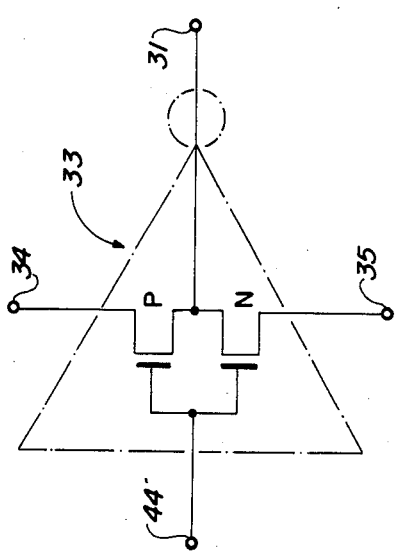
FIG-5

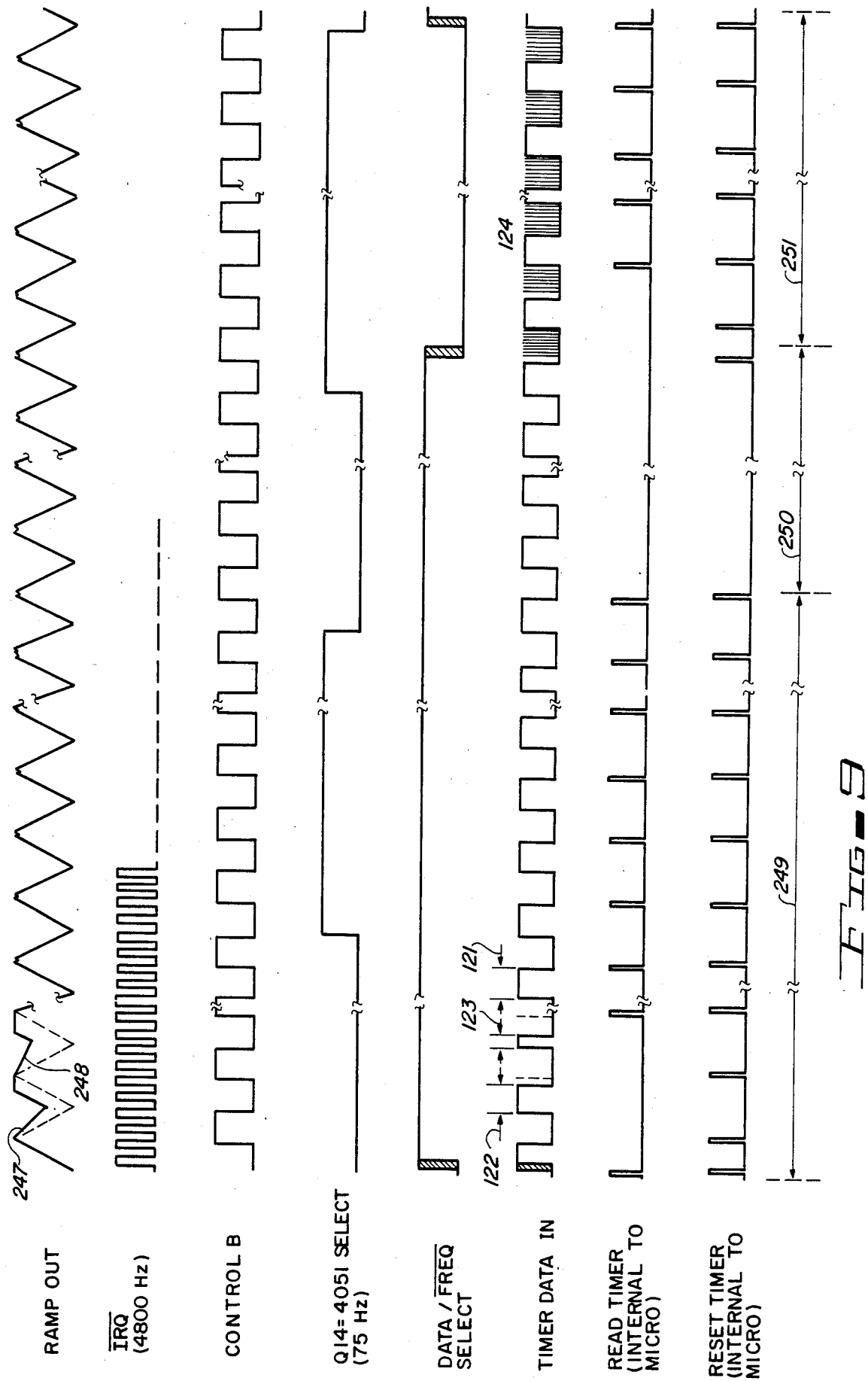

LOW POWER, HIGH RESOLUTION DIGITIZING SYSTEM WITH CORDLESS PEN/MOUSE

BACKGROUND OF THE INVENTION

The invention relates to digitizing apparatus, especially digitizing apparatus including a tablet with embedded X and Y conductors and a pen, cursor, or other transducer having a conductive stylus or tip that transmits electric signals that are capactively coupled to the embedded conductors in order to produce signal levels in the embedded conductors indicative of the coordinates of the stylus; the invention also relates to a computer input device of a type commonly referred to as a "mouse", and more particularly to a low cost, low power digitizing system including a cordless pen/mouse or a cordless keyboard.

Electronic digitizers which include a horizontal "tablet" having a grid of spaced X and Y conductors embedded beneath a digitizing surface of the tablet, and also a "pen" with a writing tip or stylus that can be lowered onto the digitizing surface, are well known. Some devices of this type are based upon electrostatic, or capacitive, coupling between the conductive stylus or cursor and the digitizing surface. Other systems rely on inductive, or electromagnetic, coupling between the digitizing surface and the pen or cursor also have been utilized. The two basically different design approaches have both been used, to meet different objectives. Systems which use inductive coupling between the pen and the digitizing surface typically must use ten to one hundred times more power than is the case if capacitive coupling approaches are used, and are not suitable for systems in which very low power dissipation is a major objective. U.S. Pat. Nos. 3,444,465, 3,767,858, 3,851,097, 4,034,155, 4,158,747, 4,227,044, 4,492,819, 4,451,698, and 4,491,688 perhaps are generally illustrative of the state of the art.

Presently known systems typically utilize a high level of power, and are characterized by large amplitude pen or grid signals which couple the digitizing surface to the cursor in order to achieve adequate reliability in the presence of relatively high electrical noise levels. Although a cordless cursor device, such as the one disclosed in U.S. Pat. No. 4,451,698, has been proposed, no cordless digitizer stylus structure has been utilized in a low power, low cost digitizing system, especially one of the type utilizing electrostatic coupling between the stylus and the digitizing surface. This is probably the case because of the unacceptably high weight of a self-contained battery power supply, and also because of the absence of a good electrical ground. A good electrical ground ordinarily would be necessary in a system that utilizes electrostatic coupling. The device disclosed in above-mentioned U.S. Pat. No. 4,451,698 is based upon inductive coupling between the cordless cursor and the digitizing surface, and uses much higher signal levels, and dissipates much more power than would be dissipated in a system using electrostatic or capacitive coupling between the pen and the digitizer surface.

There is an unmet need for a low cost, high resolution digitizing device utilizing a stylus which is cordless, and thereby more convenient to use, than one having an electrical cable connecting it to the digitizing tablet, and also having good noise immunity to normally present levels of ambient noise, and also having the capability to function as a mouse as well as a digitizing device.

SUMMARY OF THE INVENTION

It is an object of the invention to provide a digitizing device including a cordless electrostatic stylus or cursor that is capacitively coupled to a digitizer surface.

It is another object of the invention to provide a cordless electrostatic digitizer stylus or cursor that also is capable of transmitting commands to a digitizer surface, which command signals are decoded and presented in a suitable format to a computing device.

It is another object of the invention to provide an inexpensive digitizing system that includes a cordless stylus or cursor, and which is operable at far lower power levels than any prior digitizing system.

It is another object of the invention to provide a computer input device that can function as a keyboard, a digitizer, or a mouse.

Briefly described, and in accordance with one embodiment thereof, the invention provides a digitizing system including a cordless pen containing an oscillator that generates a signal that is applied to a conductive stylus which is surrounded by a relatively massive conductive shield. The shield has a large physical size that enables it to function as a good virtual ground and to minimize capacitive coupling with the stylus. The relative massiveness of the shield causes it to have much greater stray capacitance than the stylus. This large stray capacitance, together with the small capacitive coupling to the stylus, results in the effective virtual ground and highly directional capacitive coupling from the stylus tip to X and Y conductors of a digitizer tablet. Several pen switches, one actuated by pressing the pen tip against a surface and the others actuated by depressing buttons on the pen, change the oscillator frequency to produce frequency changes that represent a pen down condition or "mouse" commands. A voltage booster circuit including two integrated circuit CMOS inverters and a pair of output capacitors and clamping diodes alternately boost high and low levels of the output of the first inverter and apply them to the power supply terminals of the second CMOS inverter, which then provides a boosted output signal to the conductive stylus. An automatic time out counter that is reset in response to the pen switches to time out after several minutes and effectively disconnects the batteries if the pen is not being used.

The digitizer tablet includes a plurality of substantially spaced major X conductors and major Y conductors beneath the digitizing surface. Between each adjacent pair of major X conductors there are a number of precisely spaced minor X conductors. The voltage difference between the adjacent major X conductors is linearly distributed among the minor X conductors by a resistive voltage divider. Similarly, the voltage difference between two adjacent major Y conductors is linearly distributed between a number of precisely spaced minor Y conductors therebetween. Each major X and major Y conductor is coupled by a resistor to ground. This arrangement of minor grid conductors improves the capacitive coupling to the pen stylus, distributes the signal between major lines linearly and increases the signal-to-noise ratio. A microprocessor controlled scanning system sequentially monitors or "scans" the major X conductors and the major Y conductors by sequentially multiplexing the signal levels thereon through suitable amplifying and filtering circuitry. The amplified output is integrated by a dual-slope integrating circuit and then is converted to a digital output signal, the pulse widths of which represent the pen signal levels coupled onto the major X conductors and major Y conductors. The output pulses are fed into the serial input of a microcomputer chip which measures and stores the output pulse widths during a data scanning operation. Between data scanning operations the microprocessor measures the frequencies of the signals coupled to one of the Y conductors from the pen stylus to determine the frequencies thereof and then decodes the states of the three pen switches.

The microprocessor executes a routine that evaluates the digital data representing the signal amplitudes on the major X conductors, determines the three successive X conductors having the largest signals and the three successive Y conductors having the largest signals in order to roughly determine the X and Y coordinates of the stylus. The microcomputer then executes a routine that inserts the three maximum X signal amplitudes and the three maximum Y signal amplitudes into empirically obtained formulas that precisely extrapolate the precise values of the X and Y coordinates of the present pen position.

In one embodiment of the invention, a separate cordless keyboard includes a ground plane that is aligned with and placed on the digitizer tablet. A plurality of depressable keys are provided on the ground plane. Conductors are provided for routing an oscillator signal to each of the depressable keys, so that capacitive coupling between each key and the oscillator signal is greatly increased when that key is depressed. Each key includes a conductive tip that extends through the ground plane nearly to a point on the digitizer surface when that key is depressed, thereby maximizing coupling of the oscillator signal to the surface of the digitizer tablet. The above-described scanning operations are performed by the circuitry in the digitizer tablet to produce the coordinates of the depressed keys. The resulting data produced by the microprocessor in the digitizer tablet then is output to a separate computer, which determines the identity of the depressed key from its X and Y coordinates. Signal producing indicia on the bottom surface of the ground plate are detected by the scanning operation and are evaluated to determine the alignment of the ground plate with the digitizer tablet and to identify the type of the keyboard so that an external computer can select a "menu" that corresponds to the type of keyboard. The depressed key coordinates then are compared to the selected menu to identify the character represented by the depressed key.

BRIEF DESCRIPTION OF THE DRAWINGS

FIG. 1 is a perspective diagram illustrating the digitizer system and cordless pen of the present invention.

FIG. 2 is a section view taken along section line 2—2 of FIG. 1.

FIG. 3 is an enlarged view of part of FIG. 1 usful in describing the major and minor grid conductors.

FIG. 4 is a schematic circuit diagram illustrating the circuitry contained in the cordless pen of FIG. 1.

FIG. 5 is a schematic circuit diagram illustrating the basic structure of the CMOS inverters of FIG. 4.

FIG. 8 is a partial section view of a cordless keyboard of FIG. 7.

FIG. 9 is a diagram showing certain waveforms that are useful in describing the operation of the circuit of FIG. 6A.

DESCRIPTION OF THE INVENTION

Figure 6A:
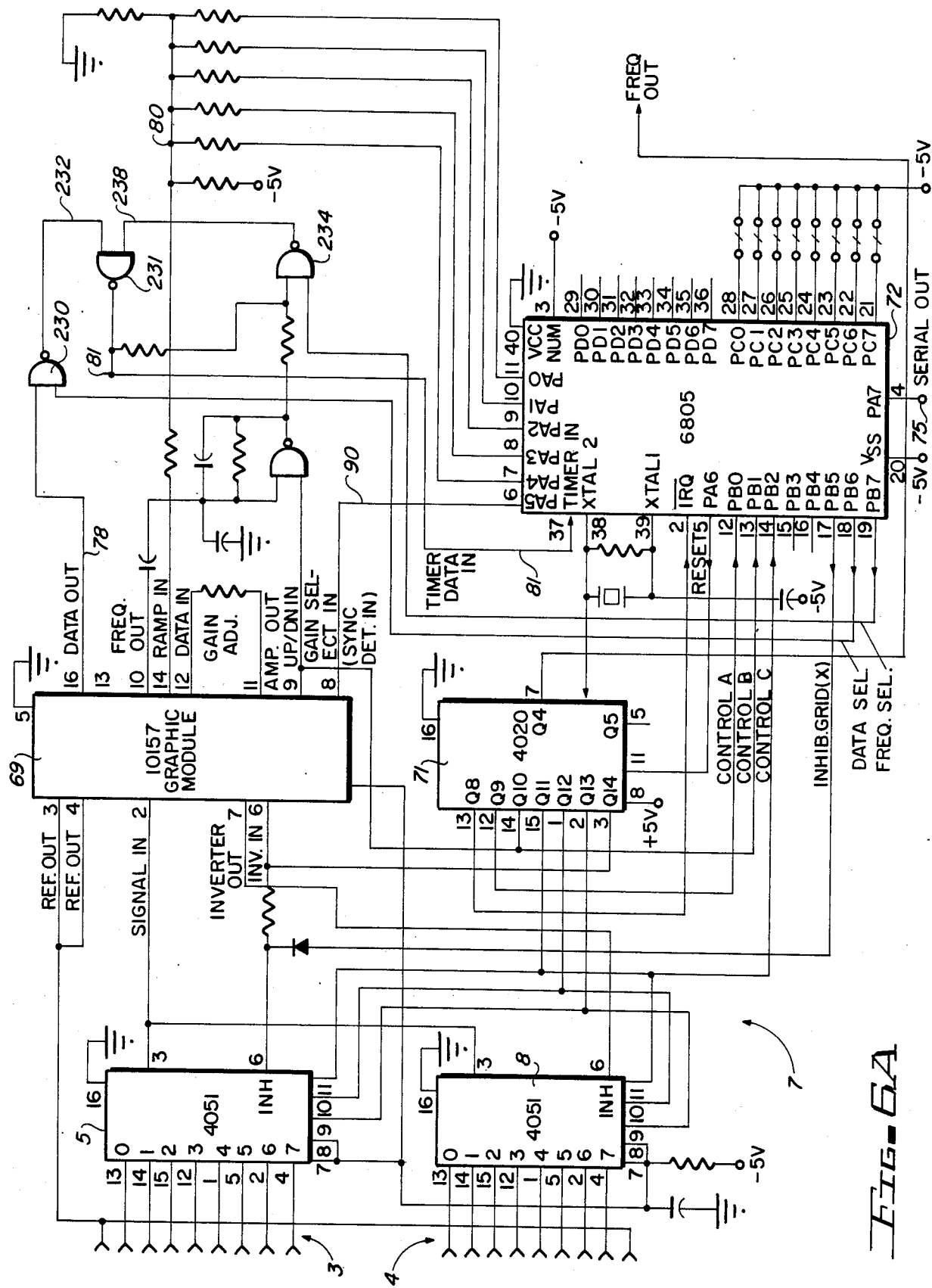
FIG. 6A is a logic diagram of the circuitry contained in the digitizer tablet shown in FIG. 1.

Referring now to the drawings, particularly FIG. 1, digitizing system 1 includes a digitizer tablet 2 having a plurality of major X conductors 3 embedded therein very slightly below the upper "digitizing" surface of tablet 2, the upper surface being composed of suitable dielectric material. A plurality of major Y conductors 4 also are embedded slightly beneath the top surface. In the presently described embodiment of the invention, there are nine major X conductors 3, each spaced 1.28 inches apart. Each of the major X conductors 3 is connected to a separate input of an X multiplexer circuit 5, which, in response to scanning circuitry in block 7, sequentially couples the voltage on the major X conductors 3 to the input of amplifying and filtering circuitry 7 that determines the coordinates of the tip 10 of a cordless pen 9 and also decodes frequency modulated command signals sent from pen 9. Between each pair of the major X conductors 3 there are five minor X conductors 3A, spaced about 0.2 inches apart. The minor X conductors are not, however, fed into the multiplexer circuit 5. Each of the minor X conductors 3A is coupled to the adjacent one by a high resistance resistor 11. The minor X conductors closest to the adjacent major X conductors also are connected by a resistor 11 to such adjacent major X conductors. Each major X conductor is coupled to ground by a resistor 11A. Thus, the voltage difference between any two adjacent major X conductors is linearly distributed among the minor X conductors by the above-described resistive voltage divider network. An exemplary value of the resistors 11 is about five kilohms, and an exemplary value of each resistor 11A is about twelve kilohms.

The structure of the major Y conductors 4, the minor Y conductors 4A, and the Y multiplexer circuit 8 is essentially indentical to that described above. In the presently described embodiment of the invention, there are seven major Y conductors. The Y multiplexer circuit 8 sequentially applies signal levels capacitively coupled to the Y conductors from the stylus tip 10 of pen 9, which acts as a transmitter. The seven major Y conductors are spaced 1.28 inches apart. There are five minor Y conductors 4A disposed between each adjacent pair of major Y conductors 4. Again, a resistive voltage division network linearly distributes the voltage difference between two adjacent Y conductors 4 evenly among the five minor Y conductors 4A positioned therebetween. Each major Y conductor is resistively coupled to ground.

The general system of X and Y conductors described above is described in further detail in commonly assigned pending patent application Ser. No. 06/631,146, U.S. Pat. No. 4,616,106, entitled "GRAPHIC TABLET AND METHOD", by Fowler, et al., filed July 16, 1984, and incorporated herein by reference.

As previously mentioned, cordless pen 9 (FIG. 2) has a conductive cartridge tip 10 which is capacitively coupled to the grid conductors. Pen 9 includes an internal pen switch 57 that is actuated when stylus tip 10 is pressed against the digitizer surface. Pen 9 also includes two manually actuated buttons 24 and 25 which can be utilized to send "mouse" or tablet "cursor" commands via digitizer tablet 2 and coordinate generating circuitry 7 to a buffer that can be read by a separate computer, such as an IBM personal computer. Pen stylus 10 is simply an ordinary, commercially available ball point refill cartridge 11 having a barrel that extends through an opening in an end piece 12 of the insulative housing 15 of digitizer pen 9. A compressive spring 13 disposed between an inner shoulder of end piece 12 and an enlarged section 14 of ball point cartridge 11 urges cartridge 11 toward the right in FIG. 2.

A thin walled tubular metal shield 16 surrounds cartridge 11 and functions as a virtual ground. The inside diameter of shield 16 is as large as practical in order to minimize capacitive coupling between the barrel of cartridge 11 and conductive tubular shield 16. An exemplary outside diameter of cartridge 11 is about 0.12 inches and an exemplary inside diameter of tubular shield 16 is about 0.22 inches. The writing tip 10 of cartridge 11 extends beyond the left end of tubular shield 16, and acts to directionally focus the electric field toward the embedded conductors in digitizer tablet 2 when the pen tip 10 is held on the surface of digitizer tablet 2.

The right end of pen cartridge 11 is connected to a pen switch assembly including a compressive spring 18 that electrically connects the pen cartridge 11 to a conductor 19 extending through a printed circuit board 17 to continuously connect the output of an oscillator circuit (described with reference to FIG. 4) to cartridge 11 and hence to tip 10. The right end of cartridge 11 actuates a pen switch 20, 57 (FIG. 2) when the tip 10 is pressed against a surface. Pressing tip 10 into end piece 12 in the direction of arrow 26 causes a plunger 57 to move in the direction of arrow 27, contacting a conductor 20 that extends through printed circuit board 17. This closes switch 20, 57 (FIG. 2). Closing of switch 57 (FIG. 4) boosts the frequency of the oscillator from a low idle frequency of approximately 42.5 kilohertz up to approximately 98 kilohertz, which is the desired frequency for the subsequently described scanning operations to determine the X and Y coordinates of pen tip 10. The lower idle frequency results in lower power dissipation, yet enables the X and Y coordinate generating circuitry 7 to determine roughly the position of the pen tip when it is within an inch or so above the surface of digitizer tablet 2.

Switch buttons 24 and 25 in FIG. 2, when depressed, respectively close switches 58 and 59 in FIG. 4 and change the oscillator frequency to different values, which then are decoded as mouse or cursor commands. Suitable conductors on printed circuit board 17 route the switch conductors back to the appropriate points of circuitry 30 of FIG. 4, some of which appears on printed circuit board 17. Other portions of the circuitry 30 are contained in the space 21 of FIG. 2.

The compression spring 18 urges the pen switch mechanism 57 and the ink cartridge 11 to the left more strongly than spring 13 urges it to the right, so that when the pen is lifted from the surface of digitizer tablet 2, the "pen down" switch 57 is opened, and the oscillator returns to the low idle frequency.

Five 1.5 volt batteries are stacked in a cylindrical compartment at the left end of pen 9. A spring 22A provides electrical connection from the positive battery electrode at the left end of the battery stack to the +5 volt conductor of the circuitry shown in FIG. 4, while a suitable contact on a screw-in plug 23 provides electrical connection to the ground conductor 41 in the circuit of FIG. 4.

Thus, the above-described digitizing pen and mouse device is completely self-contained, requiring no cord. Although this approach (without a "fixed" electrical ground for the pen circuitry) would normally be incompatible with transmission of very low level, low power electrostatic signals from pen tip 10 by capacitive coupling with grid conductors in the digitizer tablet, especially considering the rather high level of noise signals that ordinarily would be coupled to and induced in the embedded grid conductors. The present invention overcomes the lack of a "fixed" electrical ground in cordless pen 9 by provision of the tubular shield 16, by providing a structure in which the total stray capacitance associated with tubular shield 16 is at least ten times greater than the total stray capacitance associated with the pen tip 10.

The way in which tubular conductor 16 acts as a virtual ground is by providing a much larger capacitance than the pen tip capacitance, so that the voltage change produced in the shield capacitance by the oscillator output current is very small. This causes a much larger voltage change to be produced across the much smaller pen tip capacitance by the oscillator output current.

Other features, especially the provision of the above-described minor X conductors and minor Y conductors and the above-described resistive voltage divider networks provided therefor, further contribute to the workability of the cordless electrostatic pen structure of the present invention.

Next, the circuitry contained within cordless pen 9 is described with reference to FIG. 4. Pen circuitry 30 includes a oscillator/counter circuit 46, which contains an oscillator 46A including two CMOS buffer 47 and CMOS inverter 48. FIG. 5 shows a typical CMOS inverter. Oscillator/counter 46 can be implemented by means of a CMOS 4521 oscillator/counter integrated circuit. The output of CMOS buffer 47 is connected by conductor 49 to one electrode of capacitor 50 and to the input of CMOS inverter 48. The output of inverter 48 is connected by conductor 45 to a feedback resistor 53. Feedback resistor 53 is coupled by conductor 52 to the other terminal of capacitor 50. Another feedback resistor 51 is coupled between conductor 52 and the input of CMOS inverter 47. The above mentioned idle frequency of oscillator 46 is determined mainly by the time constant of capacitor 50 and resistor 53.

The output of inverter 48 is connected to the input of 24 stage binary counter 46B, the $Q_{24}$ output of which is connected to conductor 223.

Conductor 52 is connected by resistor 54 to one terminal of pen switch 57, the other terminal of which is coupled by a resistor to the cathode of diode 60 and to the barrel of pen cartridge 11 (FIG. 2) and hence to the pen tip 10. The idle frequency produced by oscillator 46A is coupled by conductor 45 to the input of a CMOS inverter 43, the output of which is inverted and boosted by a CMOS inverter 33, the output of which is also connected to pen cartridge 11 by conductor 31. Thus, it can be seen that any time oscillator 46A is oscillating, its output frequency will be applied to pen tip 10, regardless of whether any of the three switches 57, 58, and 59 is open or closed.

If pen switch 57 is closed, as a result of pressing pen tip 10 against the digitizing surface, resistor 54 is effectively connected in parallel with resistor 53, increasing the frequency of oscillator 46A from 42.5 kilohertz to approximately 98 kilohertz.

If button 24 is depressed, switch 58 will be closed, effectively connecting resistor 55 in parallel with resistor 53, and increasing the oscillation frequency from the idle frequency to approximately 77 kilohertz. Similarly, if button 25 of the pen 9 is pressed, switch 59 will be closed, in effect connecting resistor 56 in parallel with resistor 53. Thus, it can be seen that there are a total of eight different possible states of switches 57, 58, and 59 which produce different oscillation frequencies. These different frequencies can be discriminated by the circuitry in block 7 of FIG. 1 to represent different commands to an external computer that can be coupled to the digitizing system 1 of the present invention.

The voltage level provided on conductor 37 by the batteries 22 (FIG. 2) is inadequate to generate the constant level of the low frquency AC signal on pen tip 10 that would be desired, considering the level of noise immunity that is desirable. In order to boost the voltage level of the pen signal, which is "transmitted" or capacitively coupled to the X and Y grid conductors, to a higher level, voltage boosting circuitry including CMOS inverters 33, 40 and 43 is utilized. The output of inverter 43 is coupled by conductor 44 to one input of inverter 40, the two power supply terminals of which are connected to ground conductor 41 and to +5 volt conductor 37. The output of inverter 40 is applied to one terminal of each of capacitors 38 and 39. One terminal of capacitor 38 (conductor 34) is connected to the cathode of a diode 36, the anode of which is connected to the +5 volt conductor 37. The cathode of diode 36 is also connected to the positive power supply terminal of CMOS inverter 33. Similarly, the second terminal of capacitor 39 is connected to the anode of diode 42, the cathode of which is connected to ground conductor 41. The anode of diode 42 is also connected to the ground or negative power supply terminal of CMOS inverter 33. Then, whenever conductor 45 is at a high voltage level, conductor 34 will be held at a minimum voltage of at least one diode drop below the +5 volt level of conductor 37. Whenever the output of inverter 40 goes high, diode 36 will become reverse biased, and the voltage on conductor 34 will be boosted by an amount almost equal to the positive voltage transition of the output of inverter 40. This will occur at the same time that conductor 44 is undergoing a negative transition from +5 to ground, so the positive power supply terminal of CMOS inverter 33 will go to about 12 volts when conductor 31 is undergoing a positive transition. This enables inverter 33 to cause conductor 31 to rise to almost 12 volts.

Diode 42 clamps conductor 35 to one diode drop below ground when the output 40A of inverter 40 is high. Similarly, when conductor 40A is at approximately +5 volts, capacitor 39 charges up, as a result of conductor 35 being clamped to ground by diode 42. Then, when conductor 40A goes from approximately +5 volts to ground, conductor 35 is boosted in a negative-going direction to approximately −5 volts, which is applied to the negative power supply terminal of CMOS inverter 33 at the time that conductor 31 undergoes a negative transition. This allows inverter 33 to cause the negative transition of conductor to 31 go to approximately −5 volts.

Thus, the voltage boosting circuit 32 of FIG. 4 nearly triples the amplitude of the output signal produced on conductor 45 by oscillator 46A.

Returning to the portion of FIG. 4 associated with oscillator 46A and counter 46B, switches 58 and 59, corresponding to push button switches 24 and 25 on pen 9, are connected to conductor 45. The cathodes of diodes 61 and 62 also are connected to conductor 45. The Q24 output of 24 bit counter 46B is connected to the set input of an RS flip-flop 219 and also to an inverter 220. The output of inverter 220 is coupled by means of a capacitor to the Q output of flip-flop 219 by means of resistor 221 and also to the reset input of oscillator/counter 46 by conductor 222.

The counter portion 46B of oscillator/counter circuit 46 is a 24 stage binary counter that divides by factor of approximately 16,000,000. At the oscillator idle frequency of 42.5 kilohertz it takes counter 46B approximately three minutes to "time out", at which point the set input of flip-flop 219 is actuated in response to the Q24 output, which is applied to conductor 223, and inverted by means of inverter 224, the output of which is connected to the set input of RS flip-flop 219. This causes conductor 225 to go positive, completely shutting off low current zener diode 226, which causes the regular circuit 227 to produce a precise regulated voltage level of about +5 volts on conductor 37.

Regulator circuit 227 was found to be necessary because the battery voltages can vary by 20% over their lifetime. This is too large a variation to be acceptable for the accuracy of frequencies that need to be generated in the pen circuitry 30. Transistor 228 provides a regulated voltage level of about +5 volts on conductor 37. The resistive feedback to the base of the transistor 228 limits the current flowing through zener diode 226 to about 10% of the total current supplied to the pen circuitry. However, when flip-flop 219 is set as a result of the counter 46B timing out, the resulting low level on the anode of zener diode 226 would cause a continuous reverse current to flow through zener diode 226, greatly decreasing the battery life. Therefore, the flip-flop circuit 219 is necessary to eliminate this reverse current loss when the timer 46B runs out. This causes the voltage to rise in the battery voltage level. The current drain then is extremely small. When counter 46B "times out", it also, stops oscillator 46A, which further reduces the "standby" current drain.

In operation, actuation of any of the switches 57, 58, and 59 resets the oscillator/counter circuit 46. If, during use, the pen circuitry is turned off, the user merely has to tap the pen tip 10 against the digitizer surface or push either of the buttons 24 or 25 to again reset the oscillator counter circuit 46.

The above-described circuitry in FIG. 4 draws a battery current of only roughly 170 microamperes in the standby condition, wherein all of the pen switches are open, 450 microamperes when only pen down switch 57 is closed, and about 600 microamperes when all of the pen switches are closed. This leads to very long battery life, of the order of roughly 500 hours of average pen use.

Referring now to FIG. 6A, the major components of X, Y coordinate generating circuitry 7 of FIG. 1, X multiplexer circuit 5, and Y multiplexer circuit 8 are shown. Multiplexer circuits 5 and 8 are implemented by means of CMOS 4051 eight line analog multiplexer integrated circuits, which are widely available. Its analog inputs are connected to eight of the major X grid conductors 3. Similarly, seven major Y grid conductors 4 and the last major X grid conductor are connected to the analog inputs of multiplexer 8. The line selection inputs of multiplexers 5 and 8 are connected to the Q11, Q12, and Q13 outputs of a counter 71, which is implemented by means of an HC4020 integrated circuit CMOS counter. The selected analog input 3 or 4 is coupled to conductor 70, which produces the SIGNAL IN voltage that is applied to a "graphic module" circuit designated by reference numeral 69, and described in detail with reference to FIG. 6B. The X return and Y return lines are connected to another input of graphic module 69.

Briefly, graphic module 69 amplifies, deletes, and filters the very small SIGNAL IN voltage, integrates it by means of a dual slope integrater, and finally produces a digital DATA OUT signal on conductor 78. The pulse width of the DATA OUT pulse is inversely proportional to the amplitude of the SIGNAL IN voltage (as also explained subsequently with reference to the TIMER DATA IN waveform of FIG. 9).

If the state of an UP/DOWN IN signal applied to graphic module 69 by the Q10 output of counter 71 is a high level, FREQ OUT voltage is produced which is an amplified version of the SIGNAL IN voltage. FREQ OUT is used to enable the circuitry 7 to discriminate the frequency of the SIGNAL IN voltage produced in response to the pen signal during the "frequency scan" part of the system operation, subsequently described.

Coordinate generating circuitry 7 includes a microprocessor 72, which can be a Motorola 6805 microprocessor.

The input select inputs of analog multiplexers 5 and 8 are connected to Q11, Q12, and Q13 of counter 71. The PA6 port of microprocessor 72 is connected to the reset input of down counter 71.

The PB0, PB1, and PB2 ports of microprocessor 72 are programmed as inputs, and are connected to the Q9, Q10, and Q11 outputs, respectively, of counter 71. The signals on these ports are utilized to assure synchronization between counter 71 and microprocessor 72. This synchronization is checked and established in conjunction with block 152 of the interrupt subroutine subsequently explained with reference to FIG. 12.

An external crystal is connected to the crystal control inputs of microprocessor 72 in order to produce a 1,228,800 hertz clock signal. As those skilled in the art know, a Motorola 6805 microprocessor can receive serial data input pulses, and can automatically measure the pulse widths of such incoming pulses by internally ANDing the incoming data stream with an internal timer. The 6805 microprocessor can also count the number of pulses in the incoming data stream, and thereby determine the frequency of the incoming data stream. Both of these capabilities are used in the present system.

The PA0, PA1, PA2, PA3, and PA4 ports of microprocessor 72 are programmed as outputs, and are connected to various resistors as shown to allow microprocessor 72 to automatically adjust the offset control signal on conductor 80, and thereby alter the offset of the RAMP IN signal applied to graphic module 69, in accordance with the subsequently described subroutines executed by microprocessor 72. The PA5 port is programmed as an output and is connected to the GAIN SELECT input of graphic module 69 to allow microprocessor 72 to automatically adjust the gain (range) thereof, as subsequently explained.

Microprocessor 72 has its PA7 port programmed as a data output which, by means of conductor 75 produces a serial data output on conductor 75 that (1) represents the present coordinates of the tip 10 of cordless pen 9 on the surface of digitizer tablet 2, as a result of a data scan operation, or (2) produces data on conductor 75 that represents a "mouse" command decoded from the frequency of the pen as modulated in response to the various combinations of the pen switches 57, 58, and 59. The data on conductor 75 is loaded in serial format into an external parallel buffer (not shown), which then can be read by an external computer (not shown), such as an IBM personal computer.

The DATA OUT signal on conductor 78 is applied to one input of a two input NAND gate 230. The other input of NAND gate 230 is connected to the DATA SELECT output signal produced by the PB6 port of microprocessor 72, which is high during a data scan operation to "enable" the output of gate 230. During a data scan, the DATA OUT signal is inverted by NAND gate 230, and fed into one input of two input NAND gate 231. The other input of NAND gate 231 normally will be high during a data scan operation. Therefore, the signal on conductor 232 will be inverted again, reproducing the DATA OUT pulse on conductor 81, which is applied to the TIMER IN input of microprocessor 72.

However, if a frequency scan operation is occurring, the frequency select signal produced by the PB7 port of microprocessor 72 will be high, and the data select output will be low. This causes NAND gate 230 to be disabled, and two input NAND gate 234 to be enabled. Consequently, the FREQ OUT signal on conductor 235 is fed through two input NAND gate 236, which is enabled by the UP/DN IN signal on conductor 237 and is applied to the other input of NAND gate 234. Consequently, the FREQ OUT signal is reproduced on conductor 238, is fed through NAND gate 231, which is now enabled by a logical "one" level on conductor 232, and appears on conductor 81, and hence is applied to the TIMER/IN input of microprocessor 72, which then counts the number of pulses for a predetermined period of time to determine the present pen frequency.

When the DATA OUT pulse is being fed into the TIMER IN input of microprocessor 72, its pulse width is measured and stored, and represents the amplitude of the X or Y grid conductor presently being multiplexed into graphic module 69.

Figure 6B:
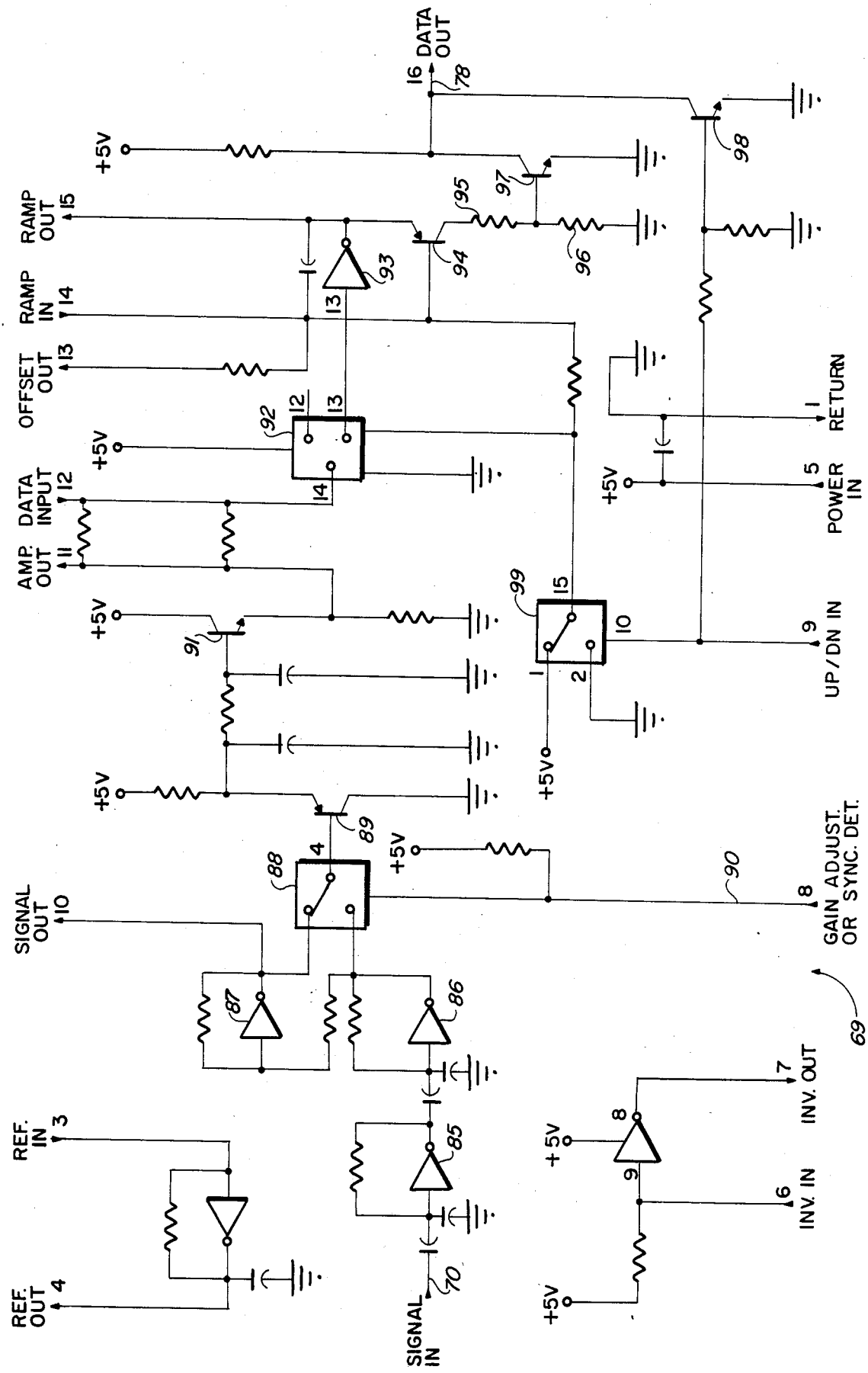
FIG. 6B is a circuit diagram of the graphic module 69 contained in FIG. 6A.

Although some of the various filters, bypass capacitors, and resistors shown in FIGS. 6A and 6B are not described in detail, those skilled in the art will easily be able to understand their functions and select appropriate values and/or select alternate conventional circuitry to perform the same amplifying, attenuating, by-passing, pull-up functions, etc.

Next, the graphic module circuit 69 of FIGS. 6A and 6B will be described in detail with reference to FIG. 6B. In FIG. 6B, SIGNAL IN (the scanned grid conductor analog signal multiplexed by multiplexer 5 or 8 to the input of graphic module 69) is capacitively coupled from conductor 70 to the input of CMOS inverter amplifier 85 to provide a first stage of amplification. The output of amplifier 85 is capacitively coupled to the input of a similar CMOS inverter amplifier 86, the output of which is connected to one input of an analog switch, which can be implemented by means of a CMOS 4053 integrated circuit. Depending on whether a GAIN SELBCT IN signal on conductor 90, produced by the PA output port of microprocessor 72, is a "1" or a "0", the gain by which the SIGNAL IN level is amplified can be selected to either include or omit CMOS inverter amplifier 87. The resulting amplified and filtered input signal then is applied to the base of a PNP emitter follower 89. The output of detector 89 is coupled to the input of an NPN detector 91, the output of which produces a DATA INPUT signal that is applied to an analog switch 92, which also can be implemented by means of a CMOS 4053 analog switch.

One output of analog switch 92 is inverted by CMOS inverter 93. The output of inverter 93 is applied to the emitter of PNP transistor 94. The base of PNP transistor 94 is connected to the RAMP IN signal conductor. The collector of PNP transistor 94 is connected to a resistive divider circuit including resistors 95 and 96, the junction between which is connected to the base of NPN output transistor 97. The emitter of NPN transistor 97 is connected to ground. The collector of NPN transistor 97 is connected by a pull-up resistor to the +5 volt power supply line, and is also connected to DATA OUT conductor 78.

Analog switch 99 is responsive to the UP/DN signal to "square up" or buffer the RAMP IN signal. The AMP. OUT and DATA INPUT signals of FIG. 6B are connected to a gain adjustment resistor.

Referring now to FIG. 9, the operation of the circuit of FIGS. 6A and 6B will be better understood by those skilled in the art by referring to the various waveforms shown in FIG. 9. The RAMP OUT waveform appears at the output of CMOS inverter 93 in FIG. 6B and on Pin 15 of graphic module 69 as shown in FIG. 6A. As previously mentioned, the circuitry including CMOS amplifier 93 functions as a dual-slope integrator. The positive and negative slopes of most of the peaks of the RAMP OUT signal in FIG. 9 correspond to zero values of SIGNAL IN. The slope indicated by reference numeral 247 corresponds to a medium amplitude of SIGNAL IN. Reference numeral 248 designates a shallower slope of the RAMP OUT signal corresponding to a relatively large amplitude of SIGNAL IN, indicating that the cordless pen tip 10 is close to the grid conductor. More detail on the structure and operation of a dual slope integrator, and conversion of analog grid conductor signals to digital numbers is set forth in commonly assigned U.S. Pat. No. 4,492,819 issued Jan. 8, 1985, entitled "GRAPHIC TABLET AND METHOD", by Rodgers et al., incorporated herein by reference.

The circuitry shown in FIG. 6B converts the RAMP OUT signal to the DATA OUT signal, which is combined with the FREQ OUT signal on pin 10 of graphic module 69 to produce the TIMER DATA IN signal on conductor 81, which then is applied to the TIMER IN input on pin 37 of microprocessor 72. During the grid conductor data scanning operations, the signal level information contained in the slopes of the RAMP OUT signal are converted to the signal level information in the pulse widths of the TIMER DATA IN waveform in FIG. 9. In FIG. 9, most of the pulse widths, such as 121, of the TIMER DATA IN waveform correspond to grid conductor signal levels of zero. The widths of the TIMER DATA IN pulses decrease as the grid conductor SIGNAL IN increases. Thus, the pulse width 122, which corresponds to the slope 247 of the RAMP OUT signal, is narrower than pulse width 121. Similarly, the pulse width 123, produced in response to slope 248 of the RAMP OUT signal, which in turn is produced by a relatively large amplitude of SIGNAL IN, is even narrower than pulse width 122, because it corresponds to a larger grid conductor signal level than pulse width 122.

The CONTROL B signal in FIG. 9 corresponds to the Q10 output of timer counter 71. This signal also produces the UP/DN IN signal applied to graphic module 69 to establish the leading edges of the DATA OUT signal on conductor 78 of FIG. 6B.

The Q14 waveform of FIG. 9 is the signal produced on the Q14 output of down counter 71. This output selects multiplexer 5 when at a low level, and causes multiplexer 8 to be selected when at a high level.

The DATA SELECT signal appears on the PB6 output port on pin 18 of microprocessor 72. When this signal is at a "1" it means that the scanning operation now being conducted is a data scan operation in which the signal levels of the 16 major grid conductors are multiplexed to the input of the graphic module 69 to produce the SIGNAL IN signal levels which are used to obtain the X and Y coordinates of the pen tip 10. When the DATA SELECT signal is a "zero," the graphic module and the circuitry in the upper right hand corner of FIG. 6A operates so that the SIGNAL IN signal is reproduced as the FREQ OUT signal on pin 10 of graphic module 69. This signal is gated onto the TIMER DATA IN conductor 81 and applied to the TIMER IN input of microprocessor 72, which then counts the number of such pulses to determine the pen frequency. Reference numeral 124 in FIG. 9 designates bursts of the FREQ OUT signal that appear on the TIMER DATA IN conductor 81 when the DATA SELECT signal is at a "zero", during a frequency scan operation.

The READ TIMER waveform of FIG. 9 simply indicates when the internal timer that measures the widths of the pulses such as 121, 122, and 123 is internally read in microprocessor 72. Each of the READ TIMER pulses occurs after the incoming data pulse has elapsed.

The RESET TIMER pulses in FIG. 9 are internally produced in 6805 microprocessor 72, and simply reset the internal timer thereof that automatically measures the widths of the pulses applied to the TIMER IN input of microprocessor 72.

In FIG. 9 the time interval designated by reference numeral 249 corresponds to the interval during which the data scan operations are being performed, wherein each of the 16 major grid conductors is multiplexed into the graphic module 69, a DATA OUT pulse is gated to the TIMER IN input of microprocessor 72, and microprocessor 72 is set to automatically measure the width of each of the data pulses, such as 121, 122, and 123. Reference numeral 250 designates the interval during which the first eight lines scanned during a frequency scanning operation are ignored. Only the signal from the Y line previously determined to have the greatest signal strength is utilized to determine the present pen frequency.

Reference numeral 251 designates the interval during which the second group of eight major grid conductors are scanned during the frequency scan operation. The internal timer of the 6805 microprocessor 72 is set to count the number of pulses received at the TIMER IN input of microprocessor 72 during a predetermined time interval, to thereby determine the frequency of the signal on each of the second group of eight conductors. The frequency of the particular Y conductor having the previous maximum signal level is the only one saved internally.

The specific operation of the above-described circuitry of FIGS. 6A–6B can perhaps be best explained by describing in detail the program executed by microprocessor 72. The flow charts of the program and subroutine executed by microprocessor are set forth in detail in FIGS. 10, 11A, 11B, 12, and 13, and in Appendix A attached hereto.

Figure 10:
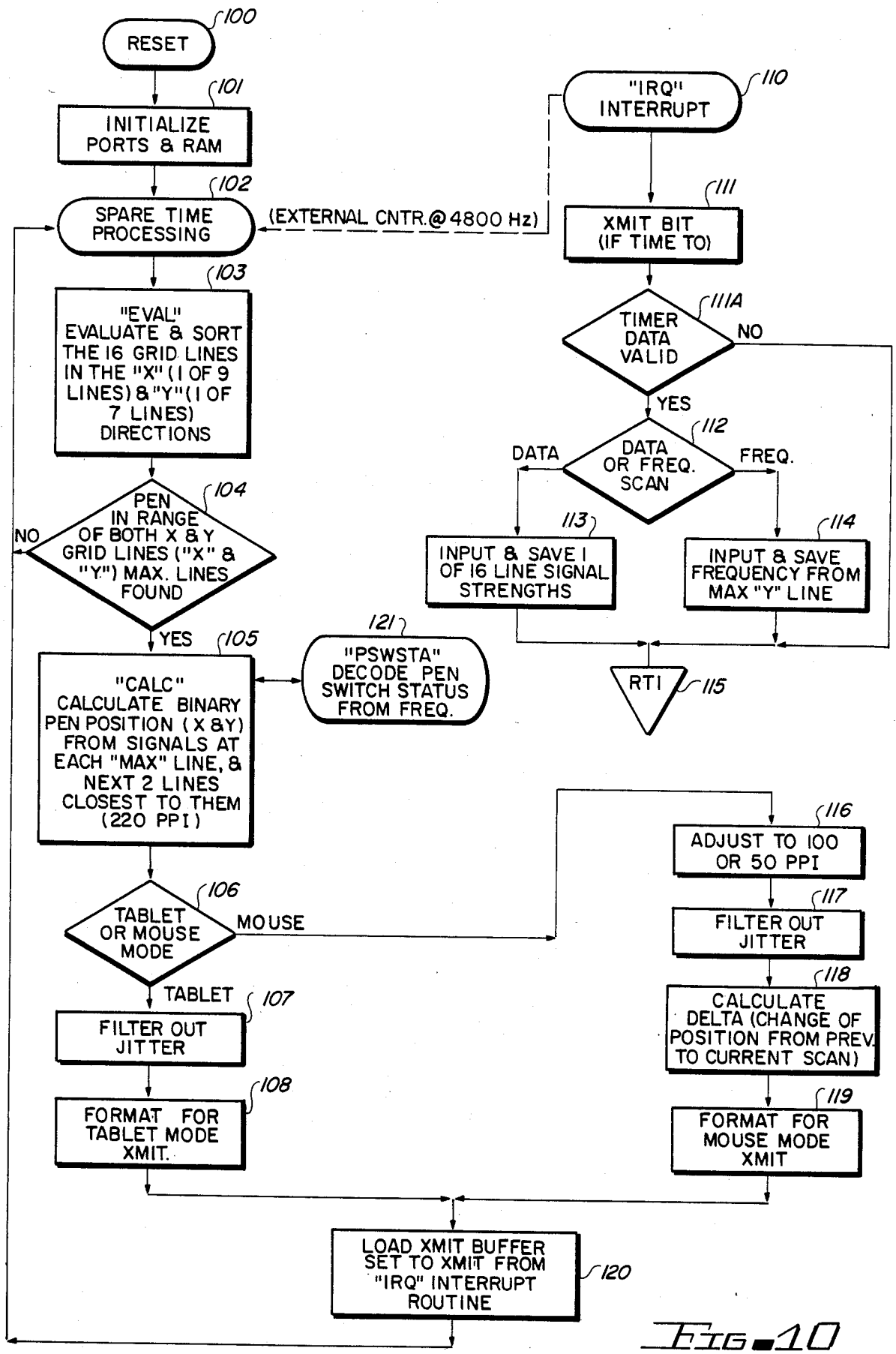
FIG. 10 is a flow chart of a program executed by the microcomputer of FIG. 6A.

Referring first to FIG. 10, this flow chart illustrates the general operation of microprocessor 72 to effectuate the scanning, X and Y coordinate generation, and frequency discrimination decoding functions referred to above. The program is entered via label 100, in response to a power on reset signal which is applied to microprocessor 72. The program then enters block 101 and performs various conventional "initialization" operations, such as setting predetermined initial conditions that establish whether the various microprocessor ports are to be programmed as inputs or outputs during operation, and establishes various initial values in predetermined locations of the internal random access memory (RAM) of microprocessor 72. Part of the initialization routine also causes the microprocessor to set up initial values for certain parameters of the graphic module 69, including initial values of gain and offset, previously described.

PB5 of processor 72 is set "high" during initialization to inhibit all inputs from the first eight X grid lines. These eight lines are then "scanned" for a predetermined "nominal" value. The port bits PA0 through PA4 are used to adjust the DC offset to graphic module 69 until the predetermined nominal data value is obtained. This procedure is repeated for both gain ranges (as controlled by PA5 of 72). In this manner, the circuitry is always "auto adjusted" to the same initial reference point, so that slight differences in the analog gains or other circuitry can be discounted. It also eliminates the time consuming and costly procedure of "manual" adjustment that might otherwise have to be done to each printed circuit board during the manufacturing operation.

After the initialization operations are complete, the program goes to block 102, which represents a "spare time loop" in which the microprocessor 72 operates in a "wait" state, in a low power mode, waiting for an interrupt from the Q8 output of counter 71, which interrupt occurs at a 4800 kilohertz rate.

Figure 12:
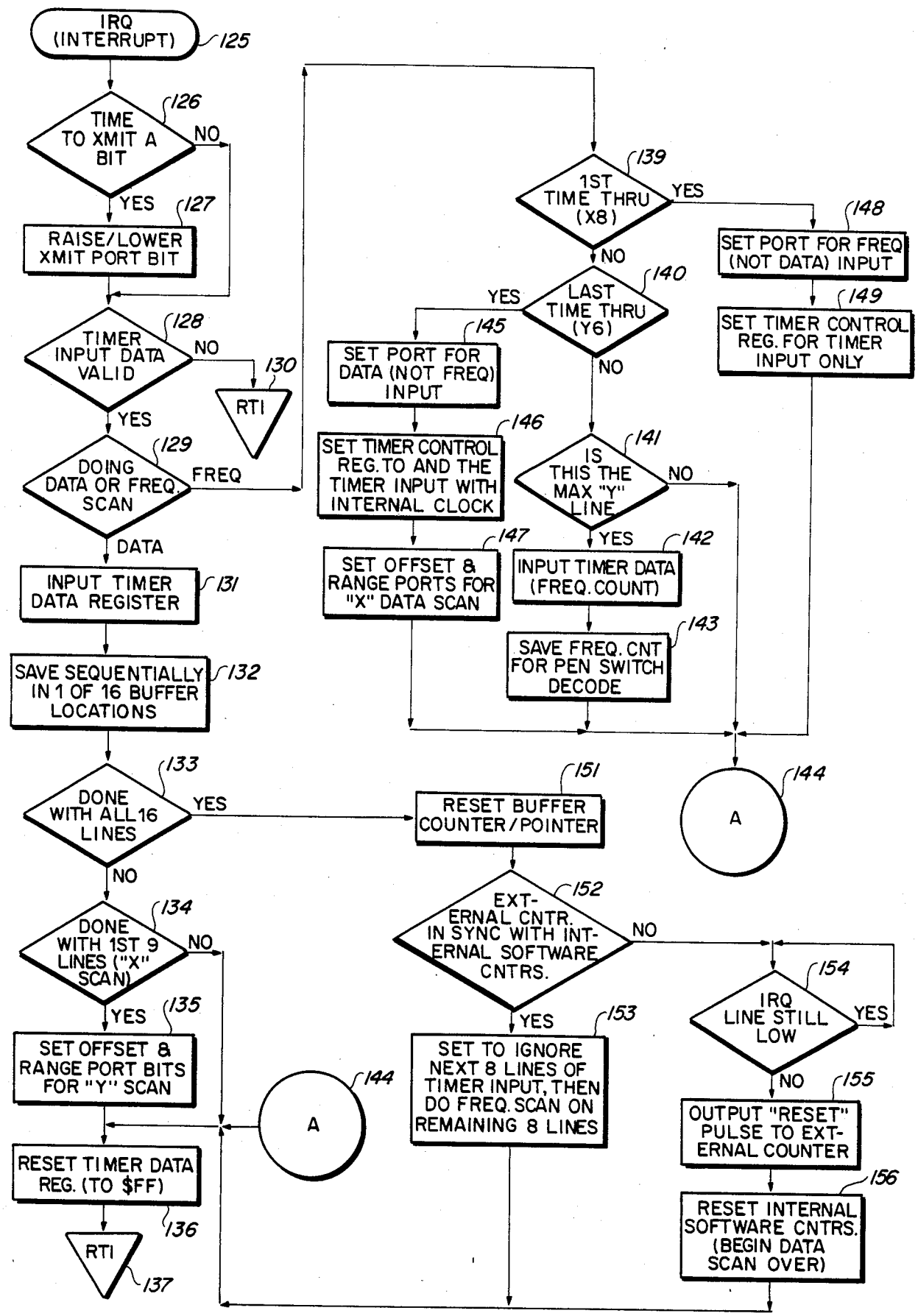
FIG. 12 is a flow chart of an interrupt routine executed in accordance with block 110 of the flow chart of FIG. 10.

If an interrupt occurs, the program enters label 110, and executes the interrupt routine of FIG. 12, described in detail subsequently. However, blocks 111–115 of FIG. 10 provide an overview of the interrupt subroutine of FIG. 12. After entering block 110, the interrupt routine raises or lowers the logic level of the serial output data on conductor 75, from the PA7 port of microprocessor 72, if the present time is the proper time to do this, as indicated in block 111. The interrupt subroutine then determines if it is the proper time to read (input) the timer data register, which contains the "data" or "frequency" information as loaded into microprocessor 72 by the "timer in" line 81. The external timing is designed such that the information from one of each of the major sixteen grid lines is available every four interrupt times. If it is not the proper time to read the timer data register, then the IRQ routine is exited, returning program execution to the point at which it was interrupted. If it is time to read valid timer data as determined in block 11A, the interrupt subroutine then determines in block 112 if a "data" or "frequency" scan of the X and Y major grid conductors is currently in process. If currently a data scan is being performed, then the timer register contains the measured pulse width of one of the sixteen major grid lines, which is now input and saved dequentially in an internal RAM location, for evaluation later during the "EVAL" routine of "spare time", as indicated in block 113. After some "housekeeping" activities, the program execution is then returned via label 115 to the point at which it was interrupted.

If the determination of decision block 112 is that a frequency scan is currently in progress, the timer register contains "frequency" information. If the frequency scan is at the Y grid conductor having the maximum signal level, as determined by the previous "data" scan, then this frequency information is input to a RAM location and saved, as indicated in block 114.

The data scan operation of block 113 or the frequency scan operation of 114 are performed only every fourth interrupt, i.e., at a 1200 hertz rate. The rest of the time, the microprocessor 72 is available for "spare time" processing, which includes going through the blocks 103, 104, 105, etc. to evaluate the data obtained and stored during execution of the interrupt routine of blocks 110–115 and to compute the pen position or decode pen switch commands resulting from operation of pen 9.

After all sixteen major X and Y lines have been scanned in accordance with block 113, the determination of decision block 112 is that the next scanning operation will be a frequency scanning operation. The scanning of the first eight major grid lines is ignored, and the FREQ OUT signals produced in response to scanning of the next eight major grid lines also is ignored until the major Y conductor on which the last maximum Y signal was obtained is scanned. Microprocessor 71 reads the timer data register, which has just been loaded with the count of the number of pulses of that major Y grid conductor within a predetermined amount of time, compute the present pen frequency, and save it in accordance with block 114. This pulse count is decoded to determine its frequency during spare time processing, as indicated by block 121.

Most of the time the program executed by microprocessor 72 waits in the spare time processing loop 102 of FIG. 10, waiting until a new major grid conductor signal strength is saved in accordance with block 113. As soon as the program receives such a piece of information, it goes from block 102 to block 103 and executes the EVAL subroutine of FIGS. 11A and 11B, wherein the program evaluates and sorts the stored data representing the signal strengths of the major grid lines scanned until the present time.

After execution of the EVAL subroutine, subsequently described, the program goes to decision block 104 and determines whether the X and Y major grid conductors having maximum signal strengths have yet been found. If this determination is negative, the program returns to the spare time processing loop 102 and waits for the present (or next) data scanning operation to provide additional signal strength data. If both the maximum X and Y signal strengths have been found, the program goes to block 105 and executes the CALC subroutine of FIG. 13, wherein the precise pen position is computed on the basis of the three maximum X line signal strengths and the three maximum Y line signal strengths, in accordance with certain predetermined formulas. In the course of executing the CALC subroutine, several additional subroutines are executed, including one for decoding the status of the pen switches 57, 58, and 59. After the CALC subroutine of block 105 has been executed, the binary pen position is known, with a resolution of 200 points per inch. If the determination of decision block 104 is negative, this means that the pen is "out of range"; what this means is subsequently described.

Next, the program goes to decision block 106 and determines if the digitizer tablet 2 is in a "tablet" or "mouse" mode. If it is in a "tablet" mode, in which the objective to provide precise X and Y pen position coordinates, the program goes to block 107 and executes a subroutine that filters or averages out "jitter", i.e., signal variations due to slight variations in the pen as it is being held by a slightly moving human hand, and then enters block 108 and formats the binary pen X and Y coordinates for transmission in the tablet mode to an external parallel buffer. The program then enters block 120, loads an internal software transmit buffer, and sets a transmit flag in block 111, enabling microprocessor 72 to serially transmit the binary pen coordinate data to a separate computer or peripheral device. The program then returns to the spare time processing loop 102.

If the determination of decision block 106 is that the digitizer tablet 2 is in a "mouse" mode, wherein the objective is to detect amounts of change in the pen position, rather the precise coordinates of the pen, the program goes to block 116 and rounds off the binary coordinate data to an accuracy of 50 or 100 points per inch (as preselected by the user), goes to block 117 and filters out jitter, and then goes to block 18 and computes the amount of change in the present X and Y pen coordinates with respect to prior values of those coordinates obtained in the previous operation. The program then goes to block 119, formats the computed changes for transmission to the external parallel buffer or an external peripheral device, enters block 120, and transmits the "mouse mode" data to the external device.

It should be appreciated that those skilled in the art know that the nature of "mouse mode" data is different than coordinate data obtained by digitizing the position of a pen or cursor. In the latter case, X and Y coordinates are measured with respect to a fixed reference point. "Mouse mode" data does not consist of X and Y coordinates, but of positive or negative amounts of change from the last location of the "mouse".

It should be noted that the unused information resulting from the above described frequency scanning of the first eight major grid lines gives the microprocessor 72 plenty of time to perform all of the calculations of the EVAL and CALC routines.

Figure 11A:
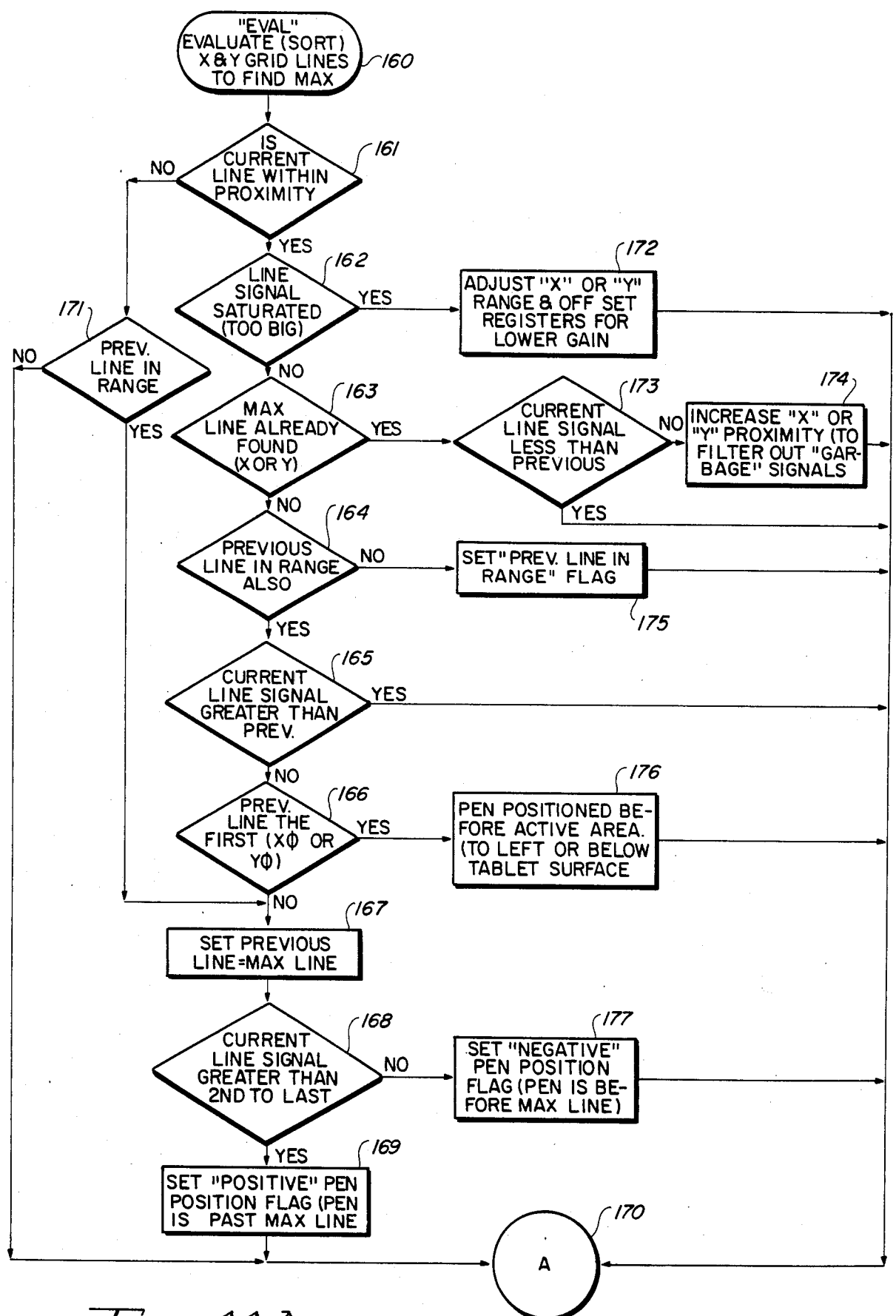
FIGS. 11A and 11B constitute a subroutine executed in block 103 in the flow diagram of FIG. 10.

Referring now to FIG. 11A, the EVAL subroutine is entered at label 160. The purpose of this subroutine is to "sort out" the signal strengths from the sixteen major grid conductors and determine the conductors having the three maximum X line signal strengths and the conductors having the three maximum Y line signal strengths. First, the program goes to decision block 161 and determines if the signal from the line (i.e., grid conductor) presently being scanned is large enough to be significant, i.e., if it has at least a predetermined "proximity" level. If this determination is negative, it may mean that the scan is approaching the location of the pen tip, or retreating from the location of the pen tip. In any case, the program goes to decision block 171, and determines if the signal strength of the previously scanned line is within a predetermined range. If this determination is negative, the program goes to label 170.

If the determination of decision block 171 is affirmative, then it means that the previously scanned line is the one having a maximum value. In this case, the program then goes to block 167, sets the previously scanned line as the one having maximum signal strength, and goes to decision block 168. (Note that all of the operations in FIG. 11A can apply to evaluation of signal level data from either X or Y lines; the flow chart of FIG. 11B determines which.)

In decision block 168 the program determines if the present line signal is greater than the next to last line scanned. If this determination is affirmative, the program goes to decision block 169 and sets a "positive" pen position flag that indicates that the pen position is past or beyond the grid conductor having the maximum signal value, and goes to label 170 of FIG. 11B.

If the determination of decision block 168 is negative, the program enters block 177 and sets a "negative" pen position flag which indicates that the pen position is located before the grid conductor having maximum signal strength.

If the determination of decision block 161 is affirmative, i.e., if the signal strength of the grid conductor presently being scanned exceeds the "proximity" level, then the program goes to decision block 162 and determines if the signal strength of the present line exceeds a certain predetermined maximum level. If this is the case, it is necessary to adjust the gain of the amplifiers in the graphic module 69 by changing the level on conductor 90, i.e., the gain adjust input, thereby "deleting" amplifier 87 of FIG. 6B from the amplifying circuitry, as indicated in block 172. (The resulting place shift has no significant effect on the operation of the system.) The program then goes to label 170 of FIG. 11B. If the graphic module is already at this gain level, the DC offset is adjusted from its "nominal" value, as predetermined by the interrupt routine, to assume that the grid lines are maintained within the dynamic range of the system.

If the determination of decision block 162 is negative, the program enters decision block 163 and determines if the maximum signal strength for the present group of conductors being scanned has already been found. If this determination is affirmative, the program goes to decision block 173 and determines if the present signal strength is less than the signal strength of the previously scanned line of the present group. This determination should never be negative, but if it is due to a noise pulse or other system error, the program goes to decision block 174 and increases the "proximity" level with reference to which the determination of decision block 161 is made, so that, in essence, "meaningless" signals are filtered out. The program goes to label 170 of FIG. 11B.

Figure 11B:
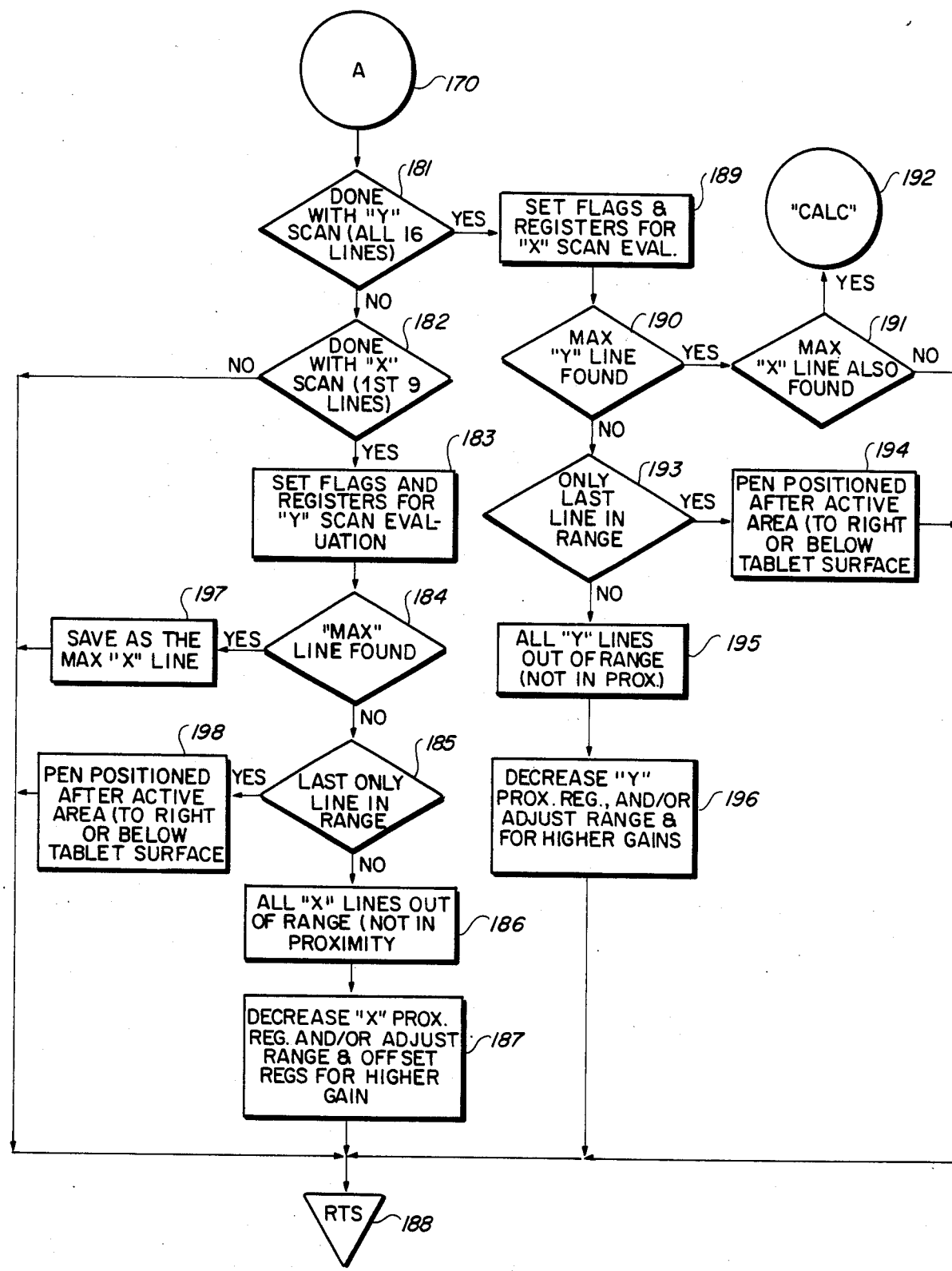

If the determination of decision block 173 is affirmative, the program goes to label 170 of FIG. 11B.

If the determination of decision block 163 is negative, the program goes to decision block 164 and determines if the previously scanned signal level is also in the predetermined "range". If the determination of decision block 164 is negative, the program goes to block 175 and sets a "previous line in range" flag and goes to label 170 of FIG. 11B. Note that the "previous line in range" flag of block 175 is the reference for the next scan. At the present time, it actually means that the current line is in the predetermined range. If the determination of decision block 164 is negative, the program goes to decision block 165 and determines if the signal strength of the present grid line is greater than for the previous line. If this determination is affirmative, it means that the scan process is continuing to find major grid conductors with larger signal levels than the previously scanned lines, so the line having the maximum signal level has not yet been found. The program then goes to label 170 of FIG. 11B. If the determination of decision block 165 is negative, the program goes to decision block 166 and determines if the previous line is the first line of the present group, i.e., if it is the "$X_0$" or "$Y_0$" line. If this determination is negative, the program goes to decision block 167, previously described. If the determination of decision block 166 is affirmative, the program goes to block 176 and sets a flag indicating that the pen position is located to the left of or below the scanning range of the digitizer major grid conductors. The program then goes to label 170.

It should be noted that the capability of the foregoing routine to cause the microcomputer 72 to automatically adjust the gain and offset in accordance with the signal levels being scanned (as in block 172 of FIG. 11A) is important to the present invention because of the considerable variation in the pen signal level capacitively coupled to the grid conductors due to the absence of a fixed ground in the pen. The automatic adjustment of gain and offset also enables the circuit design to be accomplished in such a way as to minimize power dissipation. Those skilled in the art will recognize that if a "worst case" design were to be performed, wherein an extremely wide range of grid conductor signal levels could be adequately processed at one range setting, a much higher level of system power dissipation would occur than is the case for the present digitizer.

Referring next to FIG. 11B, the program enters decision block 181 and determines if all sixteen grid lines have been scanned during the present sequence of the scanning operation. If this determination is affirmative, the program goes to block 189 and sets flags and certain software registers to prepare for the evaluation of data obtained by scanning X conductors, so that the program knows that the next pass through the EVAL subroutine is being performed for the X group of grid conductors rather than the Y group.

The program then goes to decision block 190 and determines whether the Y line with the greatest signal strength has been found. If this determination is affirmative, the program goes to decision block 191 and determines if the X line with the greatest signal strength has been found. If this determination also is affirmative, the program exits to the CALC subroutine (label 192) to compute the precise binary coordinates of the pen tip position. If the determination of decision block 191 is negative, the program returns to the main spare time loop (block 102) of the program of FIG. 10 via RTS (return from subroutine) label 188.

If the determination of decision block 190 is negative, the program enters decision block 193 and determines if the signal level of the last line scanned is the only one within the predetermined "range". If this determination is affirmative, the program goes to block 194 and sets a flag indicating that the pen is positioned to the right of or below the active grid scanning area of the tablet surface, and returns to block 104 of FIG. 10.

If the determination of decision block 193 is negative, the program goes to block 195 and indicates that the signal levels of all Y lines scanned are out of the "range" of the grid conductors, i.e., that the signal levels are less than the "proximity" level, the minimum signal level which indicates that the pen tip is in the "proximity" of the digitizing surface. The program then goes to block 196, decreases the value in the "Y proximity register", and/or adjusts the range and offset registers to achieve higher gains, and then returns to the main program via label 188.

If the determination of decision block 181 is negative, the program goes to decision block 182 and determines if the first nine lines (for "X" data) have been scanned. If this determination is negative, the computer returns to the main program of FIG. 10 via label 188.

If the determination of block 182 is affirmative, the program goes to block 183 and sets appropriate flags and register values to cause the EVAL routine to evaluate the signal levels for the next group of conductors scanned, which will be the Y conductors.

The program then goes to decision block 184 and determines if the X conductor having the maximum signal strength has been found. If this determination is affirmative, the program goes to block 197 and saves that X line number, and returns to the main program. If the determination of decision block 184 is negative, the program goes to decision block 185 and determines if the last X conductor scanned is the only line in the present range. If this determination is positive, the program goes to block 198 and sets a flag indicating that the pen is positioned to the right or below the digitizing surface, and returns to the main program. If the determination of decision block 185 is negative, the program goes to block 186 and sets a flag indicating that all of the X lines are out of the range of the digitizing surface. The program then goes to block 187 and decreases the value in the X proximity register and/or adjusts the range and offset registers to produce higher gain in the graphic module 69. The program then returns to the main program of FIG. 10.

Figure 13:
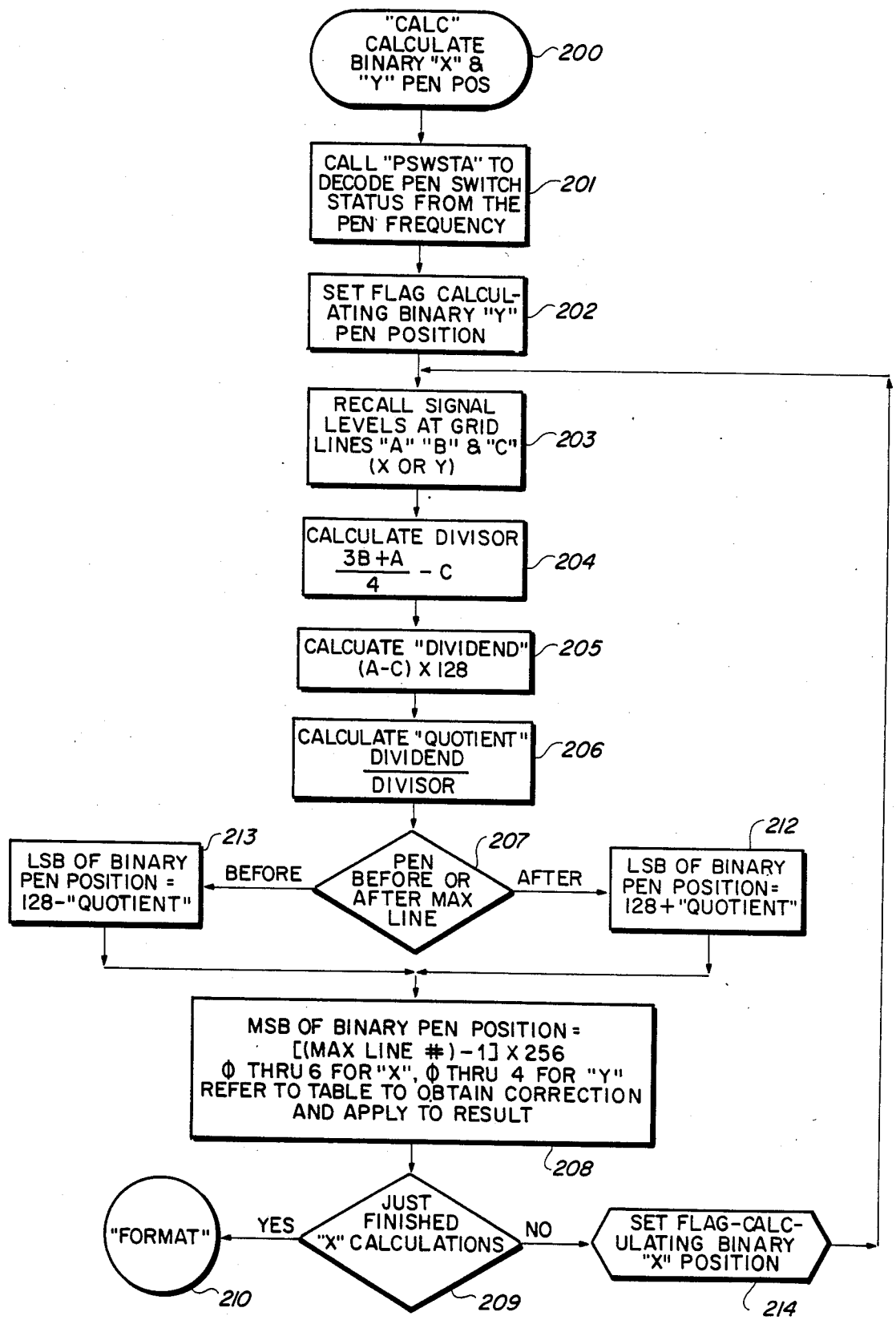
FIG. 13 is a flow chart of a subroutine executed to compute the precise pen coordinates in accordance with block 105 of the flow chart of FIG. 10.

Referring now to FIG. 13, the CALC subroutine referred to in block 105 of FIG. 10 is entered at label 200, for the purpose of computing the precise binary X and Y pen coordinates after the three X lines and three Y lines having maximum signal levels have been found. (Note that in the EVAL subroutine, it is inherent that the next highest signal levels are on the lines adjacent to the one having the maximum signal level.) The program goes to block 201 and calls up a subroutine called PSWSTA (not described in detail, as it is very straightforward and can be easily provided by one skilled in the art) for decoding the pen switch status on the basis of the pen frequency reading saved in accordance with block 114 of FIG. 10 during the last frequency scanning operation. The program then goes to block 202 and sets a flag that indicates that the present calculation is for a binary Y coordinate for the pen position, rather than a binary X coordinate.

Next, the program goes to block 203 and recalls the stored levels B, A, and C for the three highest signal levels, respectively, obtained during the previous scanning of the Y grid conductors.

The program then goes to block 204 and computes a "divisor" in accordance with the equation $$\frac{3B+A}{4} - C \qquad (1)$$

The above equation is an empirically determined equation that has been found, in conjunction with equation (2) below, to provide accurate results in computing a precise pen coordinate on the basis of signal strengths of relatively widely spaced grid conductors with the above-described minor grid conductors positioned and resistively coupled therebetween.

Next, the CALC subroutine goes to block 205 and computes a "dividend" in accordance with the equation $$(A-C) \times (128) \qquad (2)$$

The "128" in equation (2) represents half of the number of points between each major grid line. The major grid lines are 1.28 inches apart, with 256 points between them, i.e., 200 points per inch.

Next, the program goes to block 206 and computes the quotient obtained by dividing the dividend of block 205 by the divisor of block 204.

The program then goes to decision block 207 and determines (by reading the flag set in blocks 169 and 177 of FIG. 11A) whether the pen is located to the right or left of the grid conductor having the maximum signal strength (assuming scanning occurs from left to right), or whether the pen is located above or below the grid conductor if a "Y" scan is being done, wherein scanning is done from the bottom to the top, rather than left to right. If the pen position is located after (to the right of) the grid conductor with maximum signal strength, the program goes to block 212 and computes the least significant bit (LSB) of the binary pen position coordinate as equal to 128 plus the value of the quotient coupled in block 206. Otherwise, the program goes to block 213 and sets the LSB of the binary pen position coordinate to 128 minus the quotient computed in block 206. In either case, the progam goes to block 208 and computes the most significant bit (MSB) of the binary pen position coordinate being computed in accordance with the equation $$(\text{MAX LINE NO.} - 1) \times 256, \qquad (3)$$

where MAX LINE NO. is equal to 0 through 6 for X coordinates and is equal to 0 through 4 for Y coordinates. This value is used to reference a stored "look-up" table, which precisely defines the pen location and corrects for small errors in the above formula.

The program then goes to decision block 209 to determine if the binary pen position coordinate just completed is for an X coordinate. If this determination is affirmative, the program goes to a format routine (not described, as it would be easy for one skilled in the art to format the data as it desired to be input to an external computer, such as an IBM PC) via label 210 to format the binary X and Y pen position coordinates in a predetermined manner so that they can be output to an external buffer (not shown) in a suitable format to be read by an external computer. If the determination of decision block 209 is negative, the program goes to block 214, sets the flag of block 202 to a value that indicates that the binary coordinate being calculated is an X coordinate, and returns to block 203 and repeats the above-described process.

Next, the interrupt subroutine (previously briefly described with reference to blocks 110-115 of FIG. 10) that is executed by microprocessor 72 in response to each pulse supplied to its IRQ input is described in detail with reference to FIG. 12. The interrupt subroutine is entered via label 125. The subroutine goes first to decision block 126 and determines if the present time is an appropriate time to transmit a bit of serial data from microprocessor 72 to the above-mentioned external parallel buffer or peripheral device. This determination is made by testing two conditions, first, a flag (set in block 120 of FIG. 10) that indicates whether the pen position has been computed and properly formatted, and hence is ready to be transmitted. The second condition tested is whether the time is right to change the data bit in order to transmit it at the predetermined baud rate. This is determined by an internal counter, which keeps track of the number of interrupts, since the interrupt rate occurs at 4800 hertz, and the transmit speed is a derivative of this rate, i.e., is 2400 baud (bits per second), 1200 baud, 600 baud, etc. If this decision is affirmative, the program goes to block 127 and sets the serial output port (PA7) of microprocessor 72 to a logical "one" or "zero" depending on the value of the bit to be transmitted. The interrupt routine then goes to decision block 128. If the determination of decision block 126 is negative, the program goes directly to decision block 128.

In block 128, the interrupt routine determines if the timer data register has been properly loaded from the input data applied on the DATA/FREQ input (conductor 81 of FIG. A6). At every fourth interrupt pulse, the timer data register of the microprocessor 72 will be valid. If it is not valid, the interrupt routine returns to the point in the main program at which the interrupt occurred.

If the timer data register is valid, the program goes to decision block 129 and determines if a data scan operation or a frequency scan operation is presently being performed. If a data scan is being performed, the program goes to block 131 and performs the function of reading the value of an internal input timer data register. The routine then goes to block 132 and sequentially saves the data just input to the input timer of the microprocessor and transferred into one of sixteen locations in an internal buffer. The position of the data in that buffer determines to which of the sixteen major grid conductors the presently saved signal strength corresponds. The interrupt routine then goes to decision block 133 and determines if all sixteen grid conductors have been scanned and if the corresponding signal strengths are determined and saved in the software buffer of block 132. If this determination is affirmative, the interrupt routine goes to block 151 and resets a pointer that points to the internal buffer, and then goes to decision block 152.

In decision block 152 the program determines if the external counter 71 is in proper synchronization with the internal software counters in microprocessor 72, in case a system error has interrupt the proper synchronization. This is done by reading a few of the outputs of counter 71 to see if they have proper values, which are read via ports PB0 through PB2. If this determination is negative, the interrupt routine goes to block 154 and loops until the interrupt line goes high, i.e., one-half of the interrupt cycle has elapsed. As soon as this occurs, the program then causes microprocessor 72 to send out a reset pulse to counter 71, as indicated in block 155.

This synchronizes the internal microprocessor counters with the external counter 71. The routine then goes to block 156 and resets the internal software counters to begin the data scanning operation over again. The interrupt routine then goes to block 136 and resets the timer data register to an initial state and returns to the main program via label 137.

If the determination of block 152 is that the external counter and internal software registers are in sync, the program goes to block 153 and sets a flag which causes the routine to ignore the next eight lines of the data input to the data timer of microprocessor 72, and then causes it to measure the frequency, i.e., count the pulses, of the remaining eight grid lines scanned, i.e., perform the "frequency scan". The interrupt routine then goes to block 136.

If the determination of block 133 is negative, the program goes to block 134 and determines if the first nine grid conductors, i.e., the X conductors, have all been properly scanned. If this determination is negative, the program goes to block 136 and resets the timer data register of microprocessor 72. If the X lines all have been scanned, the program goes to block 135 and sets the offset and range ports to appropriate values for the Y scanning operation. These values have been previously determined by blocks 172, 174, or 196 of the "EVAL" subroutine of FIGS. 11A and 11B. The program then goes to block 136 and resets the microprocessor timer input register.

Returning to decision block 129, if this determination is that a frequency scan is being done, the interrupt routine goes to decision block 139 and determines if the present pass is the first pass of the frequency scanning operation. Block 153 of FIG. 12 will have already set the interrupt routine to ignore the first eight X lines. If these lines are the ones presently being scanned, then they are ignored by the "no" condition of block 128. The "FREQ" branch of decision block 129 is only taken during the scan of the last eight grid lines, those being the X8, Y0, Y1 ... Y6 lines. Since the first line looked at in block 129 is the X8 line, it is the only one ignored, but this now allows the program to set up the frequency scan operation to look at the next seven Y lines for the frequency information. If this is the case, the interrupt routine goes to block 148, and sets the microprocessor input timer to ignore the data presently on the FREQ OUT input conductor 233 of FIG. 6A. The interrupt routine then goes to block 149 and sets an internal timer control register to function as a "timer" input only (i.e., to count the input pulses instead of measuring their widths).

If the determination of decision block 139 is that the present pass is not the first time through, the routine goes to decision block 140.

If the determination of decision block 140 is that the present line being scanned is not the last Y line in the group, the routine goes to decision block 141 and determines if the present line is the Y line having the maximum signal level. If this determination is negative, the routine goes to block 136. Otherwise, it goes to block 142 and cause the input timer of microprocessor 72 to read the number of pulses of the maximum Y conductor signal level, and then goes to block 143 and saves this frequency count so that it can be decoded, as previously explained, to determine the present settings of switches 57, 58, and 59 of FIG. 4. The interrupt routine then goes to block 136, and then returns to the main program via label 137.

If the determination of decision block 140 is that the present conductor is the last one to be scanned during the frequency scanning operation, the program goes to block 145 and sets the output ports PB6 and PB7 of microprocessor 72 to indicate that the next scanning operation is to be a data scan. Blocks 146 and 147 then set internal registers properly for the next X data scan on the X lines, and then returns to the main program via block 136 and label 137.

Figure 7:
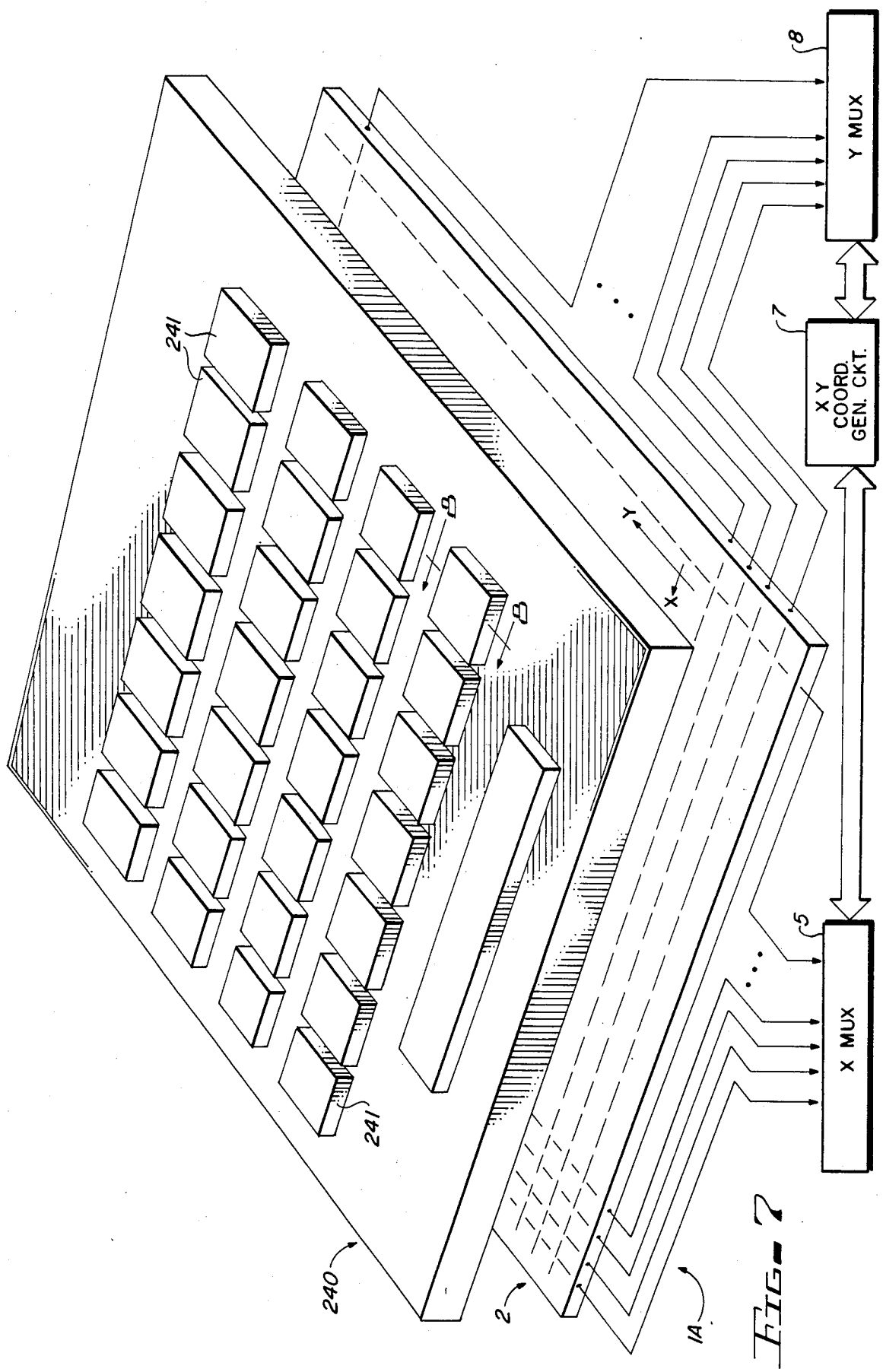
FIG. 7 is a perspective view of the cordless keyboard used in conjunction with the digitizing tablet of FIG. 1.

Referring now to FIGS. 7 and 8, instead of using the cordless pen 9 of FIGS. 1 and 2 in conjunction with the digitizing tablet 2, a cordless keyboard 240 having a plurality of depressable keys 241 thereon is positioned on digitizing surface 2. Mechanical alignment indicia can be utilized to ensure proper alignment of keyboard 240 with digitizing surface 2.

Portable keyboard 240 includes a ground plane 242 having a metal conductive strip 244 (FIG. 8) thereon. Metal conductor 244 conducts a signal produced by an oscillator identical or similar to the oscillator 46A shown in FIG. 4 that is contained within cordless keyboard 240.

Ground plane 242 has a plurality of openings 243 therein. Each of the depressable keys 241 has a conductive shaft 247 that extends through one of the holes 243. When a particular key 241 is depressed, its conductive shaft or plunger 247 extends down to or nearly to the upper surface of digitizing tablet 2.

As seen in FIG. 8, the bottom surface of each of the key caps 241 has an annular conductive plate 245 thereon. A variable capacitor formed by the conductive plate 245 of each key and the conductive strip 244 carrying the oscillator signal is designated by reference numeral 246. When the key is depressed, the spacing between the plates of the variable capacitor 246 decreases greatly increasing the value of the capacitor 246. The increased capacitance greatly increases the capacitive coupling of the oscillator output signal from the conductor 244 to the conductive plate 245. The conductive plates 245 are electrically connected to the plungers 247, so the effect of depressing any particular key, such as 241A in FIG. 8, is to effectively couple the oscillator signal to the lower end of the plunger 247 of that key. (The conductive plates 245 alternately could be capacitively coupled to the plungers 247.) The lowering of the plunger 247 by depressing a key increases the capacitive coupling between it and the major grid conductors such as 3 and 4 previously described with reference to FIGS. 1 and 3 and the minor grid conductors resistively coupled therebetween. This enables the previously described circuitry to quickly digitize the location of any depressed key. This information then is suitably formatted and output to an external computer. The external software, characters or items of which are selected by means of the digitized information obtained by the external computer from the digitizer tablet 2.

In accordance with this embodiment of the invention, signal transmitting indicia can be provided on the bottom of the ground plate 242 for coupling oscillator signals to the digitizer tablet 2 in order to enable the digitizer tablet and the external computer connected thereto to interpret the coordinates of such signal-transmitting indicia in order to enable the external computer to identify the type of keyboard placed on the digitizer tablet 2. This enables the external computer to determine which "menu" should be used for interpretation of depressed keys of that keyboard.

Of course, it is not essential to this embodiment of the invention that the keyboard 240 be cordless. A separate power supply and oscillator circuit could be provided, and the oscillator output signal could be connected by a cable to the conductor 244. As in the case of the previously described cordless pen 9, not all information produced by the keys needs to be locational or coordinate information. As before, the frequency of the oscillator can be shifted by depressing certain keys, and the resulting frequency can be decoded in precisely the manner previously described.

Thus, it can be seen that the invention provides a digitizing tablet with a cordless pen that can operated in either a dignitizing mode or a mouse mode. The described system dissipates far lower levels of power than typical prior art digitizing system, and nevertheless has adequate noise immunity despite the necessarily low pen signal levels, and the very low resulting signal levels capacitively coupled from the cordless pen to the grid conductors in the digitizing surface. The dual mode operation, i.e., the digitizing mode and the mouse mode, is provided at very little additional cost. The entire system achieves the objective of low overall cost by implementing the desired functions with a minimum number of system components, including printed, passive grid components. By relying upon only signal levels of three X lines and three Y lines, the susceptibility of the system to externally induced noise is greatly reduced. The disclosed removable keyboard structure provides previously unavailable versatility in a computer input device, allowing digitizing, mouse, and keyboard input operations to a computer with a single low cost system level upon a single digitizing tablet.

While the invention has been described with reference to a particular embodiment thereof, those skilled in the art will be able to make various modifications to the described embodiment of the invention. For example, it is not necessary that the control of the scanning operations be done by down counter 71, as described herein, but may be directly controlled by the microprocessor 72. The technique of using down counter 71 as described herein simply lowers the cost of the system, at some sacrifice in operating speed, which we found to be acceptable in this case. In some instances, it may be desirable to drive the pen synchronously. Also, it is not essential that the tubular shield 16 actually be tubular, although this is a preferred configuration. All that is really necessary is that the shield have a sufficiently greater capacitance than the pen cartridge that the shield effectively acts as a virtual ground, so that it undergoes potential transitions which are much smaller than the potential variations of the pen tip. Other techniques for routing the oscillator signal to the various signal transmitting elements associated with the various keys in the embodiment of FIGS. 7 and 8 can be provided. Furthermore, it is not necessary that batteries be used as the power source in the cordless pen or in the cordless keyboard described. For example, inductive coupling between a power source associated with the digitizer tablet could be used to couple AC signals into a sensing circuit located in the cordless pen, which rectifies the induced signals to produce the DC levels necessary to operate the pen circuitry. The plastic tip 12 in FIG. 2 can be metal, and thereby make electrical contact to pen tip 10. This improves the capacitive coupling to the grid conductors and improves the grid conductor signal levels. Techniques other than those disclosed can be provided for varying the oscillator frequency in response to closure of the pen switches 57, 58, and 59. For example, the resistor 57 that is switched into the oscillator circuit by pressing down on the pen tip 10 could be a pressure-responsive resistor that changes the oscillator frequency as a function of pen pressure on tip 10, and the various frequencies could be decoded to represent different line widths. By way of definition, it is to be understood that the pen need not be a writing instrument. The term "pen" as used in the claims is intended to encompass any hand-held instrument that has a conductive tip or element that capacitively couples a signal to the grid conductors in the manner described herein. It is not essential that the grid conductors be in orthogonal sets as described. Linear resistive parallel conductors could be used, wherein the conductor locations determine one coordinate of the pen and resistive voltage division proportional to the pen position in such conductors determine the other coordinate.

APPENDIX A

```
MICROTLC ASM0:    .0

ERR LINE  ADDR E1 E2 E3 E4
   1                        ;- BEGIN FILE SER01.ASM -
   2                           TITLE 'SERIES 0 CONTROL PROGRAM: -28MAR85-'
   3                           LIST   X,E,A
   4                        ;PROCESSOR = MC1468705G2  C-MOS, E-PROM VERSION OF 6805. (40 PIN)
   5
   6                        ;********* MEMORY MAP *************
   7                        ;$00 THRU $0F = PORTS AND CONTROL REGS (ONLY USED THRU $09)
   8  0000                  PORTA  EQU    $00     ;BC-B4=DC OFFSET ADJUSTMENT (OUTPUTS) TO ANALOG MODULE
   9                                              ;       HIGHER OFFSET=LOWER NOMINAL LINE SIGNALS (SEE INITP RTN)
  10                                              ;       ALSO ADJUSTED TO KEEP PEN SIGNAL IN RANGE W/B5 HIGH(RNG1)
  11                                              ;B5=RANGE (GAIN) ADJ TO MODULE (OUTPUT)
  12                                              ;       0=RANGE 0 (INITIAL, HIGH GAIN)    1=RANGE 1 (LOWER GAIN)
  13                                              ;B6=RESET OUPUT TO EXTERNAL COUNTER CHIP (SYSTEM CNTR RESET)
  14                                              ;E7=SERIAL DATA OUTPUT (PROCESSOR CNTRLED, BIT BY BIT)
  15  0001                  PORTB  EQU    $01     ;B0-B2=EXTERNAL COUNTER INPUT, USED TO CHK SYNC
  16                                              ;B3 & B4=UNUSED
  17                                              ;B5=INHIBIT GRID (OUTPUT)  (0=NORMAL   1=X GRID INPUTS DISA)
  18                                              ;   USED DURING "INITP" RTN TO CALC NOMINAL LINE VALUE
  19                                              ;B6=DATA (NOT FREQ) SELECT (OUTPUT)
  20                                              ;B7=FREQ (NOT DATA) SELECT (OUTPUT)
  21                                              ;   (B6 & B7 USED TOGETHER TO SELECT DATA OR FREQ AS THE TIMER
  22                                              ;    INPUT. THEY ARE ALWAYS THE INVERSE OF EACH OTHER)
  23  0002                  PORTC  EQU    $02     ;INPUT PORT FOR JUMPER SELECTIONS (POWER UP & MENU DEFAULT)
  24                                              ;NOTE: B1&B2 SEPARATE FROM E3&B4 SO THE "DEFAULT" MENU FEATURE
  25                                              ;       FOR MOUSE OR TABLET MODE MAY BE SET INDEPENDANTLY.
  26                                              ;B0= MOUSE / TABLET MODE
  27                                              ;    0=MOUSE     1=TABLET
  28                                              ;B1= MOUSE MODE RESOLUTION (POINTS PER INCH)
  29                                              ;    0=LOW (50)   1=HIGH (100)
```

```
 30                                  ;B2= MOUSE MODE BAUD RATE
 31                                  ;    0=LOW(1200) 1=HIGH (2400)
 32                                  ;B3= TABLET MODE RESOLUTION (POINTS PER INCH)
 33                                  ;    0=LOW (100) 1=HIGH (200)
 34                                  ;B4= TABLET MODE BAUD RATE
 35                                  ;    0=LOW(1200) 1=HIGH (2400)
 36                                  ;B5= TABLET MODE FORMAT
 37                                  ;    0=FORMAT1  1=FORMAT4
 38                                  ;B6= MENU MODE ENABLE
 39                                  ;    0=DISABLED 1=ENABLED
 40                                  ;B7= PEN CONFIGURATION
 41                                  ;    0=REMOTE (DETACHED)   1=ATTACHED
 42   0003       PORTD  EQU   $03    ;IF PEN IS "REMOTE" (DETACHED), THEN PORTD IS UNUSED AND
 43                                  ;INITIALIZED AS ALL OUTPUT. IF PEN IS "ATTACHED", THEN:
 44                                  ;B0= PEN SW1 (PEN DOWN) INPUT
 45                                  ;B1= PEN SW2 INPUT
 46                                  ;B2= PEN SW3 INPUT
 47                                  ;B3-B7=UNUSED (INIT AS OUTPUT)
 48   0004       DDR    EQU   $04    ;DATA DIRECTION REG FOR EACH PORT (DDR FOR PORTX=PORTX+DDR)
 49                                  ;(PORTA DDR=$04, PORTB DDR=$05, PORTC DDR=$06, PORTD DDR=$07)
 50                                  ;BIT SET ("1")=OUTPUT, "0"=INPUT
 51   0008       TDREG  EQU   $08    ;READ/WRITE INTERNAL TIMER DATA. USED FOR 2 PURPOSES:
 52                                  ;1. INIT TO $FF & COUNT DWN DURING A/D PULSE TO "TIMER" INPUT.
 53                                  ;   EACH PULSE REPRESENTS DATA FROM ONE OF THE 16 MAJOR LINES. A
 54                                  ;   LARGE PULSE (COUNT DOWN TO SMALL NUMBER) INDICATES NO OR MIN
 55                                  ;   PEN DATA, WHILE SHORTER PULSES (LARGE # LEFT IN REG) SHOWS
 56                                  ;   THAT THE PEN IS IN PROXIMITY. THE TDREG IS READ DURRING THE
 57                                  ;   APPROPRIATE INTERRUPT (EXT INTRPT CNTRLED BY EXT COUNTER).
 58                                  ;2. TIMER INPUT IS ALSO USED TO READ THE PEN FFC OF THE DETACHED
 59                                  ;   PEN, TO DETERMINE THE PEN SWITCH STATUS. ONE "SCAN" (TIME
 60                                  ;   USED TO READ COMPLETE SET OF 16 GRID LINES, 75 HZ) IS USED
 61                                  ;   TO READ THE DATA (AS DESCRIBED IN "1." ABOVE), AND THE NEXT
 62                                  ;   SCAN IS USED TO READ THE FREQ INFO (NOTE THAT PORTB BIT6 & 7
 63                                  ;   ARE CHANGED, AND 'TCREG' ADJUSTED IN ORDER TO PERFORM THIS).
 64                                  ;   ONLY THE FREQ FROM THE PREV CALCULATED MAX 'Y' LINE IS USED,
 65                                  ;   SO THE 1ST 8 LINES OF THE 2ND SCAN ('X' GRID LINES) ARE IG-
 66                                  ;   NORED, AND THE 'Y' LINES ARE CHECKED FOR MAX. THE FREQ OF
 67                                  ;   THIS LINE IS SAVED FOR LATER DECODING. (SEE BEGINNING OF
 68                                  ;   'IRQ' (INTERRUPT) ROUTINE FOR FURTHER EXPLAINATION
 69   0009       TCREG  EQU   $09    ;TIMER CONTROL REG
 70                                  ;B0-B2=TIMER PRESCALER (SET TO 000 FOR DIV BY 1)
 71                                  ;B3=RESET PRESCALLER TO 0
 72                                  ;B4-B5=SELECT TIMER MODE
 73                                  ; 1 0 = .AND. INTERNAL CLOCK & TIMER INPUTS (FOR 'DATA' SCAN)
 74                                  ; 1 1 = ENA TIMER INPUT ONLY (FOR 'FREQ' SCAN)
 75                                  ;B6=DISA TIMER INTRPT (0=ENA) (THIS BIT SET TO DISA)
 76                                  ;B7=INTERNALLY SET WHEN TIMER DCR TO 0 (TIMER OVERFLOW)
 77                                  ;
 78                                  ;$10 THRU $71 = SCRATCH RAM (NOTE:RESERVE $72-$7F FOR STACK)
 79                           ORG    $10
 80   0010       TDBUF  RMB   16     ;STORAGE FOR THE 16 BYTES OF TIMER "SCAN" DATA (16 LINES)
 81   0020       SCNCNT RMB   1      ;COUNTS THE IRQ INTRPTS, 0 WHEN SCAN (TIMER) DATA IS VALID.
 82                                  ;(NORMALLY EVERY 4 INTRPTS BUT CHANGED WHEN SWITCHING BETWEEN
 83                                  ;'DATA' AND 'FREQ' SCANS)
 84   0021       TDINP  RMB   1      ;PTR TO LOCATION IN 'TDBUF' TO SAVE NXT INPUTTED SCAN DATA
 85   0022       TDOUTP RMB   1      ;PTR TO LOC IN 'TDBUF' OF NXT DATA TO BE EVALUATED DURRING
 86                                  ;THE SPARE TIME PROCESSING.
 87                                  ;NOTE: BOTH 'TDINP' & 'TDOUTP' START AT $0F & CNT DWN TO 0
 88   0023       YMAX   RMB   1      ;B0-B3= SET AS PTR TO MAX 'Y' LINE FOUND DURRING 'EVAL'
 89                                  ;B7= SET IF PEN IS BEFORE THE MAX LINE (NEG POSITION IN
 90                                  ;    RESPECT TO THE MAX LINE)
 91                                  ;    NOTE: 'YMAX' ALSO USED TO TEMP STORE 'XMAX' VALUE
 92   0024       YMAX1  RMB   1      ;SAME AS ABOVE, BUT WITHOUT B7 FLAG (POINTER ONLY)
 93   0025       XMAX   RMB   1      ;SAME AS "YMAX", ONLY FOR THE MAX "X" LINE
 94   0026       EVSCN  RMB   1      ;"0" IF DOING "X" SCAN IN THE "EVAL" RTN, "1" IF DOING "Y"
 95   0027       EVFLG  RMB   1      ;'EVALUATE' FLAG REG (FLAGS USED IN "EVAL" ROUTINE)
 96                                  ;B0=LAST LINE EVALUATED WAS IN PROX & = 1ST LINE (X0 OR Y0)
 97                                  ;B1=LAST LINE EVALUATED WAS IN PROXIMITY
 98                                  ;B2=MAX LINE FOUND (X OR Y, DEPENDING ON WHEN FOUND)
 99                                  ;B3=UNUSED
100                                  ;B4=LINE ON EITHER SIDE OF MAX IS "0" (DC OFFSET ADJ TOO HIGH)
101                                  ;B5="X" SCANS FOUND OUT OF PROX, RANGED (SO TOTALLY OUT OF PROX)
102                                  ;B6=THE X OR Y RANGE NEEDED ADJUSTMENT DUE TO CONDITION FOUND IN
103                                  ;   CURRENT "EVAL" SCAN.(RESET EVERY 1/2 SCAN, AFTER THE X OR Y
104                                  ;   PORTION OF THE SCAN IN "EVAL" IS COMPLETE)
105                                  ;B7=ERROR CONDITION FOUND, IGNORE SCAN IN "EVAL" RTN (DON'T TRY
106                                  ;   TO FIND VALID MAX LINES THIS SCAN). FLAG SET IF:
107                                  ;     1."EVAL" FOUND PEN TOO FAR TO LEFT, RIGHT, OR BELOW THE
108                                  ;        TABLET SURFACE (OUT OF RANGE)
109                                  ;     2."EVAL" FOUND PEN SIGNAL TOO WEAK AND AT MIN RANGE (FOR
110                                  ;        MAX SENSITIVITY. (ERROR CONDITION, OUT OF RANGE)
111                                  ;     3."EVAL" FOUND PEN SIGNAL SATURATING AND ALREADY AT MAX
112                                  ;        RANGE FOR MIN SENSITIVITY. (ERROR CONDITION)
113                                  ;     4."EVAL" FOUND PEN SIGNAL TO VARY IN, OUT, AND BACK INTO
114                                  ;        PROX DURRING A SINGLE X OR Y SCAN (ERROR CONDITION)
115                                  ;     5."IRQ" (INTERRUPT RTN) FOUND SCANS WERE OUT OF SYNC
116                                  ;        (ERROR CONDITION, EXTERNAL COUNTER RESET- BEG OVER)
117   0028       GENFLG RMB   1      ;GENERAL FLAG BIT REG
118                                  ;B0=SET WHEN EVALUATING FIRST LINE (X0 OR Y0) ('EVAL' RTN)
119                                  ;B1=LAST SCAN WAS IN PROX (0=WAS OUT OF PROX)
120                                  ;   (USED TO DETERMINE WHETHER "PRVBIN" NEEDS RESETTING FOR
121                                  ;    TABLET MODE AVERAGING OR MOUSE MODE DELTA CALCULATION)
122                                  ;B2=2 (OR MORE) SEQUENTIAL SCANS WERE IN RANGE. USED DURRING
123                                  ;   'PSWSTA' RTN TO INDICATE VALID FREQ FOUND
124                                  ;B3=1ST DELTA CALCULATED (X & Y), DO 2ND NEXT ('MOUSE' RTN)
125                                  ;B4= UNUSED
126                                  ;B5=LAST PROCESSED PEN POSITION WAS IN THE "MENU" AREA.
```

```
127                                        ;     (0=IN ACTIVE AREA)
128                                        ;B6=PEN SWITCH STATUS HAS CHANGED SINCE PREV SCAN
129                                        ;B7=X OR Y RANGE WAS FOUND TO NEED ADJUSTMENT DURRING THIS
130                                        ;     "EVAL" SCAN. NOT CHECKED UNTIL AFTER COMPLETE SCAN (X & Y).
131                                        ;     INDICATES TO IGNORE CURRENT SCAN (SINCE RANGE NEEDED ADJ),
132                                        ;     BUT PEN STILL IN PROX (NOT AN "ERROR" CONDITION).
133  0029       BUDTIM  RMB    1           ;HOLDS NUMBER OF INTERRUPTS TO WAIT TO XMIT EACH BIT AT
134                                        ;THE SELECTED BAUD RATE. (2 CNTS=2400, 4=1200, 8=600, ETC)
135  002A       BUDCNT  RMB    1           ;COUNTS & THEN RELOADED W/ 'BUDTIM' VALUE
136  002B       BITCNT  RMB    1           ;COUNTS NUM OF BITS PER XMITTED CHAR (PLUS 1 START, 2 STOP)
137                                        ;CNTS BACKWARDS FROM $09 TO $FE
138  002C       CHRFOR  RMB    1           ;CHARACTER FORMAT- HOLDS # OF CHARS TO BE OUTPUT, DEPENDING
139                                        ;ON FORMAT SELECTED ('5' OR '10')
140  002D       XMTFLC  RMB    1           ;B0=XMIT IN PROGRESS
141                                        ;B1=TOGGLED TO CALC XMIT PARITY BIT.
142                                        ;B2-B6=UNUSED
143                                        ;B7=SET WHILE DOING 2ND TIMER INTRPT SCAN (FOR 'FREQ' INFO)
144  002E       XMTREG  RMB    1           ;HOLDS CURRENT CHAR BEING XMITTED
145  002F       XMTPTR  RMB    1           ;PTR TO NXT CHAR TO BE OUTPUTTED FROM 'XMTBUF'
146                                        ;NOTE:COUNTS BACKWARDS TO 0
147  0030       XMTBUF  RMB   10           ;STORES THE 5 OR 10 CHARS TO BE XMITED. (PTR CNTS BACKWARDS
148                                        ;SO THIS IS THE LAST POSITION OF THE BUFFER)
149  003A       TMPBUF  RMB   10           ;TEMP HOLDING BUFFER FOR NEW XMIT CHARS. WILL BE TRANFERRED
150                                        ;TO 'XMTBUF' WHEN ALL CHARS CURRENTLY THERE HAVE BEEN XMT.
151  0044       CURBIN  RMB    4           ;HOLDS BINARY PEN POSITION OF CURRENT SCN (LAST VALID SCAN)
152                                        ;CALCULATED. (+0=Y MSB, +1=Y LSB, +2= X MSB, +3=X LSB)
153  0048       PRVBIN  RMB    4           ;BIN PEN POSITION OF PREV SCAN (IN SAME ORDER AS 'CURBIN')
154                                        ;('CURBIN' AND 'PRVBIN' USED TO CALC "DELTA")
155  004C       TEMP    RMB    6           ;TEMP LOCATIONS USED DURRING MISC ROUTINES (GEN PURPOSE SCRATCH)
156  0052       STAFLC  RMB    1           ;PEN SWITCH STATUS (DECODED VIA 'PSWSTA' ROUTINE)
157                                        ;  B0=SW1 (PEN) DOWN,  B1=SW2, B2=SW3
158  0053       PROX0   RMB    1           ;PROXIMITY VALUE FOR RANGE 0 (OF FOR HIGH VALUES IN RANGE1)
159  0054       PROX1   RMB    1           ;PROX VALUE FOR RANGE 1 (INITIAL, MAY CHANGE TO "PROX0")
160                                        ;(PROX0 & PROX1 ARE CALCULATED IN THE "INITP" ROUTINE)
161                                        ;PROX0=PCON0+NOMINAL,   PROX1=PCON1+NOMINAL
162  0055       XPROX   RMB    1           ;PROX VALUE BEING USED FOR "X" SCAN (WILL=PROX0 OR PROX1)
163  0056       YPROX   RMB    1           ;PROX VALUE FOR "Y" SCAN (=PROX0 OR PROX1)
164  0057       PROXTV  RMB    1           ;PROX VALUE FOR X OR Y SCAN BEING DONE IN THE "EVAL" RTN
165  0058       SATTV   RMB    1           ;SATURRATION VALUE, DEPENDING ON WHAT RANGE IS SELECTED
166                                        ;(SEE "SAT0" & "SAT1" IN MISC EQUATE SECTION)
167  0059       RNG0    RMB    1           ;B0-B4=OFFSET CONTROL TO BE OUTPUT TO PORTA WHEN IN RANGE 0.
168                                        ;B5=SET TO "0" TO BE OUTPUT TO PORTA FOR RANGE 0.
169                                        ;B6-B7=ALWAYS 0
170  005A       RNG1    RMB    1           ;B0-B4=OFFSET CNTR TO BE OUTPUT TO PORTA WHEN IN RANGE 1.
171                                        ;B5=SET TO "1" TO BE OUTPUT TO PORTA FOR RANGE 1
172                                        ;-- (NOTE:NOMINAL OFFSET VALUES CALCULATED IN "INITP" RTN) --
173  005B       XRNG    RMB    1           ;LOADED W/"RNG0" OR "RNG1" DEPENDING ON RANGE SEL FOR X SCANS
174  005C       YRNG    RMB    1           ;LOADED W/ABOVE DEPENDING ON RANGE SEL FOR Y SCANS
175                                        ;NOTE:WHEN IN RNG1, THE OFFSET BITS (B0-B4) MAY BE CHANGED FROM
176                                        ;     THE NOMINAL "RNG1" VALUE AS PART OF THE RANGE CONTROL
177  005D       CURFC   RMB    1           ;CURRENT FREQ COUNT (FREQ FROM TIMER INPUT, READ FROM MAX Y
178                                        ;LINE DURRING 'FREQ' SCAN OF IRQ RTN)
179  005E       PRVFC   RMB    1           ;STORES PREV FREQ COUNT (USED DURRING 'PSWSTA' ROUTINE)
180  005F       FCSCNT  RMB    1           ;FREQUENCY SCAN COUNTER- COUNTS LINE # DURING 'FREQ' SCAN
181                                        ;OF THE IRQ INTERRUPT ROUTINE
182  0060       MENFLG  RMB    1           ;MENU MODE FLAGS
183                                        ;B0=PEN DOWN IN THE "ENA MENU" AREA (LOCATION 0)
184                                        ;B1=MENU MODE ENABLED(PEN DWN IN "ENA MENU" AREA FOR OVER .5 SEC)
185                                        ;B2=CURRENT MENU SELECTION COMPLETED
186                                        ;B3-4=UNUSED
187                                        ;-NON MENU MODE USAGE-
188                                        ;(B5-B7 USED AS TEMP FLGS FOR "TABLET", "MOUSE", & "DELTA" RTNS)
189                                        ;B5= DELTA IS NEGATIVE (0=POSITIVE)
190                                        ;B6= CURRENT DELTA (X OR Y) IS ZERO
191                                        ;B7= BOTH DELTAS (X & Y) ARE ZERO (NO CHANGE IN PEN POSITION).
192  0061       MENCNT  RMB    1           ;MENU MODE COUNTER
193                                        ;USED TO TIME-OUT PEN DOWN (.5 SEC) FOR ENA MENU, THEN USED
194                                        ;TO INDICATE WHICH MENU SELECTION IS NEXT:
195                                        ;00=MOUSE/TABLET (WITH JUMPER DEFAULT SETTINGS)
196                                        ;01=LO/HI RESOLUTION
197                                        ;02=LO/HI BAUD
198                                        ;03=FORMAT1/FORMAT4 (TABLET MODE ONLY)
199  0062       MODFLG  RMB    1           ;OPERATING MODE FLAG
200                                        ;B0-  0=MOUSE    1=TABLET
201                                        ;B1-  0=LO RES   1=HI RES
202                                        ;B2-  0=LO BAUD  1=HI BAUD
203                                        ;B3-  0=FORMAT1 1=FORMAT4  (TABLET MODE ONLY)
204                                        ;B4-B7 = "DON'T CARE" (UNUSED, BUT MAY BE 0 OR 1)
206                        ;  *** MISC EQUATES (IMMEDIATE VALUES) ***
207  0003       ADJCO   EQU   $03          ;ADD/SUBT FROM PORTA, BITS 0-4 TO ADJUST DC OFFSET
208  0001       BIT0    EQU   $01
209  0002       BIT1    EQU   $02
210  0004       BIT2    EQU   $04
211  0008       BIT3    EQU   $08
212  0010       BIT4    EQU   $10
213  0020       BIT5    EQU   $20
214  0040       BIT6    EQU   $40
215  0080       BIT7    EQU   $80
216  0004       BUD12   EQU   $04          ;COUNT SAVED IN "BUDTIM" FOR 1200 BAUD
217  0002       BUD24   EQU   $02          ;COUNT SAVED IN "BUDTIM" FOR 2400 BAUD
218  0005       CHR5    EQU   $05          ;5 CHAR FORMAT
219  000A       CHR10   EQU   $0A          ;10 CHAR FORMAT
220  00E9       CNTSNO  EQU   $E9          ;MD TIMER CNT FOR NO PEN SWITCHES DOWN (NOMINAL VALUE)
221  00E1       CNTS2   EQU   $E1          ;TIMER CNT- SW2 DOWN
222  00D9       CNTS3   EQU   $D9          ;  "    " - SW3 DOWN
223  00CF       CNTS1   EQU   $CF          ;  "    " - SW1 (PEN) DOWN
224  00C9       CNTS12  EQU   $C9          ;  "    " - SW1 & SW2 DOWN
```

```
225  0040                       DATBIT  EQU   BIT6       ;ENABLE "DATA" AS THE TIMER INPUT (PORTB, BIT6)
226  0006                       DATBIZ  EQU   6          ;SAME AS ABOVE, BUT USED IN BSET,BCLR,BRSET, & BRCLR INST.
227  001F                       DCOBIT  EQU   $1F        ;DC OFFSET ADJUSTMENT BITS OF PORTA (B0-B4)
228  0007                       DVBY2   EQU   $07        ;THESE 4 EQUATES USED BEFORE ENTERING "DELTA" RTN TO SELECT
229  000A                       DVBY4   EQU   $0A        ;THE AMOUNT OF "JITTER AVERAGING" (DIVIDE BY 2,4,8,OR 16).
230  000C                       DVBY8   EQU   $CC        ;NOTE THAT VALUES ARE SHIFTED RGT UNTIL CARRY SET FOR 1 CNTR
231  0008                       DVBY16  EQU   $C8        ;IN RTN, AND REMAINING BITS USED DIRECTLY AS ANOTHER CNTR.
232  0009                       FCSRST  EQU   $09        ;VALUE USED TO RESET THE FREQ SCAN CNT REG ('FQSCNT')
233  0080                       FRQBIT  EQU   BIT7       ;ENA FREQ AS TIMER INPUT (PORTB, BIT7)
234  0007                       FRQBIZ  EQU   7          ;SAME AS ABOVE, BUT USED IN BSET,BCLR,BRSET, & BRCLR INST.
235  0020                       GRDBIT  EQU   BIT5       ;THE INHIBIT GRID OUTPUT BIT OF PORTB (BIT5)
236  0005                       GRDBIZ  EQU   5          ;SAME AS ABOVE,BUT USED IN BSET,BCLR,BRSET,& BRCLR INST
237  0001                       MAXC2   EQU   $01        ;THESE 4 EQUATES USED IN CONJUCTION WITH 'DVBY2' THRU
238  0002                       MAXC4   EQU   $02        ;'DVBY16' (SHOWN ABOVE) IN ORDER TO SELECT AMT OF JIT AVE.
239  0003                       MAXC8   EQU   $03        ;USED TO REPRESENT THE MAX "CARRY" TO CALC PROPER AVERAGING
240  0004                       MAXC16  EQU   $04        ;WHETHER DOING DIV BY 2,4,8,OR 16.
241  0012                       MENTIM  EQU   $12        ;TIME-OUT CNT FOR PEN DWN TO ENA MENU MODE (APPROX .5 SEC)
242  0008                       NOM     EQU   $08        ;NOMINAL LINE SIGNAL W/GRID INPUTS DISA (USED TO CHK DC OFFSET)
243  0050                       PCON0   EQU   $50        ;CONSTANT FOR PROXIMITY OF RANGE0 (PROX0=PCON0+NOMINAL)
244  0028                       PCON1   EQU   $28        ;CONSTANT FOR PROX OF RANGE1 (PROX1=PCON1+NOMINAL)
245  0020                       RNGBIT  EQU   BIT5       ;RANGE CONTROL BIT OF PORTA (BIT # 5)
246  0005                       RNGBIZ  EQU   5          ;SAME AS ABOVE, BUT USED IN BSET,BCLR,BRSET, & BRCLR INST.
247  0040                       RSTBIT  EQU   BIT6       ;RESET EXT CNTR BIT OF PORTA (BIT # 6)
248  0006                       RSTBIZ  EQU   6          ;SAME AS ABOVE, BUT USED IN BSET,BCLR,BRSET, & BRCLR INST.
249  00C0                       RCRST   EQU   $C0        ;.AND. W/ PORTA TO RESET RANGE & OFFSET BITS
250  00D8                       SAT0    EQU   $D8        ;TIMER DATA FOR PEN SIGNAL SATURATION IN RANGE 0.
251  00F0                       SAT1    EQU   $F0        ;PEN SIGNAL SATURATION LEVEL IN RANGE 1.
252  0050                       XMLEN   EQU   $50        ;LENGTH OF & INBETWEEN EACH MENU SELECT AREA (X DIRECTION)
253  0000                       XMLOC0  EQU   $000       ;BEGINNING OF MENU LOCATION 0, X DIRECTION
254  00A0                       XMLOC1  EQU   $0A0       ;BEGINNING OF MENU LOCATION 1, X DIR
255  0140                       XMLOC2  EQU   $140       ;BEGINNING OF MENU LOCATION 2, X DIR
256  04B1                       YMLOC   EQU   $4B1       ;BEGINNING OF MENU AREA, Y DIRECTION
258                             ;*********** MCR & INTERRUPT VECTORS ***********
259                                     ORG   $1FF5
260  1FF5 10                            FCB   BIT4       ;MASK OPTION REG.
261                                                     ;NOTE:FOR E-PROM PROCESSOR, MOTOROLA HAS PROBLEM & B4 IS ALWAYS
262                                                     ;     SET TO '1', & B6 IS ALWAYS SET TO '0'. FOR MASKED VERSION,
263                                                     ;     (PRODUCTION UNITS) WE WILL WANT B4=0, B6=1
264                                                     ;B0-B3=UNUSED
265                                                     ;B4=IRQ INTERRUPT SELECT
266                                                     ;   0=NEG EDGE ONLY    1=NEG EDGE/NEG LEVEL SENSITIVE
267                                                     ;B5=UNUSED
268                                                     ;B6=DIVISOR FOR INPUTED CLOCK OR XTAL
269                                                     ;   0=DIV BY 4         1=DIV BY 2
270                                                     ;B7=CLOCK INPUT
271                                                     ;   0=XTAL/CLOCK       1=RC OSC
272  1FF6
273  1FF6 03 71                         FDB   IRQEX      ;TIMER INTRPT VECTOR FROM WAIT STATE (UNUSED)
274  1FF8 03 71                         FDB   IRQEX      ;NORMAL TIMER INTRPT VECTOR (UNUSED)
275  1FFA 02 8A                         FDB   IRQ        ;IRQ (EXTERNAL) INTRPT VECTOR.
276                                                     ;EXT INTRPT ACTIVATED BY EXTERNAL COUNTER AT A PRE-
277                                                     ;SET INTERVAL. (4800 HZ RATE)
278  1FFC 03 71                         FDB   IRQEX      ;SWI (SOFTWARE INTRPT VEC, UNUSED)
279  1FFE 01 80                         FDB   INIT       ;HARDWARE RESET- INITIALIZE
280                             ;
281                             ;
282                             ;
283
284                             ;************** PEN POSITION ERROR CORRECTION TABLE ***************
285                             ;CORRECTS FOR THE "S" CURVE ERROR IN THE CALCULATED LSB OF PEN POSITION
286                             ;(NOTE:UNUSED AT PRESENT TIME. IF USED, CALLED FROM "CALC11" ROUTINE)
287                             ;*****************************************************************
288                                     ORG   $80
289  0080 00 01 01 02            LSBTBL: FCB   $00,$01,$01,$02,$02,$03,$03,$04    ;$00 - $07
290  0084 02 03 03 04
291  0088 04 05 05 06                    FCB   $04,$05,$05,$06,$06,$07,$08,$08    ;$08 - $0F
292  008C 06 07 08 08
293  0090 09 09 0A 0A                    FCB   $09,$09,$0A,$0A,$0B,$0C,$0C,$0D    ;$10 - $17
294  0094 0B 0C 0C 0D
295  0098 0D 0E 0E 0F                    FCB   $0D,$0E,$0E,$0F,$10,$11,$11,$12    ;$18 - $1F
296  009C 10 11 11 12
297  00A0 12 13 14 15                    FCB   $12,$13,$14,$15,$16,$16,$17,$18    ;$20 - $27
298  00A4 16 16 17 18
299  00A8 19 19 1A 1B                    FCB   $19,$19,$1A,$1B,$1B,$1C,$1C,$1D    ;$28 - $2F
300  00AC 1B 1C 1C 1D
301  00B0 1D 1E 1E 1F                    FCB   $1D,$1E,$1E,$1F,$20,$20,$21,$22    ;$30 - $37
302  00B4 20 20 21 22
303  00B8 22 23 23 24                    FCB   $22,$23,$23,$24,$24,$25,$26,$26    ;$38 - $3F
304  00BC 24 25 26 26
305  00C0 27 28 29 2A                    FCB   $27,$28,$29,$2A,$2L,$2C,$2D,$2E    ;$40 - $47
306  00C4 2B 2C 2D 2E
307  00C8 2F 30 31 32                    FCB   $2F,$30,$31,$32,$33,$34,$35,$36    ;$48 - $4F
308  00CC 33 34 35 36
309  00D0 38 39 3A 3B                    FCB   $38,$39,$3A,$3B,$3C,$3D,$3E,$40    ;$50 - $57
310  00D4 3C 3D 3E 40
311  00D8 41 42 43 44                    FCB   $41,$42,$43,$44,$45,$47,$48,$49    ;$58 - $5F
312  00DC 45 47 48 49
313  00E0 4B 4C 4D 4F                    FCB   $4B,$4C,$4D,$4F,$51,$52,$54,$56    ;$60 - $67
314  00E4 51 52 54 56
315  00E8 57 59 5A 5C                    FCB   $57,$59,$5A,$5C,$5D,$5E,$60,$62    ;$68 - $6F
316  00EC 5D 5E 60 62
317  00F0 63 65 67 69                    FCB   $63,$65,$67,$69,$6B,$6E,$71,$73    ;$70 - $77
318  00F4 6B 6E 71 73
319  00F8 75 77 78 79                    FCB   $75,$77,$78,$79,$7B,$7C,$7D,$7F    ;$78 - $7F
320  00FC 7B 7C 7D 7F
321  0100 80 82 84 86                    FCB   $80,$82,$84,$86,$88,$8A,$8C,$8F    ;$80 - $87
322  0104 88 8A 8C 8F
```

```
323  0108 91 93 95 97            FCB   $91,$93,$95,$97,$99,$9B,$9D,$9E      ;$88 - $8F
324  010C 99 9B 9D 9E
325  0110 9F A0 A2 A3            FCB   $9F,$A0,$A2,$A3,$A4,$A6,$A7,$A9      ;$90 - $97
326  0114 A4 A6 A7 A9
327  0118 AA AC AE B0            FCB   $AA,$AC,$AE,$B0,$B2,$B2,$B4,$B6      ;$98 - $9F
328  011C B2 B2 B4 B6
329  0120 B8 BA BB BD            FCB   $B8,$BA,$BB,$BD,$BF,$C0,$C1,$C2      ;$A0 - $A7
330  0124 BF C0 C1 C2
331  0128 C3 C4 C5 C6            FCB   $C3,$C4,$C5,$C6,$C7,$C8,$C9,$CA      ;$A8 - $AF
332  012C C7 C8 C9 CA
333  0130 CB CC CD CE            FCB   $CB,$CC,$CD,$CE,$CE,$CF,$D0,$D1      ;$B0 - $B7
334  0134 CE CF D0 D1
335  0138 D2 D3 D3 D4            FCB   $D2,$D3,$D3,$D4,$D5,$D5,$D6,$D7      ;$B8 - $BF
336  013C D5 D5 D6 D7
337  0140 D8 D9 DA DB            FCB   $D8,$D9,$DA,$DB,$DB,$DC,$DC,$DD      ;$C0 - $C7
338  0144 DB DC DC DD
339  0148 DE DF DF E0            FCB   $DE,$DF,$DF,$E0,$E1,$E1,$E2,$E3      ;$C8 - $CF
340  014C E1 E1 E2 E3
341  0150 E4 E4 E5 E6            FCB   $E4,$E4,$E5,$E6,$E6,$E7,$E7,$E8      ;$D0 - $D7
342  0154 E6 E7 E7 E8
343  0158 E9 EA EA EB            FCB   $E9,$EA,$EA,$EB,$EC,$ED,$ED,$EE      ;$D8 - $DF
344  015C EC ED ED EE
345  0160 EF EF F0 F0            FCB   $EF,$EF,$F0,$F0,$F1,$F2,$F2,$F3      ;$E0 - $E7
346  0164 F1 F2 F2 F3
347  0168 F4 F4 F5 F5            FCB   $F4,$F4,$F5,$F5,$F6,$F6,$F7,$F7      ;$E8 - $EF
348  016C F6 F6 F7 F7
349  0170 F8 F8 F9 F9            FCB   $F8,$F8,$F9,$F9,$FA,$FA,$FB,$FB      ;$F0 - $F7
350  0174 FA FA FB FB
351  0178 FC FC FD FD            FCB   $FC,$FC,$FD,$FD,$FE,$FE,$FF,$FF      ;$F8 - $FF
352  017C FE FE FF FF
354                        ;-- BEGIN FILE 'SER02.ASM' --
355                        ;*********  BEGINNING OF PROGRAM  *********
356                              ORG   $180
357                        ;
358                        ;INITIALIZE PORTS & RAM REGS
359                        ;
360  0180 9B               INIT: SEI
361  0181 4F                     CLRA
362  0182 97                     TAX                ;SET A & X=0 TO COUNT FOR DELAY
363  0183 5A               INIT1: DECX              ;THIS DELAY IS DONE TO MAKE SURE THE ANALOG CIRCUIT
364  0184 26 FD                  BNE   INIT1        ;IS UP & RUNNING PROPERLY BEFORE THE OFFSET VALUES ARE
365  0186 4A                     DECA               ;CALCULATED IN THE 'INITP' ROUTINE.
366  0187 26 FA                  BNE   INIT1
367  0189 F7               INIT2: STA   ,X          ;CLEAR ALL PORTS, REGS, AND RAM ($00-$7F)
368  018A 5C                     INCX
369  018B 2A FC                  BPL   INIT2
370  018D A6 58                  LDA   #$58        ;PRESCALER= DIV BY 1, RESET PRESCALER, SET TIMER
371  018F B7 09                  STA   TCREG       ;INPUT TO 'AND' W/INT CLK, DISA TIMER, CLR OVRFLW
372  0191 A6 40                  LDA   #RSTBIT
373  0193 B7 00                  STA   PORTA       ;PORTA 'RESET' BIT HIGH, OTHERS LOW
374  0195 AE FF                  LDX   #$FF
375  0197 BF 04                  STX   PORTA+DDR   ;PORTA = ALL OUTPUT
376  0199 BF 08                  STX   TDREG       ;RESET TIMER DATA REG TO MAX
377  019B A6 60                  LDA   #(GRDBIT).OR.(DATBIT)
378  019D B7 01                  STA   PORTB       ;INHIBIT "X" GRID LINES, ENA DATA(NOT FREQ) AS TIMER INPUT
379  019F A6 F8                  LDA   #$F8
380  01A1 B7 05                  STA   PORTB+DDR   ;B0-B2=INPUT, REMAINDER OF PORTB= OUTPUT
381  01A3 B6 02                  LDA   PORTC       ;INPUT JUMPER SWITCHES (POWER-UP DEFAULT MODE SELECTIONS)
382  01A5 B7 06                  STA   PORTC+DDR   ;SET ANY "OPEN" JUMPER INPUT TO OUTPUT PORT(CMOS STABILITY)
383  01A7 0F 06 02               BRCLR 7,PORTC+DDR,INIT3   ;JMP=PEN IS DETACHED (SET PORTD=ALL OUTPUT)
384  01AA AE F8                  LDX   #$F8        ;SET PORTD D0-B2=INPUT (PEN SWITCHES INPUT FOR ATTACHED PEN)
385  01AC BF 07               INIT3: STX   PORTD+DDR   ;OUTPUT(UNUSED)IF PEN DETACHED,B0-2 INPUT IF ATTACHED
386  01AE CD 05 D4                JSR   NSEL1C      ;INIT "MODFLG", "CHRFOR", & "BUDTIM" W/DEFAULT SETTINGS
387                                                ;FROM JUMPER INPUTS TO PORTC
388  01B1 BF 2F                  STX   XMTPTR      ;SET "XMTPTR"="CHRFOR" (5 OR 10, DEPENDING ON SEL FORMAT)
389  01B3 3A 2B                  DEC   BITCNT      ;INIT TO $FF  (CAUSE START BIT TO XMIT 1ST)
390  01B5 3C 2A                  INC   BUDCNT      ;BEGINS THE BAUD XMIT SEQ DURRING "ODD" NUMBERED INTRPTS
391  01B7 A6 06                  LDA   #$06        ;(SCAN & XMIT WILL NEVER OCCUR DURRING THE SAME INTRPT TIME)
392  01B9 B7 20                  STA   SCNCNT      ;1ST SCAN IN 6 INTRPTS, REMAINING 15 EVERY 4 INTRPTS
393  01BB A6 0F                  LDA   #$0F
394  01BD B7 21                  STA   TDINF
395  01BF B7 22                  STA   TDOUTP      ;INIT TIMER DATA BUFFER PTRS
396  01C1 10 28                  BSET  0,GENFLG    ;SET FLG FOR 'EVAL' RTN (CHKING 1ST LINE, X0)
397  01C3 A6 D8                  LDA   #SATC
398  01C5 B7 58                  STA   SATTV       ;INIT SATURATION LEVEL (FOR RANGE 0)
399  01C7 A6 09                  LDA   #FCSFST
400  01C9 B7 5F                  STA   FCSCNT      ;RESET FREQ SCAN COUNT REG
401  01CB 1D 00                  BCLR  RSTBIT,PORTA  ;SET EXTERNAL "RESET" LINE LOW (BEGIN EXT COUNTER)
402                        ;
403                        ;
404                        ;
405                        ;
406                        ;--------  INITIALIZE DC OFFSET CONTROL & PROXIMITY REGISTERS  --------
407                        ;THE DC OFFSET IS ADJUSTED SUCH THAT THE NOMINAL TIMER VALUES (LINE SIGNALS
408                        ;WITH NO PEN INPUT) ARE BETWEEN $06 & $16 COUNTS (APPROX). THE GRID INPUTS
409                        ;ARE INHIBITED UPON ENTERING THIS RTN (VIA SET OF B5 OF PORTB). THIS RTN.
410                        ;WILL READ AND ADD THE 8 DISABLED GRID LINES (X0 - X7), TAKE THE AVERAGE VALUE
411                        ;OF THE LINES (DIV BY 8) AND ADJUST THE OFFSET CONTROL BITS FOR THIS NOMININAL
412                        ;SETTING (THIS IS DONE SEPARATELY FOR RANGE0 AND RANGE1).THE "PROXIMITY"
413                        ;VALUES ARE THEN CALCULATED DEPENDING ON THE EXACT NOMINAL LINE VALUE READ
414                        ;AFTER THE OFFSET IS ADJUSTED. (A CONSTANT IS ADDED, DEPENDING ON THE RANGE).
415                        ;RANGE 1 PROX IS LESS IN ORDER TO PROVIDE FOR HYSTORESIS BETWEEN THE 2 RANGES.
416                        ;THIS ROUTINE INITIALIZES THE FOLLOWING RAM LOCATIONS:
417                        ;       RNG0, RNG1, XRNG, YRNG, PROXC, PROX1, XPROX, YPROX, PROXTV
418                        ;    (FINISHES BY SETTING PORTA W/RNG0, & ENABLING PORTB GRDBIT)
419                        ;THE FOLLOWING TEMPORARY LOCATIONS ARE USED:
420  004F              TPORTA SET  TEMP+3  ;USED TO TEMP STORE PORTA VALUES. IT IS OUTPUT TO
```

```
421                                        ;PORTA BEFORE EACH SCAN (CAN'T USE PORTA DIRECTLY SINCE
422                                        ;IT IS CHANGED IN THE INTRPT RTN @ BEGINNING OF "Y" SCAN).
423   004E            TFLAG   SET  TEMP+2  ;TEMP FLAG REG
424                                        ;B0=ADDING THE 8 "X" LINES TO CALC THE AVERAGE NOMINAL VAL
425                                        ;    (0=DOING INCR OF DC OFFSET UNTIL LINE FOUND AT 0)
426                                        ;B1=LINE FOUND AT 0 (DURRING CHK W/E0=0)
427   004D            MSBSUM  SET  TEMP+1  ;HOLDS MSB OF THE SUM OF THE 8 "X" LINES
428   004C            LSBSUM  SET  TEMP    ;LSB (AND THEN AVERAGED VALUE) OF THE 8 "X" LINES
429              ;
430   01CD B6 00              LDA  PORTA
431   01CF B7 4F              STA  TPORTA  ;SAVE PORTA
432   01D1 9A                 CLI          ;ENABLE INTERRUPTS ('IRQ')
433   01D2 B6 4F      INITP:  LDA  TPORTA
434   01D4 B7 00              STA  PORTA   ;MAKE SURE PORTA OFFSET & RANGE IS SET PROPERLY
435   01D6 B6 22              LDA  TDOUTP
436   01D8 97                 TAX
437   01D9 8F        INP1:    WAIT         ;LOW POWER MODE-WAIT UNTIL IRQ INTRPT
438   01DA B1 21              CMP  TDINP
439   01DC 27 FB              BEQ  INP1    ;LOOP UNTIL INTRPT ('IRQ') RTN GETS SIGNAL FOR A LINE
440   01DE 3A 22              DEC  TDOUTP
441   01E0 2E 1B              BMI  INP3    ;JMP=DONE W/SCAN OF ALL 16 LINES
442   01E2 B6 22              LDA  TDOUTP
443   01E4 A1 07              CMP  #$07
444   01E6 23 EA              BLS  INITP   ;JMP=DOING LAST 8 LINES, IGNORE THEM
445   01E8 E6 10              LDA  TLBUF,X ;GET THE TIMER DATA (LINE SIGNAL/SCAN DATA)
446   01EA 00 4E 06           BRSET 0,TFLAG,INP2 ;JMP=ADDING LINES FOR AVERAGE
447   01ED 26 E3              BNE  INITP   ;JMP=0 LINE NOT FOUND YET, KEEP CHKING
448   01EF 12 4E              BSET 1,TFLAG ;ZERO LINE FOUND SO OFFSET TOO HIGH, SET FLG
449   01F1 20 DF              BRA  INITP
450   01F3 BB 4C      INP2:   ADD  LSBSUM  ;ADD 8 LINES TO GET AVERAGE NOMINAL VALUE
451   01F5 B7 4C              STA  LSBSUM  ;LSB OF SUM
452   01F7 24 D9              BCC  INITP
453   01F9 3C 4D              INC  MSBSUM  ;ADJUST MSE
454   01FB 20 D5              BRA  INITP
455   01FD A6 0F      INP3:   LDA  #$0F
456   01FF B7 22              STA  TDOUTP  ;RESET TD OUTPUT PTR TO BEG OF BUFFER
457   0201 0E 27 56           BRSET 7,EVFLG,INP13 ;JMP=SCAN ERROR FOUND IN INTRPT (OUT OF SYNC)
458   0204 00 4E 17           BRSET 0,TFLAG,INP7  ;JMP=FINDING NOMINAL VALUE FOR PROX CALC
459   0207 B6 4F              LDA  TPORTA  ;DROP THRU=CHKING FOR 0 LINES (BY INCR DC OFFSET ADJ)
460   0209 A4 1F              AND  #DCOBIT ;GET CURRENT DC OFFSET
461   020B C2 4E 08           BRSET 1,TFLAG,INP4  ;JMP=LINE FOUND=0, SO OFFSET TOO HIGH
462   020E A1 1F              CMP  #DCOBIT ;OFFSET AT MAX?
463   0210 27 06              BEQ  INP6    ;JMP=YES
464   0212 3C 4F              INC  TPORTA  ;INCREASE DC OFFSET
465   0214 20 BC              BRA  INITP   ;SCAN GRID LINES AGAIN
466   0216 27 02      INP4:   BEQ  INP6    ;JMP=OFFSET IS 0, SO THIS IS AS CLOSE AS WE CAN GET!
467   0218 3A 4F              DEC  TPORTA  ;DEC OFFSET (ADJUST SO NO LINES ARE "0".)
468   021A 10 4E      INP6:   BSET 0,TFLAG ;SET FLG= NOW CALCULATING NOMINAL LINE VALUES
469   021C 20 B4              BRA  INITP   ;CALC THE PROX VALUES
470   021E AE 03      INP7:   LDX  #$03    ;CNTR FOR DIV BY 8
471   0220 34 4D      INP8:   LSR  MSBSUM  ;DIV SUM BY 2
472   0222 36 4C              ROR  LSBSUM
473   0224 5A                 DECX
474   0225 26 F9              BNE  INP8    ;DIV BY 8 TO GET AVERAGE NOMINAL VALUE OF THE 8 LINES CHKED
475   0227 24 02              BCC  *+4     ;JMP=BELOW 1/2 OF NEXT #
476   0229 3C 4C              INC  LSBSUM  ;ROUND (UP) TO NXT LARGER #
477   022B B6 4C              LDA  LSBSUM  ;*** JMP HERE FROM ABOVE *** GET AVERAGE (NOMINAL) LINE VAL
478   022D A1 08              CMP  #NOM
479   022F 22 0A              BHI  INP10   ;JMP=NOMINAL VALUE IS IN PROPER RANGE
480   0231 B6 4F              LDA  TPORTA
481   0233 A4 1F              AND  #DCOBIT
482   0235 27 04              BEQ  INP10   ;JMP=AT MIN OFFSET, SO THIS WILL HAVE TO DO!
483   0237 3A 4F              DEC  TPORTA  ;DECR OFFSET TO INCREASE NOMINAL LINE VALUE
484   0239 20 2E              BRA  INP14   ;CLR REGS & SCAN AGAIN
485   023B B6 4F      INP10:  LDA  TPORTA
486   023D A4 3F              AND  #(RNGBIT).OR.(DCOBIT) ;GET CURRENT RANGE & DC OFFSET ADJ
487   023F CA 4F 2B           BRSET RNGBI2,TPORTA,INP15 ;JMP=JUST COMPLETED CALC FOR RANGE1
488   0242 E7 59              STA  RNG0    ;SAVE RANGE & DC OFFSET FOR RANGE 0
489   0244 B7 5B              STA  XRNG
490   0246 B7 5C              STA  YRNG
491   0248 B6 4C              LDA  LSBSUM  ;RECALL NOMINAL LINE VALUE FOR THIS RANGE
492   024A AB 5C              ADD  #PCON0  ;ADD CONSTANT FOR RANGE0
493   024C 25 02              BCS  INP11   ;JMP=OVER MAX PROX ALLOWED
494   024E 2A 02              BPL  INP12   ;JMP=PROX0 OK
495   0250 A6 80      INP11:  LDA  #$80    ;DON'T SET PROX0 ABOVE 1/2 RANGE
496   0252 B7 53      INP12:  STA  PROX0   ;SAVE VALUES FOR PROX 0 (INITIAL RANGE)
497   0254 B7 55              STA  XPROX
498   0256 B7 56              STA  YPROX
499   0258 B7 57              STA  PROXTV
500   025A 1A 4F              BSET RNGBI2,TPORTA ;PREPARE TO CHK & ADJ OFFSET & NOM VAL FOR RANGE 1
501   025C B6 4F      INP13:  LDA  TPORTA
502   025E A4 E0              AND  #.NOT.DCOBIT ;RESET DC OFFSET TO 0
503   0260 B7 4F              STA  TPORTA
504   0262 3F 5E              CLR  EVFLG   ;CLR SCAN ERROR FLG
505   0264 3F 4E              CLR  TFLAG   ;CLR B0 & B1 FLGS
506   0266 3F 4D      INP14:  CLR  MSBSUM  ;CLR MSB OF SUM
507   0268 3F 4C              CLR  LSBSUM  ;CLR LSB (& AVERAGED VALUE) OF LINES
508   026A CC 01 D2           JMP  INITP   ;SCAN AGAIN
509   026D B7 5A      INP15:  STA  RNG1    ;SAVE DC OFFSET AND RANGE CNTRL BIT FOR RANGE1
510   026F B6 4C              LDA  LSBSUM
511   0271 AB 28              ADD  #PCON1  ;CALC PROX FOR RANGE1
512   0273 25 04              BCS  INP16
513   0275 A1 50              CMP  #$50
514   0277 23 02              BLS  INP17
515   0279 A6 50      INP16:  LDA  #$50    ;LOWEST NOMINAL VALUE FOR RANGE1
516   027B B7 54      INP17:  STA  PROX1
517   027D B6 4F              LDA  TPORTA
```

```
518  027F A4 C0                 AII     #PORST
519  0261 BA 59                 ORA     RNG0        ;SET PORTA FOR RANGE 0 TO BEGIN 1ST SCAN
520  0263 E7 00                 STA     PORTA       ;(SET ACTUAL PORT)
521  0265 1B 01                 BCLR    GRDBIZ,PORTB ;ENABLE GRID INPUTS FOR PEN SIGNAL READING
522  0267 CC 03 72               JMP     SPARE       ;BEGIN MAIN PROGRAM
523
524  026A
525              ;************ INTERRUPT ROUTINE (IRC ONLY INTERRUPT USED) ****************
526              ;IRC INTRPT CAUSED BY EXTERNAL COUNTER AT A 4800 HZ RATE (EVERY 208 MICRO SEC).
527              ;INTERRUPT FUNCTION:
528              ;     1. CHK AND OUTPUT (XMIT) DATA BITS IF IT IS TIME AND IF THERE IS ANYTHING
529              ;        TO XMIT. WILL ALSO CALC & XMIT THE ODD PARITY BIT IF IN "TABLET" MODE.
530              ;            NOTE:   MAX XMIT SPEED =1/2 INTRPT RATE= 2400 BAUD
531              ;     2. TIMER DATA FROM SCANS WILL BE VALID EVERY 4 INTERRUPTS. AT THE PROPER
532              ;        TIME, THIS DATA WILL BE READ AND STORED IN THE 'TDBUF' FOR EVALUATION
533              ;        DURRING SPARE TIME. (EACH TIMER DATA REPRESENTS THE SIGNAL COUNT
534              ;        FROM ONE MAJOR LINE). THERE ARE 16 MAJOR LINES SCANNED (9 FOR "X",
535              ;        7 FOR "Y"), AND THEN THE 'SCNCNT' IS SET TO IGNORE THE NEXT 8 LINES.
536              ;        (THE IGNORED SCAN TIME ALLOWS THE PROGRAM ENOUGH TIME TO CALC & FORMAT
537              ;        PEN POSITION BEFORE A NEW DATA SCAN BEGINS). PORTB B6 & B7 ARE THEN SET
538              ;        TO ENABLE THE TIMER INPUT FOR PEN 'FREQ' (INSTEAD OF PEN DATA). THE RE-
539              ;        MAINING LINES ARE CHKED, AND THE FREQUENCY FROM THE MAXIMUM 'Y' LINE IS
540              ;        SAVED, FOR DECODING OF THE PEN SWITCH INFO. PORTB & THE TIMER REG ARE
541              ;        THEN SET TO ENABLE THE 'DATA' SCAN AGAIN.
542              ;            NOTE:   THE TIMER DATA READ (DATA OR FREQ INPUT) AND THE XMIT OUTPUT
543              ;                    ARE NEVER ALLOWED TO OCCUR DURING THE SAME INTERRUPT TIME, SINCE
544              ;                    THIS WOULD CAUSE WORST CASE INTERRUPT TIMING TO EXCEED THE MAX
545              ;                    208 MICRO SEC IRC TIME. IT IS FOR THIS REASON THAT THE MAX XMIT
546              ;                    SPEED CAN ONLY BE 1/2 THE IRC INTRPT SPEED.
547              ;     3. AFTER THE 16 DATA LINES ARE SCANNED, THE SOFTWARE COUNT REGS AND EXT
548              ;        COUNTER ARE CHKED TO ASSURE THEY ARE 'IN SYNC' (VIA B0-2 OF PORTB).
549              ;        (THERE IS STILL A 1 OF 8 CHANCE THAT, EVEN IF THE 3 BITS LOOK CORRECT,
550              ;        THE EXT COUNTER MAY STILL BE OUT OF SYNC. WE WILL HAVE TO LIVE WITH
551              ;        THIS!). IF THIS CHECK SHOWS THEM TO BE OUT OF SYNC, A NEW 'RESET' PULSE
552              ;        IS GENERATED TO THE EXT CNTR (VIA PORTA BIT6),AND THE SOFTWARE CNTRS
553              ;        AND REGISTERS ARE INIT APPROPRIATELY. (WILL NOT PULSE THE RESET LINE
554              ;        UNTIL ANY XMIT IN PROGRESS IS DONE). IF IN SYNC, THEN THE 'SCNCNT' IS
555              ;        SET FOR 32 TO IGNORE THE NEXT 8 LINES, THEN THE FREQ SCAN IS DONE ON
556              ;        THE "Y" LINES. (AS DESCRIBED IN '2.' ABOVE)
557              ;*******************************************************************************
558  026A 3A 2A          IRC:    DEC     BUDCNT
559  026C 26 51                  BNE     IRCDTA      ;JMP=NOT TIME TO XMIT A BIT
560  026E B6 29                  LDA     BUDTIM
561  0290 B7 2A                  STA     BUDCNT      ;RESET BAUD RATE COUNTER
562  0292 01 2D 4A                BRCLR   0,XMTFLG,IRCDTA ;JMP=NOTHING TO XMIT
563  0295 3A 2B                  DEC     BITCNT      ;CHK WHICH BIT IS TO BE XMITTED
564  0297 2E 0E                  BMI     IRC2        ;JMP=2ND STOP BIT, START BIT, OR DONE
565  0299 27 C1                  BEQ     IRC1        ;JMP=XMIT 1ST STOP BIT
566  029B 36 2E                  ROR     XMTREG      ;ROTATE NEXT BIT FOR XMIT INTO THE CARRY FLG
567  029D 25 2A                  BCS     IRC4        ;JMP=BIT IS HIGH ("MARK")
568  029F 1E 00                  BSET    7,PORTA     ;SET XMIT BIT TO "SPACE"      -XMIT "SPACE" DATA BIT-
569  02A1 20 2E                  BRA     IRC5        ;CHK IF TIME TO SET PARITY BIT
570  02A3 1F 00          IRC1:   BCLR    7,PORTA     ;SET XMIT BIT TO "MARK"       -XMIT 1ST STOP BIT-
571  02A5 20 38                  BRA     IRCDTA
572  02A7 B6 2E          IRC2:   LDA     BITCNT
573  02A9 A1 FF                  CMP     #$FF        ;2ND STOP BIT, START BIT, OR DONE?
574  02AB 27 32                  BEQ     IRCDTA      ;JMP=LEAVE AS IS              -XMIT 2ND STOP BIT-
575  02AD 3A 2F                  DEC     XMTPTR
576  02AF 2B 10                  BMI     IRC3        ;JMP=DONE W/THIS BATCH OF XMIT CHARS
577  02B1 1E 00                  BSET    7,PORTA     ;SET XMIT BIT TO "SPACE"      -XMIT START BIT-
578  02B3 A6 09                  LDA     #$09
579  02B5 B7 2B                  STA     BITCNT      ;RESET XMIT BIT CNTR FOR NEXT CHAR
580  02B7 BE 2F                  LDX     XMTPTR      ;(TO XMIT START BIT, 8 BITS, 2 STOP BITS)
581  02B9 E6 30                  LDA     XMTBUF,X    ;GET NXT CHAR TO XMIT
582  02BB B7 2E                  STA     XMTREG
583  02BD 12 2D                  BSET    1,XMTFLG        ;SET IN CASE IN TABLET MODE- WILL CAUSE "ODD" PARITY
584                                                  ;(CLEAR B1 HERE TO CAUSE 'EVEN' PARITY)
585  02BF 20 1E                  BRA     IRCDTA
586  02C1 B6 2C          IRC3:   LDA     CHRFCR      ;# OF CHARS TO BE XMIT (DEPENDING ON XMIT FORMAT)
587  02C3 B7 2F                  STA     XMTPTR      ;SAVE AS PTR TO XMIT BUFFER
588  02C5 11 2D                  BCLR    0,XMTFLG        ;RESET 'XMIT IN PROGRESS' FLG
589  02C7 20 16                  BRA     IRCDTA
590  02C9 1F 00          IRC4:   BCLR    7,PORTA     ;SET XMIT BIT TO "MARK"       -XMIT "MARK" DATA BIT-
591  02CB B6 2D                  LDA     XMTFLG
592  02CD A8 02                  EOR     #BIT1       ;TOGGLE 'PARITY' BIT FLAG
593  02CF B7 2D                  STA     XMTFLG      ;SAVE IT
594  02D1 B6 2B          IRC5:   LDA     BITCNT
595  02D3 A1 02                  CMP     #02         ;BIT6 JUST XMITTED?
596  02D5 26 08                  BNE     IRCDTA      ;JMP=NO (BIT7 PARITY BIT NOT NEXT)
597  02D7 03 2D 05                BRCLR   1,XMTFLG,IRCDTA ;JMP=KEEP B7 @ SPACE FOR PROPER ODD PARITY
598  02DA 01 62 02                BRCLR   0,MODFLG,IRCDTA ;JMP=IN "MOUSE" MODE (PARITY DISABLED)
599  02DD 10 2E                  BSET    0,XMTREG        ;SET NXT XMIT BIT TO "MARK" FOR PROPER ODD PARITY
600                                                  ;DROP THRU TO "IRCDTA" ROUTINE
601                      ;
602                      ;
603              ;******  CHK FOR XY DATA FROM TIMER (DATA SCAN)    *******
604  02DF 3A 20          IRCDTA: DEC     SCNCNT
605  02E1 26 45                  BNE     IRCEX       ;JMP=NOT TIME TO CHK FOR SCAN DATA (OR SCAN FREQ)
606  02E3 A6 04                  LDA     #$04
607  02E5 B7 20                  STA     SCNCNT      ;RESET SCNCNT (WILL CHK NXT SCAN IN 4 INTRPTS)
608  02E7 0E 2D 3F                BRSET   7,XMTFLG,IRCFRQ ;JMP=DOING FREQUENCY SCAN (PEN SWITCH INFO)
609  02EA B6 08                  LDA     TCREG       ;GET TIMER DATA
610  02EC 0F 09 03                BRCLR   7,TCREG,IRCD1 ;JMP=NO TIMER OVERFLOW
611  02EF 1F 09                  BCLR    7,TCREG     ;CLR OVRFLW BIT
612  02F1 4F                     CLRA                ;SET DATA TO 0
613  02F2 BE 21          IRCD1:  LDX     TDTMP
614  02F4 E7 10                  STA     TDBUF,X     ;SAVE IN TIMER DATA BUFFER
615  02F6 5A                     DECX                ;DECR TDTMP (PTR)
```

```
616  02F7 2B 10            BMI     IRCD2       ;JMP=DONE W/SCAN OF ALL 16 DATA LINES
617  02F9 EF 21            STX     TDINP       ;SAVE DECR.'D PTR
618  02FB A3 06            CPX     #$06        ;CHK IF JUST FINNISHED "X" SCANS (X6, 1ST 9 LINES)
619  02FD 26 6E            BNE     IRCEXC      ;JMP=NO, SO EXIT
620  02FF B6 0C            LDA     PORTA       ;JUST FINISHED X SCAN, SET RANGE/OFFSET FOR Y SCANS
621  0301 A4 C0            AND     #RORST      ;RESET CURRENT RANGE & OFFSET CNTRL
622  0303 BA 5C            ORA     YRNG        ;SET WITH RANGE/OFFSET FOR Y SCANS
623  0305 B7 00            STA     PORTA
624  0307 20 64            BRA     IRCEXC
625  0309 A6 0F    IRCD2:  LDA     #$0F
626  030B B7 21            STA     TDINP       ;RESET TD IN PTR TO BEG OF TDBUF
627  030D B6 01            LDA     PORTB       ;ROUTINE TO CHK THAT SCANS ARE IN SYNC W/SOFTWARE CNTRS
628  030F A4 07            AND     #$07
629  0311 A1 02            CMP     #$02        ;IN SYNC?
630  0313 27 52            BEQ     IRCEXA      ;JMP=YES, BEGIN IGNORE OF NEXT 8 LINES, THEN DO FREQ SCAN
631  0315 1E 27            BSET    7,EVFLG     ;FLG TO IGNORE SCANS IN 'EVAL' RTN (SINCE THEY ARE INVALID)
632  0317 00 2D 53         BRSET   0,XMTFLG,IRCEXC  ;DON'T PULSE RESET LINE UNTIL XMIT DONE
633  031A 2E FE            BIL     *+0         ;LOOP HERE UNTIL IRQ IS HIGH TO ASSURE PROPER RESET
634  031C 1C 00            BSET    RSTBIZ,PORTA     ;RAISE RESET LINE (TO EXTERNAL COUNTER CHIP)
635  031E B6 29            LDA     BUDTIM      ;SET BAUD RATE CNTR FOR PROPER SYNC W/EXT CNTR
636  0320 B7 2A            STA     BUDCNT
637  0322 1D 00            BCLR    RSTBIZ,PORTA     ;LOWER RESET LINE (BEGIN EXT CNTR)
638  0324 A6 07            LDA     #$07        ;(NOTE-IRQ LINE HIGH WHEN 'RESET' RAISED, SO 1 EXTRA INTRPT)
639  0326 20 43            BRA     IRCEXB      ;SET SCAN CNTR FOR PROPER SYNC W/EXT CNTR
640  0328 80     IRCDEX:   RTI                 ;(INSERTED SO NO INTERMEDIATE JMP NEEDED TO "IRCEX")
641         ;
642         ;
643         ;******* BEGIN CHKS FOR FREQUENCY SCAN (FOR PEN SWITCH INFO) *******
644         ;(ENTERS HERE WHEN "SCNCNT"=0, & "XMTFLG" BIT7=1)
645  0329 0E 01 23 IRCFRQ: BRSET   FRQBIZ,PORTB,IRCF2    ;JMP=NOT 1ST OR LAST TIME THRU(CHK FOR YMAX)
646  032C 3A 5F            DEC     FQSCNT      ;JUST FINNISHED FREQ SCAN?
647  032E 2A 0C            BPL     IRCF1       ;JMP=NO (THIS IS 1ST TIME THRU)
648  0330 A6 09            LDA     #FCSRST     ;DONE W/FREQ SCAN, BEGIN DATA SCAN NEXT TIME
649  0332 B7 5F            STA     FQSCNT      ;RESET FREQ SCAN CNTR
650  0334 1B 09            BCLR    5,TCREG     ;SET TIMER INPUT TO .AND. W/INTERNAL CLOCK (FOR DATA SCAN)
651  0336 1F 2D            BCLR    7,XMTFLG    ;RESET FLAG (FOR DATA SCAN)
652  0338 1F 09            BCLR    7,TCREG     ;RESET TIMER OVERFLOW BIT
653  033A 20 31            BRA     IRCEXC
654  033C 1A 09   IRCF1:   BSET    5,TCREG     ;TDR SET FOR TIMER INPUT ONLY (NOT .AND. W/INT CLOCK)
655  033E 1D 01            BCLR    DATBIZ,PORTB
656  0340 1E 01            BSET    FRQBIZ,PORTB     ;SET SO TIMER INPUT WILL READ FREQUENCY (NOT DATA)
657  0342 0A 01 12         BRSET   GRDBIZ,PORTB,IRCF3    ;JMP=DOING INIT, DON'T ADJUST PORTA
658  0345 B6 00            LDA     PORTA
659  0347 A4 C0            AND     #RORST      ;ADJUST PORTA RANGE & OFFSET BITS FOR "X" DATA SCAN
660  0349 BA 5B            ORA     XRNG        ;(WILL ADJUST IT NOW, EVEN THOUGH ACTUAL DATA SCAN DOESN'T START
661  034B B7 00            STA     PORTA       ;UNTIL 6 MORE LINE TIMES. DONE HERE TO INSURE ENOUGH TIME
662  034D 20 08            BRA     IRCF3       ;TO BRING DC OFFSET BACK DOWN, IN CASE ADJ FOR PREV "Y" SCN)
663  034F 3A 5F   IRCF2:   DEC     FQSCNT      ;DOING FREQ SCAN CHK ON LINES Y0-Y5?
664  0351 26 08            BNE     IRCF4       ;JMP=YES (ACTUALLY,1ST TIME THRU=X6,BUT IS IGNORED)
665  0353 1F 01            BCLR    FRQBIZ,PORTB     ;THIS IS Y6 OF FREQ SCAN, SET PORT FOR DATA SCAN NXT
666  0355 1C 01            BSET    DATBIZ,PORTB     ;(IGNORE Y6 FRQ DATA SINCE IT CAN NEVER BE "MAX" LINE)
667  0357 A6 02   IRCF3:   LDA     #$02        ;SET 'SCNCNT' TO READ TIMER DATA AT A DIFFERENT TIME
668                                            ;('DATA' SCAN DATA VALID 180 DEG DIFFERENT THAN 'FREQ' SCAN)
669  0359 20 10            BRA     IRCEXB      ;SAVE NEW 'SCNCNT, RESET TIMER REG
670  035B E6 24   IRCF4:   LDA     YMAX1       ;GET MAX Y LINE (FND IN 'EVAL' RTN FROM LAST DATA SCN)
671  035D B1 5F            CMP     FQSCNT      ;IS THIS IT?
672  035F 26 0C            BNE     IRCEXC      ;JMP=NO
673  0361 B6 08            LDA     TDREG       ;TIMER REG=FREQ COUNT FROM MAX Y LINE
674  0363 B7 5D            STA     CURFC       ;SAVE AS CURRENT FREQ
675  0365 20 06            BRA     IRCEXC
676         ;
677         ;
678         ;******* EXIT IRQ INTRPT ROUTINE *******
679  0367 1E 2D   IRCEXA:  BSET    7,XMTFLG    ;SET FLAG FOR FREQ (NOT DATA) SCAN
680  0369 A6 20            LDA     #$20        ;IGNORE NEXT 8 LINES
681  036B B7 20   IRCEXB:  STA     SCNCNT      ;SET SCNCNT ($20=IGNORE 8 LINES, $07=RESET SYNC, $02=
682                                            ;CHANGE TIMING 180 DEG FOR DATA/FREQ SCAN.)
683  036D A6 FF   IRCEXC:  LDA     #$FF
684  036F B7 08            STA     TDREG       ;RESET TIMER DATA REG FOR NXT SCAN
685  0371 80     IRCEX:    RTI
686         ;               *********** SPARE TIME PROCESSING *********
687         ;
688         ;CHECK & PROCESS IF ANY SCAN (TIMER) DATA INPUTTED DURRING INTRPT.
689         ;(USE "WAIT" INSTRUCTION TO DECREASE POWER CONSUMPTION)
690         ;***********************************************************************
691  0372 B6 22   SPARE:   LDA     TDOUTP      ;TIMER DATA (OUT) POINTER
692  0374 97              TAX                 ;(SAVE AS OFFSET IN "X")
693  0375 B1 21   SPARE1:  CMP     TDINP       ;DID INT RTN PUT ANY NEW SCAN (TIMER) DATA INTO BUF?
694  0377 26 03            BNE     SPARE2      ;JMP= YES, EVALUATE (SORT) THE LINES
695  0379 8F              WAIT                ;WAIT UNTIL INTERRUPTED (LOW POWER MODE)
696  037A 20 F9            BRA     SPARE1      ;CHK AGAIN FOR SCAN DATA
697  037C AD 02   SPARE2:  BSR     EVAL        ;EVALUATE THE SCAN (TIMER) DATA
698  037E 20 F2            BRA     SPARE
699         ;
700         ;
701         ;
702         ;     *************** EVALUATE THE SCAN (TIMER) DATA ***************
703         ;DETERMINES THE "XMAX" AND "YMAX" LINES BY THE TIMER ("SCAN") DATA INPUTTED
704         ;FOR EACH OF THE 16 MAJOR LINES. (XMAX=PTR TO LINE THAT PEN IS CLOSEST TO IN
705         ;THE 'X' DIRECTION, YMAX= LINE CLOSEST IN THE 'Y' DIR). THE VALUE OF XMAX OR
706         ;YMAX IS ACTUALLY THE RELATIVE (OFFSET) POSITION PTR TO THE TIMER VALUE SAVED
707         ;IN THE 'TDBUF'. ($0F - $07 = X0 - X8, $06 - $00 = Y0 - Y6). IF AFTER THE
708         ;16TH SCAN IS EVALUATED AND A VALID 'XMAX' & 'YMAX' VALUE HAVE BEEN FOUND, THE
709         ;ACTUAL PEN POSITION IS THEN CALCULATED IN THE "CALC" ROUTINE.
710         ;***********************************************************************
711  0380 B6 27   EVAL:    LDA     EVFLG
712  0382 A5 D0            BIT     #(BIT7).OR.(BIT6).OR.(BIT4)   ;CONDITION FND TO STOP EVALUATION?
713  0384 26 29            BNE     EVAL5       ;JMP=YES, IGNORE REMAINDER OF THIS SCAN.
```

```
714  0366 E6 10               LDA    TDBUF,X  ;GET TIMER (SCAN) DATA FOR CURRENT LINE BEING EVALUATED
715  0388 B1 57               CMP    PROXTV   ;PEN SIGNAL WITHIN THE PROXIMITY RANGE OF TIMER VALUES?
716  036A 24 11               BHS    EVAL1    ;JMP=YES, PEN IS IN PROXIMITY
717  036C 04 27 20            BRSET  2,EVFLG,EVAL5 . ;JMP=MAX LINE ALREADY FOUND
718  036F 03 27 1E            BRCLR  1,EVFLG,EVAL5   ;JMP=LAST LINE WAS NOT IN PROX
719  0392 13 27               BCLR   1,EVFLG  ;RESET 'LAST LINE IN PROXIMITY' FLG
720  0394 4D                  TSTA            ;CURRENT LINE VALUE = 0?
721  0395 27 2D               BEQ    EVAL7A   ;JMP=YES,DC OFFSET ADJ TOO HIGH (WILL DECR VIA "EVEX5" RTN)
722  0397 5C                  INCX            ;SET PTR TO VALUE OF PREV LINE
723  0398 01 27 2E            BRCLR  0,EVFLG,EVAL8  ;JMP=LAST LINE NOT X0 OR Y0, SO= VALID MAX LINE
724  039B 20 41               BRA    EVAL10   ;ERROR, PEN OUT OF RANGE (TO LEFT OR BELOW TABLET SURFACE)
725                                           ;(MAY NOT BE ERROR IF PROX IS SET LOW (FOR RNG 1),CHK PROX 1ST)
726  039D B1 5E      EVAL1:   CMP    SATTV    ;PEN SIGNAL SATURATING (ABOVE MAX LEVEL)?
727  039F 24 45               BHS    EVAL11   ;JMP=YES, ADJUST RANGE &/OR DC OFFSET
728                                           ;DROP THRU=PEN IS IN RANGE OF CURRENT LINE
729  03A1 5C                  INCX            ;SET X= PTR TO TIMER DATA OF PREV LINE
730  03A2 04 27 35            BRSET  2,EVFLG,EVAL5   ;JMP=MAX LINE ALREADY FOUND
731  03A5 02 27 09            BRSET  1,EVFLG,EVAL6   ;JMP=LAST LINE EVALUATED WAS IN PROXIMITY ALSO
732  03A8 01 28 02            BRCLR  0,GENFLG,EVAL4  ;JMP=THIS IS NOT 1ST LINE (NOT X0 OR Y0)
733  03AB 10 27               BSET   0,EVFLG  ;SET 'LAST LINE IN PROX & = 1ST LINE' FLAG
734  03AD 12 27      EVAL4:   BSET   1,EVFLG  ;SET 'LAST LINE WAS IN PROXIMITY' FLG
735  03AF 20 66      EVAL5:   BRA    EVEX
736  03B1 E1 10      EVAL6:   CMP    TDBUF,X  ;IS THIS LINE HIGHER THAN LAST (CLOSER TO PEN)?
737  03B3 23 04               BLS    EVAL7    ;JMP=NO,SO LAST LINE IS MAX LINE. CHK IF ITS A VALID MAX
738  03B5 11 27               BCLR   0,EVFLG  ;MAKE SURE 'IN PROX & = 1ST LINE' FLG IS CLEARED
739  03B7 20 5E               BRA    EVEX     ;(MAX LINE NOT FOUND YET, CONTINUE SEARCH)
740  03B9 27 0D      EVAL7:   BEQ    EVAL8    ;JMP=PEN DIRECTLY BETWEEN 2 MAJOR LINES.
741                                           ;(SAVE LAST LINE AS MAX LINE, EVEN THOUGH THIS LINE VALUE IS =)
742  03BB 00 27 20            BRSET  0,EVFLG,EVAL10  ;JMP=LAST LINE NOT VALID MAX SINCE ITS THE 1ST.
743                                           ;(PEN TO LEFT OR BELOW TABLE SURFACE, CHK PROX/RANGE ADJ)
744  03BE 6D 11               TST    TDBUF+1,X  ;IS LINE BEFORE THIS MAX LINE = 0?
745  03C0 26 06               BNE    EVAL8    ;JMP=NO, SO MAX LINE W/VALID SURROUNDING LINES (A&C) FOUND
746  03C2 13 27               BCLR   1,EVFLG  ;RESET "PREV LINE IN PROX" FLG
747  03C4 18 27      EVAL7A:  BSET   4,EVFLG  ;DC OFFSET ADJ TOO HIGH, SET FLG
748  03C6 20 4F               BRA    EVEX     ;(WILL DECR DC OFFSET VIA "EVEX5" RTN)
749  03C8 BF 23      EVAL8:   STX    YMAX     ;SAVE LAST LINE AS THE VALID MAX LINE
750  03CA BF 24               STX    YMAX1    ;SAVE FOR FREQ SCAN CHK (W/O BIT7 FLAG)
751  03CC 14 27               BSET   2,EVFLG  ;SET "MAX LINE FOUND" FLG
752  03CE 00 27 46            BRSET  0,EVFLG,EVEX    ;JMP=PEN DIRECTLY BETWEEN TWO MAX LINES
753  03D1 5C                  INCX
754  03D2 E1 10               CMP    TDBUF,X  ;CHK IF PEN BEFORE OR AFTER THE MAX LINE
755  03D4 24 41               BHS    EVEX     ;JMP=AFTER (CURRENT LINE HIGHER OR = TO LINE BEFORE MAX)
756  03D6 1E 23               BSET   7,YMAX   ;SET FLG FOR PEN BEFORE MAX LINE
757  03D8 20 3D               BRA    EVEX
758  03DA E1 10      EVAL9:   CMP    TDBUF,X  ;CURRENT LINE VALUE LESS THAN THAN PREV?
759  03DC 25 39               BLO    EVEX     ;JMP=YES, OK (DROP THRU TO EVAL10)
760                   ;ENTER @ "EVAL10" W/X0 OR Y0 =MAX, OR SIGNALS VARYING UP/DOWN/UP
761                   ;        (CHECK IF OK TO ADJUST PROX HIGHER TO MASK OFF "GARBAGE" SIGNALS)
762                   ;ENTER @ "EVAL11" = PEN SIGNAL SATURATING, CHECK TO ADJUST RANGE AND/OR OFFSET
763  03DE BE 26      EVAL10:  LDX    EVSCN    ;0 IF DOING X, 1 IF DOING Y SCANS
764  03E0 B6 53               LDA    PROX0    ;CHK IF ERROR, OR IF PROX CAN BE ADJUSTED (TO MASK
765  03E2 B1 57               CMP    PROXTV   ;OFF LOWER "GARBAGE" SIGNALS WHEN MAX IS AT HIGH LEVEL)
766  03E4 26 1C               BNE    EVAL14   ;JMP=PROX NOT AT HIGHER VALUE, ADJUST IT 1ST
767  03E6 BE 26      EVAL11:  LDX    EVSCN    ;0= DOING X SCAN, 1=DOING Y SCAN
768  03E8 E6 5B               LDA    XRNG,X   ;GET RNG/OFFSET SETTING FOR CURENT X OR Y SCAN
769  03EA A5 20               BIT    #RNGBIT  ;AT RANGE1?
770  03EC 27 0E               BEQ    EVAL12   ;JMP=NO, ADJ TO RANGE1 (LESS SENSITIVITY FOR STRONGER SIG)
771  03EE A1 3F               CMP    #(DCOBIT).OR.(RNGBIT)  ;ALREADY AT MAX DC OFFSET IN RANGE1?
772  03F0 27 16               BEQ    EVAL15   ;JMP=YES,ERROR CONDITION
773  03F2 AB 03               ADD    #ADJDCO  ;INCR DC OFFSET TO DECREASE SIGNAL (REMAIN IN RNG 1)
774  03F4 A1 3F               CMP    #(DCOBIT).OR.(RNGBIT)  ;ADJUSTED PAST MAX?
775  03F6 23 06               BLS    EVAL13   ;JMP=NO, SO OK
776  03F8 A6 3F               LDA    #(DCOBIT).OR.(RNGBIT)  ;ADJ TO MAX OFFSET
777  03FA 20 02               BRA    EVAL13
778  03FC E6 5A      EVAL12:  LDA    RNG1     ;ADJUST TO RANGE 1 (W/NOMINAL DC OFFSET)
779  03FE E7 5E      EVAL13:  STA    XRNG,X   ;SAVE AS "X" OR "Y" RNG/OFFSET FOR NXT SCAN
780  0400 E6 54               LDA    PROX1    ;SET PROXIMITY FOR RANGE 1 (LOWER PROX FOR HYSTERISIS)
781  0402 E7 55      EVAL14:  STA    XPROX,X
782  0404 1C 27               BSET   6,EVFLG
783  0406 1E 28               BSET   7,GENFLG ;SET FLAGS FOR PROX,RNG, AND/OR OFFSET ADJUSTED
784  0408 20 0D               BRA    EVEX     ;(TRYING TO CORRECT ERROR, SO DON'T SET ERROR FLG)
785  040A 01 27 06   EVAL15:  BRCLR  0,EVFLG,EVEX0   ;JMP=MAX NOT X0 OR Y0, SO ERROR
786  040D B6 59               LDA    RNG0     ;DROP THRU=ENTERED FROM JMP TO "EVAL10"
787  040F E7 5E               STA    XRNG,X   ;(I.E. PEN OUT OF RANGE TO LEFT OR BELOW TABLET SURFACE)
788  0411 B6 53               LDA    PROX0    ;SET BACK TO RANGE0 AND PROX0
789  0413 E7 55               STA    XPROX,X  ;DROP THRU TO EVEX0
790                  ;
791  0415 1E 27      EVEX0:   BSET   7,EVFLG  ;ERROR CONDITION FOUND, SET FLAG
792                                           ;(IGNORE THE REMAINING LINES OF THIS SCAN)
793  0417 3A 22      EVEX:    DEC    TDOUTP
794  0419 2B 5B               BMI    EVEX6    ;JMP=DONE W/ ALL 16 LINES (JUST FINISHED Y6)
795  041B 11 28               BCLR   0,GENFLG         ;MAKE SURE FLAG FOR 'DOING 1ST LINE' IS RESET
796  041D B6 22               LDA    TDOUTP
797  041F A1 06               CMP    #$06     ;JUST FINISHED 'X' SCAN (DONE W/X8)?
798  0421 26 30               BNE    EVEX4    ;JMP=NO, CONT W/ SCAN EVAL
799  0423 10 28               BSET   0,GENFLG         ;SET FLAG, DOING 1ST LINE (Y0)
800  0425 10 26               BSET   0,EVSCN  ;SET FOR DOING Y SCANS
801  0427 E6 56               LDA    YPROX
802  0429 B7 57               STA    PROXTV   ;SET PROXIMITY CHK FOR Y LINES
803  042B A6 DE               LDA    #SAT0
804  042D 0B 5C 02            BRCLR  RNGBIZ,YRNG,*+5 ;JMP=Y SCANS SET FOR RANGE0
805  0430 A6 F0               LDA    #SAT1    ;SET SAT FOR RANGE1
806  0432 B7 5B               STA    SATTV    ;*** JMP HERE FROM ABOVE ***
807  0434 0E 27 1C            BRSET  7,EVFLG,EVEX4   ;JMP= IGNORE SCAN (SOME ERROR COND FOUND)
808  0437 0C 27 17            BRSET  6,EVFLG,EVEX3   ;JMP= "X" RANGE NEEDS ADJ (STILL CHK "Y" RANGE)
809  043A 04 27 10            BRSET  2,EVFLG,EVEX2   ;JMP=MAX 'X' LINE FOUND (PEN IN RANGE OF X LINES)
810  043D 02 27 0A            BRSET  1,EVFLG,EVEX1   ;JMP=LAST LINE FOUND WAS MAX LINE, SO PEN IS
811                                           ;    TOO FAR TO THE RIGHT OF TABLET SURFACE.
```

```
812  0440 1E 28            BSET    7,GENFLG        ;DROP THRU=NO LINES IN PROX,CHK TO ADJ X RNG/PRX/OFFSET
813  0442 5F                CLRX                    ;CLRX AS PTR TO "XRNG" & "XPROX" IN CASE BRANCH TAKEN TO EVEX5
814  0443 0A 5E CB          BRSET   RNGBIZ,XRNG,EVEX5   ;JMP=X RANGE CURRENTLY AT RANGE1, ADJUST IT
815  0446 1A 27             BSET    5,EVFLG ;"X" SCANS OUT OF PROX (IN RNG0 & NO READABLE PEN SIGNAL)
816  0448 20 09             BRA     EVEX4   ;(PEN OUT OF RANGE)
817  044A 1E 27     EVEX1:  BSET    7,EVFLG ;SET "ERROR CONDITION" FLAG
818  044C 81                RTS
819  044D E6 23     EVEX2:  LDA     YMAX    ;MAX X LINE HAS BEEN FOUND
820  044F B7 25             STA     XMAX    ;SAVE PTR TO XMAX
821  0451 3F 27     EVEX3:  CLR     EVFLG   ;CLEAR (RESET) EVFLG REG FOR Y SCAN
822  0453 81        EVEX4:  RTS             ;RET
823                 ;ENTER HERE=IN RANGE1 & PEN SIGNAL TOO WEAK (OUT OF PROX)
824                 ;CHECK TO ADJUST PROX VALUE, OFFSET, &/OR ADJUST BACK TO RANGE0
825  0454 3F 27     EVEX5:  CLR     EVFLG   ;CLR EVAL FLG FOR NEXT SCAN
826  0456 B6 54             LDA     PROX1   ;MAKE SURE LOWER PROX VALUE (PROX1) IS SET BEFORE ADJUSTING
827  0458 E1 55             CMP     XPROX,X ;THE OFFSET OR RANGE.
828  045A 26 17             BNE     EVEX5B  ;JMP=NOT AT LOWER PROX, SO ADJUST PROX 1ST
829  045C E6 5B             LDA     XRNG,X  ;CHK CURRENT OFFSET
830  045E E1 5A             CMP     RNG1    ;AT NOMINAL RANGE1 OFFSET?
831  0460 27 0B             BEQ     EVEX5A  ;JMP=YES,ADJUST TO RANGE0(ALREADY AT LOWEST OFFSET OF RNG1)
832  0462 A0 02             SUB     #ADJDCC-1   ;LOWER DC OFFSET (LEAVE IN RANGE1)
833  0464 E1 5A             CMP     RNG1    ;ADJUSTED BELOW THE NOMINAL RNG1 OFFSET?
834  0466 24 02             BHS     *+4     ;JMP=NO, SAVE AS NEW OFFSET
835  0468 B6 5A             LDA     RNG1    ;SET TO NOMINAL RNG1 OFFSET
836  046A E7 5B             STA     XRNG,X  ;*** JMP HERE FROM ABOVE ***
837  046C 81                RTS
838  046D B6 59     EVEX5A: LDA     RNG0    ;ADJUST BACK TO RNG0 FROM RNG1
839  046F E7 5B             STA     XRNG,X
840  0471 B6 53             LDA     PROX0   ;ADJUST TO RNG0 PROXIMITY
841  0473 E7 55     EVEX5B: STA     XPROX,X
842  0475 81                RTS
843                 ;ENTER HERE= DONE SCANNING ALL 16 LINES
844  0476 A6 0F     EVEX6:  LDA     #$0F
845  0478 B7 22             STA     TDOUTP  ;WRAP PTR TO BEGINNING OF TD BUFFER
846  047A 10 26             BSET    0,GENFLG        ;SET FLG FOR DOING 1ST LINE NEXT (X0)
847  047C 3F 26             CLR     EVSCN   ;SET FOR DOING X SCAN
848  047E B6 55             LDA     XPROX
849  0480 E7 57             STA     PROXTV  ;SET PROX FOR X SCAN
850  0482 A6 D8             LDA     #SAT0
851  0484 0B 5B 02          BRCLR   RNGBIZ,XRNG,*+5 ;JMP=X RNG SET FOR 0
852  0487 A6 F0             LDA     #SAT1   ;SET SAT VALUE FOR RNGE 1
853  0489 B7 56             STA     SATTV   ;*** JMP HERE FROM ABOVE ***
854  048B 0E 27 1A          BRSET   7,EVFLG,EVEX8   ;JMP=IGNORE SCAN (ERROR CONDITION WAS FOUND)
855  048E 05 27 0B          BRCLR   2,EVFLG,EVEX7   ;JMP=VALID "Y" MAX LINE NOT FOUND
856  0491 0F 28 22          BRCLR   7,GENFLG,CALC   ;JMP=VALID X AND Y MAX LINES FOUND, CALC PEN POS.
857  0494 0A 27 11          BRSET   5,EVFLG,EVEX8   ;JMP="X" LINES WERE OUT OF RNG, SET OUT OF PROX
858  0497 20 13             BRA     EVEX9   ;JMP=YMAX OK, BUT X RANGE NEEDS ADJUSTMENT(NOT OUT OF PROX)
859  0499 0C 27 10  EVEX7:  BRSET   6,EVFLG,EVEX5   ;JMP="Y" RANGE ADJUSTED ALREADY (TO RNG 1)
860  049C 02 27 09          BRSET   1,EVFLG,EVEX8   ;JMP=LAST LINE WAS MAX (PEN TOO FAR PAST TOP
861                                                 ;Y LINE OF TABLET SURFACE)
862  049F 0B 5C 06          BRCLR   RNGBIZ,YRNG,EVEX8   ;JMP="Y" ALREADY @ RANGE0 (SO OUT OF PROX)
863  04A2 AE 01             LDX     #01     ;SET X=PTR TO "YRNG" & "YPROX" FOR CALL TO "EVEX5" ROUTINE
864  04A4 AD AE             BSR     EVEX5   ;ADJUST Y PROX, OFFSET, AND/OR RANGE FOR MORE SENSITIVITY
865  04A6 20 06             BRA     EVEX10
866  04A8 13 28     EVEX8:  BCLR    1,GENFLG        ;FLGS FOR PEN OUT OF PROX
867  04AA 15 28             BCLR    2,GENFLG
868  04AC 3F 27     EVEX9:  CLR     EVFLG
869  04AE 1F 28     EVEX10: BCLR    7,GENFLG        ;CLEAR FLAGS USED IN "EVAL" ROUTINE
870  04B0 07 28 A0          BRCLR   3,GENFLG,EVEX4  ;JMP=IN TABLET MODE, OR 1ST MOUSE DELTA
871                                                 ;NOT CALC YET (NO VALID DATA TO XMIT)
872  04B3 CC 06 FC          JMP     MOUSE   ;SET 2ND MOUSE DELTA=0, AND XMIT MOUSE DATA (1ST VALID
873                                         ;MOUSE DATA ALREADY DONE & WAITING)
874
875                 ;- BEGIN FILE 'SER03.ASM' -
876                 ;************ CALCULATE BINARY X/Y PEN POSITION (LSB & MSB) **************
877                 ;1792 POINTS ($700) IN 'X' DIRECTION, 1280 POINTS ($500) IN 'Y' DIRECTION
878                 ;CALCULATE POSITION FROM THE 'MAX' LINES FOUND IN PREV 'EVAL' ROUTINE.
879                 ;VALUE FOR LSB (BIT0 THRU BIT7) CALCULATED FROM FOLLOWING FORMULA:
880                 ;                   [(3B + A)/4] - C = D    (DIVISOR)
881                 ;                   A - C = M               (MULTIPLIER)
882                 ;                   [M (PPS/2) ] / D = "VALUE"
883                 ;           WHERE
884                 ;                   PEN IS SOMEWHERE BETWEEN MAJOR LINE "A" AND "B" AND:
885                 ;                           "A" = NEXT LINE CLOSEST TO PEN
886                 ;                           "B" = MAX LINE (LINE CLOSEST TO PEN)
887                 ;                           "C" = REFERENCE LINE
888                 ;                           "PPS" = POINTS PER SEGMENT (BETWEEN MAJOR LINES) = 256
889                 ;                                   (I.E., PPS/2 = 128, OR $80)
890                 ;           IF THE PEN IS BEFORE MAX LINE "B" (PEN IS LEFT IF "X", BELOW IF "Y"),
891                 ;           THEN THE ORDER OF THE LINES IS   A B C   AND
892                 ;                                   LSB = $80 - "VALUE"
893                 ;           IF THE PEN IS AFTER MAX LINE "B" (PEN IS RIGHT IF "X", ABOVE IF "Y"),
894                 ;           THEN THE ORDER OF THE LINES IS   C B A   AND
895                 ;                                   LSB = $80 + "VALUE"
896                 ;THE LSB IS THEN ADJUSTED FOR ERROR BY THE VALUE FROM "LSBTBL"
897                 ;THE MSB VALUE (BIT8 THRU BIT10) IS CALCULATED FROM THE POSITION (LINE NUMBER)
898                 ;OF THE MAX LINE IN EACH DIRECTION (X & Y)
899                 ;EXITS WITH CALCULATED BINARY PEN POSITION SAVED IN 'CURBIN'
900                 ;NOTE: CALL TO 'PSWSTA' DECODES THE PEN SWITCH INFORMATION (INCL PEN DOWN STAT)
901  0051          XYMAX SET  TEMP+5  ;TEMP SAVE 'XMAX' OR 'YMAX' FOR THIS RTN
902                                   ;(BIT6 SET WHEN DOING CALC OF 'YMAX')
903                 ;*****************************************************************************
904  04B6 3F 27     CALC:   CLR     EVFLG
905  04B8 CD 07 E9          JSR     PSWSTA  ;DECODE PEN SWITCH STATUS
906  04BB B6 23             LDA     YMAX    ;PTR (W/FLAGS) TO MAX Y LINE VALUE
907  04BD AA 40             ORA     #BIT6   ;SET B6 TO FLAG 'DOING Y'
908  04BF E7 51     CALC1:  STA     XYMAX   ;SAVE MAX VALUE (X OR Y) CURRENTLY BEING CALC
```

```
909  04C1 3F 4E                  CLR    TEMP+2        ;CLR REG (MSE OF FOLLOWING MULTIPLY)
910  04C3 A4 0F                  AND    #$0F          ;MASK OFF FLAG BITS (PTR ONLY)(NOTE- ACCUM WAS='XYMAX')
911  04C5 AE 10                  ADD    #TDBUF        ;ACCUM=PTR TO MAX POSITION IN THE TD BUFFER
912  04C7 97                     TAX
913  04C8 F6                     LDA    ,X            ;GET MAX LINE VALUE ('B')
914  04C9 48                     LSLA                 ;MULT BY 2 ('2B')
915  04CA 39 4E                  ROL    TEMP+2        ;TEMP+2 =MSB OF MULTIPLY
916  04CC FB                     ADD    ,X            ;ADD 'B' AGAIN (='3B')
917  04CD 24 02                  BCC    CALC3         ;JMP=NO CARRY
918  04CF 3C 4E                  INC    TEMP+2        ;INC MSB REG
919  04D1 B7 4D       CALC3:     STA    TEMP+1        ;LSB REG
920  04D3 0E 51 06               BRSET  7,XYMAX,CALC4 ;JMP=PEN IS POSITIONED BEFORE THE MAX LINE
921  04D6 5A                     DECX                 ;PTR TO NXT LINE CLOSEST TO MAX LINE
922  04D7 F6                     LDA    ,X            ;GET VALUE ( LINE 'A')
923  04D8 5C                     INCX
924  04D9 5C                     INCX                 ;PTR TO REFERENCE LINE ('C')
925  04DA 20 04                  BRA    CALC5
926  04DC 5C        CALC4:      INCX                  ;PTR TO LINE CLOSEST TO MAX
927  04DD F6                     LDA    ,X            ;GET 'A'
928  04DE 5A                     DECX
929  04DF 5A                     DECX                 ;PTR TO 'C'
930  04E0 B7 4F       CALC5:     STA    TEMP+3        ;TEMP+3= 'A' VALUE
931  04E2 BB 4D                  ADD    TEMP+1        ;ADD '3B+A'
932  04E4 24 02                  BCC    CALC6         ;ACCUM=LSB
933  04E6 3C 4E                  INC    TEMP+2        ;TEMP+2=MSB
934  04E8 34 4E       CALC6:     LSR    TEMP+2
935  04EA 46                     RORA                 ;DIV BY 2
936  04EB 34 4E                  LSR    TEMP+2
937  04ED 46                     RORA                 ;DIV BY 4 (3B+A/4). NOTE THAT 'TEMP+2' IS LEFT CLEARED
938  04EE F0                     SUB    ,X            ;SUBT 'C'
939  04EF B7 4D                  STA    TEMP+1        ;TEMP+1= 'D' =BOTTOM(DIVISOR) OF "VALUE" EQUASION
940  04F1 B6 4F                  LDA    TEMP+3        ;RECALL 'A'
941  04F3 F0                     SUB    ,X            ;A-C = 'M'
942  04F4 98                     CLC
                                                      ;MULT BY PPS/2 ($60)
943  04F5 46                     RORA
944  04F6 36 4E                  ROR    TEMP+2        ;TEMP+2 AND TEMP+3= TOP(DIVIDEND) OF "VALUE" EQUASION
945  04F8 B7 4F                  STA    TEMP+3        ;(TEMP+2=LSB, TEMP+3=MSB)
946  04FA CD 08 06               JSR    DIV8          ;DIVIDE TEMP+3 & TEMP+2 BY TEMP+1
947  04FD 5D                     TSTX                 ;RET W/ 8 BIT QUOTIENT IN REG "X"
948  04FE 2A 02                  BPL    CALC7         ;JMP=NOT OVER 127 (SO OK)
949  0500 AE 80                  LDX    #$80          ;MAKE SURE ITS NOT OVER MAX VALUE (128)
950        ;------ BEGIN: FINAL CALCULATIONS FOR MSB & LSB OF PEN POSITION ------
951  0502 BF 4E       CALC7:     STX    TEMP+2        ;SAVE QUOTIENT ("VALUE" RESULTANT) IN TEMP+2
952  0504 B6 51                  LDA    XYMAX         ;PTR (W/FLAGS) TO MAX LINE BEING CALC
953  0506 A4 0F                  AND    #$0F          ;MASK OFF FLAGS (PTR ONLY)
954  0508 43                     COMA                 ;$F0 THRU $F6 FOR X0-X6, $F9 THRU $FF FOR Y0-Y6
955  0509 AB 06                  ADD    #$06          ;ADJ FOR MSB OF 'Y' LINE ($FF THRU 4= YC THRU Y5, RESPECTIVELY)
956                                                   ;(ONLY $FF IF PEN IS DIRECTLY BETWEEN 0 & 1- WILL BE INCR TO 0)
957                                                   ;(WILL NOT BE '5' (FOR Y6) SINCE LAST LINE CAN'T BE VALID MAX)
958  050B AE 44                  LDX    #CURBIN       ;X=PTR TO ADDRESS TO SAVE MSB OF 'Y' PEN POSITION
959  050D 0C 51 04               BRSET  6,XYMAX,CALC9 ;JMP=DOING 'Y' DATA
960  0510 5C                     INCX
961  0511 5C                     INCX                 ;ADJ PTR TO RAM ADDRESS THAT SAVES MSB OF 'X' PEN POS.
962  0512 AB 09                  ADD    #$09          ;ADJ ACCUM=MSB OF 'X' LINE NUMBER ($FF THRU 7)
963  0514 F7        CALC9:      STA    ,X            ;STORE MSB (X OR Y) OF PEN POSITION IN "CURBIN" LOCATION
964  0515 A6 80                  LDA    #$80          ;PREPARE TO CALC LSB FROM "VALUE" (SAVED IN 'TEMP+2')
965  0517 CD 51 07               BRSET  7,XYMAX,CALC10 ;JMP=PEN BEFORE (IN FRONT OF) MAX LINE
966  051A BB 4E                  ADD    TEMP+2        ;CALC LSB (FOR PEN AFTER MAX LINE)
967  051C 24 05                  BCC    CALC11        ;JMP=NO CARRY, SO MSB IS OK.
968  051E 7C                     INC    ,X            ;INCR MSB IN "CURBIN" (PEN DIRECTLY BETWEEN 2 MAJOR LINES)
969  051F 20 02                  BRA    CALC11
970  0521 B0 4E       CALC10:    SUB    TEMP+2        ;CALC LSB (FOR PEN BEFORE MAX LINE)
971  0523 5C         CALC11:    INCX                 ;PTR TO LSB IN 'CURBIN'
972  0524 20 08                  BRA    CALC12        ;--- DON'T USE TABLE FOR NOW ---
973  0526 9D                     NOP
974  0527 BF 4C                  STX    TEMP
975  0529 97                     TAX
976  052A E6 80                  LDA    LSBTBL,X      ;GET LSB OF PEN POSITION FROM TABLE
977  052C BE 4C                  LDX    TEMP          ;RECALL LOCATION TO SAVE LSB IN "CURBIN"
978  052E F7         CALC12:    STA    ,X            ;SAVE LSB OF PEN POSITION
979  052F B6 25                  LDA    XYMAX
980  0531 0C 51 EB               BRSET  6,XYMAX,CALC1 ;JMP=JUST DID 'Y' POS, NOW DO 'X'
981                                                   ;FALL THRU TO 'MENU' ROUTINE
982        ;       **** CHECK IF IN THE "MENU" AREA OF THE TABLET ****
983        ;DECODE MENU SELECTIONS IF SO (MENU MODE MUST BE ENABLED VIA B6 OF PORTC)
984        ;MENU AREA IS LOCATED NEAR THE TOP LEFT PORTION OF THE TABLET
985        ;****************************************************************
986
987  0534 E6 61       MENU:      LDA    MENCNT
988  0536 03 60 06               BRCLR  1,MENFLG,MEN1A ;JMP=MENU MODE STILL "LOCKED" (DISABLED)
989  0539 03 28 1D               BRCLR  1,GENFLG,MEN1D ;JMP=PEN OUT OF PROX @ PREV SCAN
990  053C 01 52 24               BRCLR  0,STAFLG,MEN3  ;JMP=PEN NOT DOWN (PEN IN RANGE, BUT UP)
991  053F BE 44       MEN1A:     LDX    CURBIN        ;MSB OF "Y" PEN POSITION
992  0541 A3 04                  CPX    #.HIGH.YMLOC
993  0543 25 08                  BLO    MEN1C         ;JMP=PEN IN ACTIVE (NOT MENU) AREA
994  0545 22 09                  BHI    MEN1C         ;JMP=PEN WITHIN "Y" MENU AREA (AT VERY TOP POS)
995  0547 BE 45                  LDX    CURBIN+1      ;LSB OF "Y" PEN POSITION
996  0549 A3 B1                  CPX    #.LOW.YMLOC
997  054B 24 03                  BHS    MEN1C         ;JMP=PEN WITHIN THE TOP "Y" MENU AREA
998  054D CC 06 11   MEN1B:     JMP    ACTIVE        ;JMP=PEN IN THE ACTIVE (NOT MENU) AREA OF TABLET
999  0550 17 28       MEN1C:     BCLR   3,GENFLG      ;IGNORE 1ST MOUSE DELTA (IN CASE CALC AT PREV SCAN)
1000 0552 1A 28                  BSET   5,GENFLG      ;FLG FOR PEN IN MENU AREA
1001 0554 0D 06 3F               BRCLR  6,PORTC+DDR,MEN8 ;JMP=EXT JUMPER SET TO DISABLE MENU MODE
1002 0557 02 28 03               BRSET  1,GENFLG,MEN2 ;JMP=PEN WAS IN PROX @ PREV SCAN
1003 055A 12 28       MEN1D:     BSET   1,GENFLG      ;SET PEN IN PROX FLG (WAIT UNTIL NXT SCAN TO PROCESS,
1004 055C 81                     RTS                  ;TO GUARANTEE VALID PEN SWITCH INFO)
1005 055D 00 52 08   MEN2:      BRSET  0,STAFLG,MEN4 ;JMP=PEN (SW1) DOWN
1006 0560 03 60 33               BRCLR  1,MENFLG,MEN8 ;JMP=MENU MODE STILL "LOCKED" (DISABLED)
```

```
1007  0563 15 60          MEN3:   BCLR    2,MENFLG        ;CLR "CURRENT MENU SELECTION DONE" FLG
1008  0565 11 60                  BCLR    0,MENFLG        ;CLR "IN ENA (UNLOCK) MENU AREA" FLG
1009  0567 81                     RTS
1010  0568 BE 46          MEN4:   LDX     CURBIN+2        ;MSB OF "X" PEN POSITION
1011  056A 26 2D                  BNE     MEN9            ;JMP=MSB NOT 0 (NOT IN MENU LOCATION 0 OR 1)
1012  056C BE 47                  LDX     CURBIN+3        ;LSB OF "X" PEN POSITION
1013  056E A3 50                  CPX     #XMLOC0+XMLEN   ;WITHIN MENU LOCATION 0 (ENA/UNLOCK MENU MODE AREA)?
1014  0570 24 17                  BHS     MEN7            ;JMP=NO
1015  0572 00 60 0B                BRSET  0,MENFLG,MEN5   ;JMP=HERE PREVIOUSLY, CHK TIME-OUT
1016  0575 10 60                  BSET    0,MENFLG        ;SET "IN ENA/UNLOCK MENU AREA" FLG
1017  0577 13 60                  BCLR    1,MENFLG        ;MUST BE DOWN HERE AT LEAST .5 SEC TO ENABLE (UNLOCK) MENU.
1018  0579 15 60                  BCLR    2,MENFLG        ;RESET OTHER MENU MODE FLAGS
1019  057B A6 12                  LDA     #MENTIM         ;SET TIME-OUT FOR APPROX .5 SEC
1020  057D B7 61                  STA     MENCNT
1021  057F 81                     RTS
1022  0580 4D            MEN5:    TSTA                    ;"MENCNT"
1023  0581 27 03                  BEQ     MEN6            ;JMP=TIME-OUT DONE
1024  0583 3A 61                  DEC     MENCNT          ;CONTINUE W/TIME-OUT
1025  0585 81                     RTS
1026  0586 12 60         MEN6:    BSET    1,MENFLG        ;MAKE SURE "MENU MODE ENABLED/UNLOCKED" FLG IS SET
1027  0588 81            MEN6A:   RTS
1028  0589 03 60 0A      MEN7:    BRCLR   1,MENFLG,MEN8   ;JMP=MENU MODE NOT ENABLED, EXIT
1029  058C 11 60                  BCLR    0,MENFLG        ;RESET "IN ENA/UNLOCK MENU AREA"
1030  058E A3 A0                  CPX     #.LOW.XMLOC1    ;IN BLANK AREA BETWEEN MENU LOCATIONS 0 & 1?
1031  0590 25 04                  BLO     MEN8            ;JMP=YES, INVALID MENU AREA
1032  0592 A3 F0                  CPX     #.LOW.XMLOC1+XMLEN   ;PEN IN MENU AREA 1 ("MOUSE")?
1033  0594 25 18                  BLO     MEN10           ;JMP=YES,DECODE MENU SELECTION
1034  0596 3F 60         MEN8:    CLR     MENFLG          ;FORGET ANY PREV MENU MODE ENABLES
1035  0598 81                     RTS
1036  0599 03 60 FA      MEN9:    BRCLR   1,MENFLG,MEN8   ;JMP=MENU MODE DISABLED ("LOCKED")
1037  059C 11 60                  BCLR    0,MENFLG        ;RESET "IN ENABLE MENU LOCATION" (NOT IN MENU AREA 0)
1038  059E A3 01                  CPX     #.HIGH.XMLOC2   ;CHK MSB OF PEN POSITION
1039  05A0 22 F4                  BHI     MEN8            ;JMP=PAST 2ND (FINAL) MENU AREA,SO AT INVALID MENU LOCATION
1040  05A2 BE 47                  LDX     CURBIN+3        ;LSB OF X PEN POSITION
1041  05A4 A3 01                  CPX     #.LOW.XMLOC2    ;BETWEEN MENU LOCATION 1 & 2?
1042  05A6 25 EE                  BLO     MEN8            ;JMP=YES, INVALID
1043  05A8 A3 90                  CPX     #.LOW.XMLOC2+XMLEN   ;IN MENU AREA 2 ("TABLET")?
1044  05AA 24 EA                  BHS     MEN8            ;JMP=NO, INVALID MENU AREA
1045  05AC AB 04                  ADD     #04             ;ADJUST "MENCNT" PTR TO SELECTIONS FOR MENU AREA 2
1046  05AE 04 60 D7      MEN10:   BRSET   2,MENFLG,MEN6A  ;JMP=THIS MENU SELECTION ALREADY DONE
1047  05B1 14 60                  BSET    2,MENFLG
1048  05B3 3C 61                  INC     MENCNT          ;INCR FOR NEXT SELECTION
1049  05B5 46                     LSLA                    ;MULT BY 2 FOR PROPER TABLE OFFSET
1050  05B6 97                     TAX
1051  05B7 DC 05 BA               JMP     MENTBL,X        ;JMP TO MENU SELECTION FROM TABLE
1052                      ;
1053  05BA 20 0E         MENTBL:  BRA     MSEL1A          ;MOUSE MODE @ DEFAULT (JUMPER) SETTINGS
1054  05BC 20 34                  BRA     MSEL2A          ;LO RESOLUTION (50 IF MOUSE, 100 IF TABLET)
1055  05BE 20 38                  BRA     MSEL3A          ;LO BAUD (1200)
1056  05C0 20 3E                  BRA     MSEL4A          ;FORMAT1 (TABLET MODE ONLY)
1057  05C2 20 0C                  BRA     MSEL1B          ;TABLET MODE @ DEFAULT (JUMPER) SETTINGS
1058  05C4 20 2F                  BRA     MSEL2B          ;HI RESOLUTION (100 IF MOUSE, 200 IF TABLET)
1059  05C6 20 34                  BRA     MSEL3B          ;HI BAUD (2400)
1060  05C8 20 3C                  BRA     MSEL4B          ;FORMAT4 (TABLET MODE ONLY)
1061                      ;
1062  05CA B6 06         MSEL1A:  LDA     PORTC+DDR       ;-SELECT MOUSE MODE-
1063  05CC A4 FE                  AND     #.NOT.BIT0
1064  05CE 20 04                  BRA     MSEL1C
1065  05D0 B6 06         MSEL1B:  LDA     PORTC+DDR       ;-SELECT TABLET MODE-
1066  05D2 AA 01                  ORA     #BIT0
1067                      ;-SET TO DEFAULT MODE SETTINGS (AS PER JUMPER SWITCH SELECTIONS TO PORTC)-
1068  05D4 AE 05         MSEL1C:  LDX     #CHR5           ;PRESET FOR 5 CHAR FORMAT
1069  05D6 A5 01                  BIT     #BIT0
1070  05D8 27 0A                  BEQ     MSEL1D          ;JMP=SELECTED FOR MOUSE MODE (5 CHAR FORMAT)
1071  05DA 44                     LSRA
1072  05DB 44                     LSRA                    ;ADJ PORTC JUMPER SETTINGS TO PROPER BIT POSITION IN "MODFLG"
1073  05DC AA 01                  ORA     #BIT0           ;SET FOR TABLET MODE
1074  05DE A5 08                  BIT     #BIT3           ;FORMAT1 OR 4?
1075  05E0 27 02                  BEQ     MSEL1D          ;JMP=FORMAT1 (5 CHAR SEQUENCE)
1076  05E2 AE 0A                  LDX     #CHR10          ;SET FOR FORMAT4 (10 CHAR SEQUENCE)
1077  05E4 B7 62         MSEL1D:  STA     MODFLG          ;SAVE ADJUSTED PORTC AS "MODFLG"
1078  05E6 BF 2C                  STX     CHRFOR          ;SET # OF CHARS IN XMIT SEQ (5 OR 10)
1079  05E8 A6 02         MSEL1E:  LDA     #BUD24          ;PREPARE TO SET 2400 BAUD
1080  05EA 04 62 02                BRSET  2,MODFLG,MSEL1F ;JMP=2400 BAUD SELECTED
1081  05ED A6 04                  LDA     #BUD12          ;SET FOR 1200 BAUD
1082  05EF B7 29         MSEL1F:  STA     BUDTIM
1083  05F1 81                     RTS
1084                      ;
1085  05F2 13 62         MSEL2A:  BCLR    1,MODFLG        ;-SELECT LOW RESOLUTION-
1086  05F4 81                     RTS
1087  05F5 12 62         MSEL2B:  BSET    1,MODFLG        ;-SELECT HIGH RESOLUTION-
1088  05F7 81                     RTS
1089                      ;
1090  05F8 15 62         MSEL3A:  BCLR    2,MODFLG        ;-SELECT LOW BAUD-
1091  05FA 20 EC                  BRA     MSEL1E
1092  05FC 14 62         MSEL3B:  BSET    2,MODFLG        ;-SELECT HIGH BAUD-
1093  05FE 20 E8                  BRA     MSEL1E
1094                      ;
1095  0600 17 62         MSEL4A:  BCLR    3,MODFLG        ;-SELECT FORMAT1 (TABLET MODE ONLY)
1096  0602 A6 05                  LDA     #CHR5           ;(5 CHAR FORMAT)
1097  0604 20 04                  BRA     MSEL4C
1098  0606 16 62         MSEL4B:  BSET    3,MODFLG        ;-SELECT FORMAT4 (TABLET MODE ONLY)
1099  0608 A6 0A                  LDA     #CHR10          ;(10 CHAR FORMAT)
1100  060A 01 62 89      MSEL4C:  BRCLR   0,MODFLG,MEN8   ;JMP=IN MOUSE (NOT TABLET) MODE
1101  060D B7 2C                  STA     CHRFOR          ;SET TO SELECTED 5 OR 10 CHAR XMIT FORMAT
1102  060F 20 85                  BRA     MEN8            ;DONE W/ALL AVAILABLE MENU SELECTIONS
```

```
1104              ; ********** PEN IN THE ACTIVE TABLET AREA **************
1105              ;PREPARE FOR "TABLET" OR "MOUSE" MODE FORMATTING.
1106              ;ENTER HERE WITH A NEW BINARY PEN POSITION JUST CALCULATED IN "CURBIN", AND
1107              ;PREVIOUS PEN POSITION (POSSIBLY ADJUSTED FOR JITTER AVERAGING) IN "PRVBIN".
1108              ;       (+0=Y MSB, +1=Y LSB, +2=X MSB, +3=X LSB)
1109              ;IF THIS IS A 1ST VALID SCAN, OR IF LAST PROCESSED PEN POSITION WAS IN THE
1110              ;MENU (NOT ACTIVE) AREA, THEN THIS RTN WILL SET "CURBIN" = "PRVBIN" AND
1111              ;IGNORE THIS SCAN, SO THAT JITTER AVERAGING CAN BEGIN W/NXT SCAN.
1112              ;ALSO ADJUSTS THE CALCULATED 200 PPI (POINTS PER INCH) FORMAT TO 200 OR 100 IF
1113              ;IN TABLET MODE,  100 OR 50 IF IN MOUSE MODE.
1114              ;*********************************************************************
1115 0611 3F 60   ACTIVE: CLR    MENFLG  ;CLEAR ANY MENU MODE ACTIVITY
1116 0613 AE 03           LDX    #$03
1117 0615 0A 28 03        BRSET  5,GENFLG,ACT1  ;JMP=WAS IN MENU MODE PREVIOUSLY
1118 0618 02 28 0E        BRSET  1,GENFLG,ACT3  ;JMP=PEN IN RANGE @ PREV SCAN ("PRVBIN" OK)
1119 061B AD 14   ACT1:   BSR    ADJPPI         ;ADJUST POINTS PER INCH IF NECESSARY
1120 061D E6 44   ACT2:   LDA    CURBIN,X       ;SAVE CURRENT BINARY POS AS PREV POS.
1121 061F E7 48           STA    PRVBIN,X       ;(NEEDED FOR PROPER DATA AVERAGING & DELTA CALC)
1122 0621 5A              DECX
1123 0622 2A F9           BPL    ACT2           ;SAVE 4 BYTES (2 WORDS, X POSITION & Y POSITION)
1124 0624 12 28           BSET   1,GENFLG       ;SET FLG FOR VALID SCAN DONE (PRVBIN SET CORRECTLY)
1125 0626 1B 28           BCLR   5,GENFLG       ;MAKE SURE MENU MODE FLG IS RESET
1126 0628 81              RTS
1127 0629 AD 06   ACT3:   BSR    ADJPPI         ;ADJUST POINTS PER INCH IF NECESSARY
1128 062B 00 62 17        BRSET  0,MODFLG,TABLET ;JMP=IN TABLET MODE
1129 062E CC 06 FC        JMP    MOUSE
1130              ;
1131              ;
1132 0631 4F      ADJPPI: CLRA                  ;ADJUST POINTS PER INCH (ENTER W/ 200 PPI)
1133 0632 00 62 01        BRSET  0,MODFLG,ADJP1 ;JMP=IN TABLET MODE (PPI=200 OR 100)
1134 0635 4C              INCA                  ;MOUSE MODE PPI=100 OR 50
1135 0636 02 62 08 ADJP1: BRSET  1,MODFLG,ADJP3 ;JMP=SET FOR HIGH RESOLUTION (100 OR 200)
1136 0639 34 44   ADJP2:  LSR    CURBIN
1137 063B 36 45           ROR    CURBIN+1
1138 063D 34 46           LSR    CURBIN+2       ;DIVIDE BINARY PEN POSITIONS (X & Y ) BY 2
1139 063F 36 47           ROR    CURBIN+3
1140 0641 4A      ADJP3:  DECA
1141 0642 2A F5           BPL    ADJP2          ;JMP=DIVIDE BY 2 AGAIN
1142 0644 81      RET1:   RTS
1143              ;********** TABLET MODE- FILTER JITTER & PREPARE DATA FOR XMIT **********
1144              ;ENTER W/"CURBIN"=CURRENT PEN POS, "PRVBIN"=PREV PEN POS, "X" = 03
1145              ;THIS ROUTINE WILL CALL "DELTA" TO CALCULATE CHANGE IN PEN POSITION WITH
1146              ;JITTER AVERAGING (CURRENTLY USING DIV BY 4 FOR AVERAGING)
1147              ;PEN POSITION FOR XMITTING (SAVED ALSO AS THE "NEW" 'PRVBIN') CALC AS FOLLOWS:
1148              ;       PRVBIN +/- DELTA    ("+" IF POSITIVE PEN MOVEMENT, "-" IF NEGATIVE)
1149              ;THIS BINARY PEN POSITION IS THEN ADJUSTED TO KURTA FORMAT 1 OR 4
1150              ;AND SAVED IN "TMPBUF" FOR SUBSEQUENT TRANSMIT VIA "XMIT" ROUTINE
1151              ;*********************************************************************
1152
1153 0645 A6 0A   TABLET: LDA    #DVBY4
1154 0647 E7 4F           STA    TEMP+3         ;PREPARE TO CALCULATE "DELTA" WITH
1155 0649 A6 02           LDA    #MAXC4         ;DIV BY 4 JITTER AVERAGING
1156 064B B7 50           STA    TEMP+4
1157 064D CD 07 65        JSR    DELTA          ;CALC DELTA (RET W/'TEMP'=MSB, 'TEMP+1'=LSB)
1158 0650 E6 48           LDA    PRVBIN,X       ;RECALL LSB OF PRVBIN
1159 0652 0B 60 0C        BRCLR  5,MENFLG,TBLT2 ;JMP="POSITIVE" PEN MOVEMENT, SO ADD TO PRVBIN
1160 0655 B0 4D           SUB    TEMP+1         ;"NEGATIVE" PEN MOVEMENT
1161 0657 E7 3A           STA    TMPBUF,X       ;SUBTRACT LSB OF DELTA FROM PRVBIN (PRVBIN - DELTA)
1162 0659 E7 48           STA    PRVBIN,X       ;SAVE AS LSB OF DATA FOR XMIT & NEW PRVBIN
1163 065B E6 47           LDA    (PRVBIN-1),X
1164 065D B2 4C           SBC    TEMP           ;SUBT MSB OF DELTA
1165 065F 20 0A           BRA    TBLT3
1166 0661 BB 4D   TBLT2:  ADD    TEMP+1         ;POSITIVE PEN MOVEMENT, CALC LSB (PRVBIN + DELTA)
1167 0663 E7 3A           STA    TMPBUF,X
1168 0665 E7 48           STA    PRVBIN,X       ;SAVE LSB AS DATA AND "NEW" PRVBIN
1169 0667 E6 47           LDA    (PRVBIN-1),X
1170 0669 B9 4C           ADC    TEMP           ;ADD MSB OF DELTA
1171 066B E7 39   TBLT3:  STA    (TMPBUF-1),X
1172 066D E7 47           STA    (PRVBIN-1),X   ;SAVE MSB OF DATA
1173 066F 5A              DECX
1174 0670 5A              DECX
1175 0671 2A D2           BPL    TABLET         ;JMP=JUST CALCULATED X, NOW DO Y
1176 0673 0F 60 03        BRCLR  7,MENFLG,TBLT4 ;JMP=PEN POSITION HAS CHANGED, PREPARE TO XMIT
1177 0676 0D 28 CB        BRCLR  6,GENFLG,RET1  ;JMP=NO SWITCH STATUS CHANGE EITHER, FORGET IT!
1178              ;----- ADJUST BINARY POSITION TO TABLET FORMAT1 OR FORMAT4 -----
1179 0679 B6 52   TBLT4:  LDA    STAFLG         ;PEN SWITCH STATUS
1180 067B 06 62 21        BRSET  3,MODFLG,TFORM4 ;JMP=ADJUST TO FORMAT 4 (ASCII BCD)
1181              ;
1182              ;----------- TABLET FORMAT 1 -----------
1183 067E 48      TFORM1:  LSLA
1184 067F 48              LSLA                  ;SET B2=SW1, B3=SW2, B4=SW3
1185 0680 AA 40           ORA    #BIT6          ;SET B6 OF STATUS CHAR (SYNC BIT, FORMAT1)
1186 0682 E7 3E           STA    TMPBUF+4       ;SAVE PEN STATUS
1187 0684 38 3D           LSL    TMPBUF+3       ;ADJUST BINARY POSITION TO "FORMAT1"
1188 0686 39 3C           ROL    TMPBUF+2       ;SET LSB  B0 - B5 = BINARY E0-B5,  B6 & B7=0
1189 0688 38 3D           LSL    TMPBUF+3       ;SET MSB  B0 - B4 = BINARY B6-B10, B5 - B7=0
1190 068A 39 3C           ROL    TMPBUF+2       ;(DO "X" 1ST)
1191 068C 34 3D           LSR    TMPBUF+3
1192 068E 34 3D           LSR    TMPBUF+3
1193 0690 38 3B           LSL    TMPBUF+1       ;(THEN DO "Y")
1194 0692 39 3A           ROL    TMPBUF
1195 0694 38 3B           LSL    TMPBUF+1
1196 0696 39 3A           ROL    TMPBUF
1197 0698 34 3B           LSR    TMPBUF+1
1198 069A 34 3B           LSR    TMPBUF+1
1199 069C CC 07 50        JMP    XMIT           ;XMIT THE DATA IN "TMPBUF". (NOTE:B7 PAR BIT SET VIA "IRQ" RTN)
1200              ;
1201              ;---------------------------------------------------------------
```

```
1202            ;---- ADJUST BINARY PEN POSITION TO TABLET FORMAT 4 (BCD) ----
1203            ;10 CHAR FORMAT: (1)STATUS, (4)BCD FOR "X", (4)BCD FOR "Y", (1)CR
1204            ;                (BCD'S =MSB TO LSB)
1205            ;TEMPORARY (SCRATCH) LOCATIONS USED:
1206   004C     TBPTR  SET  TEMP     ;POINTER TO SAVE FINAL BYTES INTO 'TMPBUF'
1207   004D     CNTR   SET  TEMP+1   ;COUNTS BCD BYTES, PTR TO LSB OF DEC DIV # IN 'DECTBL'
1208   004E     BINLO  SET  TEMP+2   ;HOLD LSB OF BIN POS(X OR Y), DIV/SUB TO GET BCD'S
1209   004F     BINHI  SET  TEMP+3   ;HOLD MSB           "       "      "     "
1210   0050     DECLO  SET  TEMP+4   ;HOLD LSB OF DECIMAL # TO SUBTRACT/DIVIDE FROM 'BINLO'
1211   0051     DECHI  SET  TEMP+5   ;HOLD MSB           "       "     "      "    'BINHI'
1212            ;
1213   069F AA 30    TFORM4: ORA  #$30         ;SET STATUS BYTE TO ASCII '0' - '7'
1214   06A1 AE 43            LDX  #(TMPBUF+5)  ;PTR TO 10TH POSITION IN BUFFER
1215   06A3 F7               STA  ,X           ;SAVE BCD STATUS BYTE FOR XMIT
1216   06A4 5A               DECX              ;SET PTR TO LOCATION TO SAVE NXT BCD
1217   06A5 BF 4C            STX  TBPTR        ;SAVE AS 'TMPBUF' PTR
1218   06A7 AE 3D            LDX  #(TMPBUF+3)  ;PTR TO GET BINARY "X" POSITION FROM TMPBUF
1219   06A9 F6       TFRM41: LDA  ,X
1220   06AA B7 4E            STA  BINLO        ;SAVE LSB OF BINARY PN POS (1ST TIME="X", 2ND="Y")
1221   06AC 5A               DECX
1222   06AD F6               LDA  ,X           ;MSB
1223   06AE B7 4F            STA  BINHI
1224   06B0 AE 03            LDX  #$03
1225   06B2 BF 51            STX  DECHI        ;MSB OF DECIMAL "1000"
1226   06B4 AE 02            LDX  #$02
1227   06B6 BF 4D            STX  CNTR         ;CNTR/PTR FOR BCD'S
1228   06B8 D6 06 F9 TFRM42: LDA  DECTBL,X     ;GET BYTE FROM TABLE
1229   06BB B7 50            STA  DECLO        ;LSB OF DECIMAL "1000", "100", OR "10"
1230   06BD BE 4C            LDX  TBPTR        ;TMPBUF PTR
1231   06BF A6 30            LDA  #$30         ;START BCD AT ASCII "0"
1232   06C1 F7               STA  ,X
1233   06C2 20 03            BRA  TFRM44       ;BEGIN SUBT/DIV
1234   06C4 7C       TFRM43: INC  ,X           ;INCR BCD'S 1000, 100, OR 10 DIGIT TO ASCII '1'-'9'
1235   06C5 B7 4F            STA  BINHI        ;SAVE MSB FROM PREV SUBTRACT
1236   06C7 B6 4E    TFRM44: LDA  BINLO
1237   06C9 B0 50            SUB  DECLO        ;"SUBTRACT" FOR DIV BY 1000, 100, OR 10
1238   06CB B7 4E            STA  BINLO        ;LSB
1239   06CD B6 4F            LDA  BINHI
1240   06CF B2 51            SBC  DECHI        ;MSB
1241   06D1 24 F1            BCC  TFRM43       ;JMP=DIVIDE NOT DONE YET, CONTINUE
1242   06D3 5A               DECX              ;DECR TMPBUF PTR
1243   06D4 E6 4E            LDA  BINLO        ;DROP THRU HERE=LAST DIVIDE WENT TOO FAR
1244   06D6 BE 50            ADD  DECLO        ;ADJUST BINARY LSB BACK TO PREVIOUS VALUE (MSB OK)
1245   06D8 3A 4D            DEC  CNTR         ;JUST FINISHED 3RD BCD (10'S DIGIT)?
1246   06DA 2E 0A            BMI  TFRM45       ;JMP=YES, DO 4TH BCD (1'S)
1247   06DC B7 4E            STA  BINLO        ;SAVE LSB FOR NEXT "DIVIDE"
1248   06DE BF 4C            STX  TBPTR        ;SAVE 'TMPBUF' PTR
1249   06E0 3F 51            CLR  DECHI        ;PREPARE TO SUBT ("DIVIDE BY") NEXT LOWER
1250   06E2 BE 4D            LDX  CNTR         ;DECIMAL NUMBER ("100" OR "10")
1251   06E4 20 D2            BRA  TFRM42
1252   06E6 AA 30    TFRM45: ORA  #$30         ;SET TO ASCII "0" THRU "9" FOR BCD 1'S DIGIT
1253   06E8 F7               STA  ,X           ;SAVE IT
1254   06E9 5A               DECX
1255   06EA A3 3A            CPX  #TMPBUF      ;WAS THIS THE FINAL BCD (1'S DIGIT FOR "Y")?
1256   06EC 27 06            BEQ  TFRM46       ;JMP=YES, PUT IN FINAL "CR" & XMIT
1257   06EE BF 4C            STX  TBPTR        ;SAVE TMPBUF PTR
1258   06F0 AE 3E            LDX  #(TMPBUF+1)  ;PTR TO BINARY "Y" POSITION IN 'TMPBUF'
1259   06F2 20 B5            BRA  TFRM41       ;CALC BCD'S FOR "Y".
1260   06F4 A6 0D    TFRM46: LDA  #$0D         ;ASCII "CAR. RETURN" CODE
1261   06F6 F7               STA  ,X           ;SAVE AS FINAL CHAR OF 10 CHAR SEQUENCE
1262   06F7 20 57            BRA  XMIT         ;XMIT SEQUENCE (NOTE:PARITY B7 SET IN IRQ RTN)
1263            ;
1264   06F9 0A     DECTBL: FCB  10           ;DECIMAL 10
1265   06FA 64             FCB  100          ;DECIMAL 100
1266   06FB E8             FCB  $E8          ;LSB OF DECIMAL 1000=232 (MSB="$3" =768)
1267            ;*************** MOUSE MODE- CHK & FORMAT DATA FOR OUTPUT ****************
1268            ;CALCULATE DELTA X AND DELTA Y FOR XMIT OF 5 CHAR SEQUENCE:
1269            ;     STAT, D1 X, D1 Y, D2 X, D2 Y
1270            ;         STAT=STATUS CHARACTER
1271            ;              B7-B3=10000 ($8X)
1272            ;              B2= LEFT SWITCH (SW1, PEN DOWN)  (0=ENABLED, 1=DISABLED)
1273            ;              B1= MIDDLE SWITCH (SW3)          (0=ENABLED, 1=DISABLED)
1274            ;              B0= RIGHT SWITCH (SW2)           (0=ENABLED, 1=DISABLED)
1275            ;         D1 X = 1ST DELTA X (CHANGE IN X POSITION, -128 TO +127)
1276            ;         D1 Y = 1ST DELTA Y (CHANGE IN Y POSITION, -128 TO +127)
1277            ;         D2 X = 2ND DELTA X (SAME AS "D1 X", ONLY CALC FROM NXT SCAN INFO)
1278            ;         D2 Y = 2ND DELTA Y (SAME AS "D1 Y",   "    "    "    "    "    " )
1279            ;"DELTAS" ARE CALC (WITH JITTER FILTERING/AVERAGING) BY CALL TO "DELTA" ROUTINE
1280            ;(USING "DIV BY 2" FOR JITTER AVERAGING, SINCE PPI ALREADY DIV BY 2 OR 4)
1281            ;THE CHARACTER STRING (5 CHARS) IS CONSIDERED VALID FOR XMIT ONLY IF A CHANGE
1282            ;IS INITIALLY DETECTED IN PEN POSITION OR SWITCH STATUS. THE 1ST DELTA (D1) CHK
1283            ;WILL THEREFORE CONTINUE UNTIL THE PEN IS FOUND TO HAVE CHANGED POS OR STAT. IT
1284            ;WILL THEN SAVE THIS 1ST DELTA X, Y, AND STATUS, AND ALLOW THE "D2" SCAN TO
1285            ;OCCUR. AFTER CALCULATING AND SAVING THE 2ND DELTA X & Y, THE 5 BYTES SAVED
1286            ;IN THE "TMPBUF" ARE VALID AND READY TO BE XMITTED. (NOTE THAT WITH THIS FORMAT
1287            ;THE MAX DELTA PER BYTE IS -128 TO +127, SO THEY MUST ALWAYS BE CHKED AND/OR
1288            ;ADJUSTED TO KEEP THEM IN THIS RANGE).
1289            ;-----------------------------------------------------------------
1290            ;
1291   06FC 07 28 02 MOUSE: BRCLR 3,GENFLG,MOS1 ;JMP=DOING 1ST SET OF DELTAS
1292   06FF AE 01          LDX  #$01         ;PTR TO STORE 2ND SET OF DELTAS IN 'TMPBUF'
1293   0701 BF 51   MOS1:  STX  TEMP+5       ;SAVE "TMPBUF" PTR ('TEMP+5' IS UNUSED BY "DELTA" RTN)
1294   0703 AE 03          LDX  #$03         ;SET "X" TO POINT TO CURBIN/PRVBIN
1295   0705 A6 07   MOS2:  LDA  #DVBY2
1296   0707 B7 4F          STA  TEMP+3       ;PREPARE TO CALL "DELTA" W/ DIV BY 2 JITTER AVERAGING
1297   0709 A6 01          LDA  #MAXC2
1298   070B B7 50          STA  TEMP+4
1299   070D CD 07 65       JSR  DELTA        ;RET W/ "TEMP"=MSB AND "TEMP+1"=LSB OF DELTA (PEN POS CHG)
```

```
1300  0710 E6 4C              LDA     TEMP            ;MSB OF DELTA
1301  0712 26 04              BNE     MOS3            ;JMP=MSB NOT ZERO, SO TOO LARGE. SET TO MAX ALLOWED (127)
1302  0714 B6 4D              LDA     TEMP+1          ;LSB OF DELTA
1303  0716 2A 02              BPL     MOS4            ;JMP=IN RANGE (0-127)
1304  0718 A6 7F       MOS3:  LDA     #$7F            ;SET TO MAX DELTA (127)
1305  071A 3F 4F       MOS4:  CLR     TEMP+3          ;USE TEMP+3 TO ADJUST MSB OF 'PRVBIN'
1306  071C 0B 60 03           BRCLR   5,NEGFLG,MOS5   ;JMP=DELTA IS POSITIVE (PEN MOVEMENT IN + DIR)
1307  071F 3A 4F              DEC     TEMP+3          ;SET TO -1 ($FF) FOR NEGATIVE DELTA MSB ADJUST
1308  0721 40                 NEGA                    ;SET DELTA TO NEGATIVE
1309  0722 BF 50       MOS5:  STX     TEMP+4          ;TEMP SAVE PTR TO 'CURBIN'/'PRVBIN' BUFFER
1310  0724 BE 51              LDX     TEMP+5          ;RECALL 'TMPBUF' PTR
1311  0726 E7 3A              STA     TMPBUF,X        ;SAVE "DELTA" IN TMPBUF FOR XMIT
1312  0728 BE 50              LDX     TEMP+4          ;CURBIN/PRVBIN PTR
1313  072A EB 48              ADD     PRVBIN,X        ;ADD/SUBTR DELTA FROM PREV BINARY POS
1314  072C E7 48              STA     PRVBIN,X        ;SAVE AS NEW PREV BIN (LSB)
1315  072E E6 4F              LDA     TEMP+3          ;'0' IF DELTA IS POS, '-1' IF DELTA IS NEG
1316  0730 E9 47              ADC     (PRVBIN-1),X    ;ADJ MSB IF NEEDED (INCR OR DECR)
1317  0732 E7 47              STA     (PRVBIN-1),X    ;SAVE NEW PRVBIN MSB
1318  0734 3A 51              DEC     TEMP+5          ;PTR TO "TMPBUF"
1319  0736 2E 1E              BMI     XMIT            ;JMP=JUST FINISHED 2ND DELTAS (X & Y), XMIT THE SEQUENCE
1320  0738 5A                 DECX                    ;PTR TO "CURBIN" AND "PRVBIN"
1321  0739 5A                 DECX
1322  073A 2A C9              BPL     MOS2            ;JMP=JUST DID DELTA X, NOW DO DELTA Y.
1323  073C 0F 60 03           BRCLR   7,NEGFLG,MOS6   ;JMP=PEN POSITION CHANGED SINCE LAST TIME
1324  073F CD 28 0D           BRCLR   6,GENFLG,MOS8   ;JMP=NO SWITCH STATUS CHG EITHER, FORGET IT!
1325  0742 16 2E       MOS6:  BSET    3,GENFLG        ;FOUND VALID 1ST DELTAS, SET FLG TO DO 2ND DELTAS NXT
1326  0744 E6 52              LDA     STAFLG          ;RECALL PEN SWITCH STAT
1327  0746 44                 LSRA                    ;SET B0=SW2, B1=SW3
1328  0747 25 02              BCS     MOS7            ;JMP=SW1ENABLED (PEN DOWN)
1329  0749 AA 04              ORA     #BIT2           ;B2=SW1 (DISABLED)
1330  074B A8 83       MOS7:  EOR     #(BIT0).OR.(BIT1).OR.(BIT7)  ;0=ENA, 1=DISA (B7=1)
1331  074D B7 3E              STA     TMPBUF+4        ;SAVE STATUS BYTE TO BE XMIT AFTER 2ND DELTAS ARE CALC
1332                                                  ;(2ND DELTAS CALCULATED FROM NEXT SCAN OF X/Y LINES)
1333  074F 81         MOS8:  RTS
1334                 ;       ***** PREPARE TO TRANSMIT THE OUTPUT SEQUENCE *****
1335                 ;ENTER W/ SEQ TO BE XMIT IN THE 'TMPBUF'. THIS ROUTINE WILL TRANSFER CHARS TO
1336                 ;THE 'XMTBUF', AND WILL SET A FLAG TO XMIT CHARS. (CHARS ARE XMITTED BIT BY BIT
1337         *       ;IN THE INTERRUPT ('IRQ') ROUTINE). NOTE THAT THE TRANSFER TO 'XMTBUF' OCCURS
1338                 ;ONLY AFTER ANY PREVIOUS CHARS HAVE BEEN XMITTED.
1339                 ;*******************************************************************
1340
1341  0750 01 2D 03    XMIT:  BRCLR   0,XMTFLG,XMIT1  ;JMP=XMT NOT IN PROG, OK TO BEGIN NEW XMIT
1342  0753 8F                 WAIT                    ;WAIT UNTIL IRQ INTRPT (LOW POWER MODE)
1343  0754 20 FA              BRA     XMIT            ;LOOP UNTIL PREV XMIT DONE
1344  0756 EE 2C      XMIT1:  LDX     CHRFOR          ;LOAD W/# OF CHARS TO TRANSFER ( 5 OR 10 )
1345  0758 5A                 DECX                    ;ADJUST FOR PTR INTO 'TMPBUF' & 'XMTBUF'
1346  0759 E6 3A      XMIT2:  LDA     TMPBUF,X
1347  075B E7 30              STA     XMTBUF,X        ;TRANSFER DATA TO XMT BUFFER
1348  075D 5A                 DECX
1349  075E 2A F9              BPL     XMIT2           ;DO ALL 5 OR 10 CHARS
1350  0760 10 2D              BSET    0,XMTFLG        ;SET FLAG FOR XMIT (WILL BEGIN XMIT IN PROPER INTRPT)
1351  0762 17 28              BCLR    3,GENFLG        ;CLEAR "DOING 2ND DELTAS" FLG (IN CASE IN MOUSE MODE)
1352  0764 81                 RTS                     ;RET TO SPARE TIME
1353                 ;************ CALCULATE DELTA (PEN POSITION CHANGE) ***************
1354                 ;ACTUAL DELTA(CHANGE OF PEN POSITION) = "CURBIN" - "PRVBIN" (MAY BE POS OR NEG)
1355                 ;ENTER WITH:
1356         *       ;       "PRVBIN"=PREVIOUS BINARY PEN POSITION (X & Y)
1357                 ;       "CURBIN"=CURRENT BINARY PEN POSITION (X & Y)
1358                 ;       "X" REG =PTR TO "X" OR "Y" POSITION IN ABOVE BUFFERS (="3" OR "1")
1359                 ;       "TEMP+3"='DIVIDE BY' FLG (FOR JITTER AVERAGING)
1360                 ;       "TEMP+4"='MAX CARRY' FLG (FOR JITTER AVERAGING)
1361                 ;EXITS WITH:
1362                 ;       "TEMP"  =MSB OF CALCULATED DELTA
1363                 ;       "TEMP+1"=LSB OF CALCULATED DELTA
1364                 ;       "GENFLG", BIT4 = NEG FLG ('1' IF DELTA IS NEG, '0' IF DELTA POS)
1365                 ;       "CURBIN","PRVBIN",& "X" = UNCHANGED
1366                 ;IF THE CALCULATED DELTA IS SMALL, IT IS AVERAGED TO ELIMINATE JITTER BY DIV BY
1367                 ;2,4,8, OR 16. ("DIVIDE BY" DEPENDS UPON THE NOISE IN THE SYSTEM, AND WHICH RTN
1368                 ;IS CALLING THIS. IT IS DETERMINED BEFORE ENTERING HERE BY THE VALUES IN TEMP+3
1369                 ;AND TEMP+4). THEREFORE, THE "CALCULATED" DELTA MAY NOT EQUAL THE "ACTUAL"
1370                 ;DELTA (CURBIN-PRVBIN) FOR SMALL CHANGES, DEPENDING ON THE SELECTED "DIV BY"
1371                 ;CONSTANT, AND RESULTING CARRY. THIS IS SHOWN IN THE FOLLOWING TABLE:
1372
1373                 ;------ACTUAL DELTA (BEFORE DIVIDE) VS. CALCULATED (AVERAGED) DELTA-------
1374                 ;
1375                 ;CARRY FROM \\ DIV BY 16   \\  DIV BY 8   \\  DIV BY 4   \\  DIV BY 2  \\
1376                 ; DIVIDE    \\ACTUAL\ CALC \\ACTUAL\ CALC \\ACTUAL\ CALC \\ACTUAL\ CALC \\
1377                 ;-----------\\------\------\\------\------\\------\------\\------\------\\
1378                 ;     -     \\ 0- 15\   0  \\ 0- 7 \   0  \\ 0- 3 \   0  \\ 0- 1 \   0  \\
1379                 ;     0     \\   16 \   1  \\   8  \   1  \\   4  \   1  \\   2  \   1  \\
1380                 ;     1     \\   17 \   2  \\   9  \   2  \\   5  \   2  \\   3  \   2  \\
1381                 ;     2     \\   18 \   4  \\   10 \   4  \\   6  \   4  \\  4 &UP\4 & UP\\
1382                 ;     3     \\   19 \   8  \\   11 \   8  \\ 7 &UP\7 & UP\\   -  \  -   \\
1383                 ;     4     \\   20 \  16  \\12 &UP\12 &UP\\   -  \  -   \\   -  \  -   \\
1384                 ;     5 &UP \\21 &UP\21 &UP\\  -   \  -   \\   -  \  -   \\   -  \  -   \\
1385                 ;------------------------------------------------------------------
1386                 ;TEMPORARY LOCATIONS USED IN THIS ROUTINE:
1387                 ;
1388  0050           MAXCRY  SET     TEMP+4   ;MAX CARRY FLG ($01 IF DIV BY 2, $02 IF DIV BY 4 )
1389                                           ;                ($03 IF DIV BY 8, $04 IF DIV BY 16)
1390  004F           DIVFLG  SET     TEMP+3   ;"DIV BY" FLG ($07 IF DIV BY 2, $0A IF DIV BY 4 )
1391                                           ;              ($0C IF DIV BY 8, $0E IF DIV BY 16)
1392                                          ;NOTE:ROTATED RIGHT UNTIL CARRY FOR ONE COUNTER, REMAINING
1393                                          ;     BITS USED DIRECTLY AS A 2ND COUNTER DURING THIS ROUTINE.
1394  004E           CARRY   SET     TEMP+2   ;HOLD "CARRY" FROM DIVIDE
1395  004D           LSBDA   SET     TEMP+1   ;LSB OF CALCULATED DELTA
1396  004C           MSBDA   SET     TEMP     ;MSB OF CALCULATED DELTA
1397                 ;********************************************************************
1398  0765 1B 60     DELTA:  BCLR    5,NEGFLG         ;CLR "NEG" FLAG
```

```
1399  0767 3F 4E              CLR     CARRY
1400  0769 E6 44              LDA     CURBIN,X      ;(1ST TIME X=03 FOR "X", 2ND TIME X=01 FOR "Y")
1401  076B E0 48              SUB     PRVBIN,X      ;LSB
1402  076D B7 4D              STA     LSBDA
1403  076F E6 43              LDA     (CURBIN-1),X  ;MSB
1404  0771 E2 47              SBC     (PRVBIN-1),X
1405  0773 2A 0A              BPL     DELT3         ;JMP=CURBIN-PRVBIN IS POSITIVE (PEN MOVED IN + DIRECTION)
1406  0775 1A 60              BSET    5,MENFLG      ;SET "NEG" FLG
1407  0777 30 4D              NEG     LSBDA         ;SET LSB TO A POSITIVE NUMBER
1408  0779 27 03              BEQ     DELT2         ;JMP=LSB IS 0
1409  077B 43                 COMA                  ;ADJ MSB TO POS NUMBER
1410  077C 20 01              BRA     DELT3
1411  077E 40          DELT2: NEGA                  ;ADJ MSB TO POSITIVE #
1412  077F B7 4C       DELT3: STA     MSBDA         ;SAVE MSB OF DELTA
1413  0781 26 35              BNE     DELT9         ;JMP=LARGE DELTA,SO ACTUAL=CALCULATED (NO AVERAGING)
1414  0783 B6 4D              LDA     LSBDA
1415  0785 44          DELT4: LSRA                  ;DIV BY 2 (OR 4/8/16) FOR JITTER AVERAGING
1416  0786 36 4E              ROR     CARRY         ;SAVE CARRY FROM DIVIDE
1417  0788 34 4F              LSR     DIVFLG        ;DIV AGAIN?
1418  078A 24 F9              BCC     DELT4         ;JMP=YES
1419  078C A1 01              CMP     #$01          ;CHK "DIVIDED" DELTA
1420  078E 24 0B              BHS     DELT5         ;JMP=DIVIDED DELTA IS NOT "0"
1421  0790 1B 60              BCLR    5,MENFLG      ;DIV DELTA=0, MAKE SURE "NEGATIVE" FLG IS RESET
1422  0792 0D 60 02           BRCLR   6,MENFLG,DELT4A ;JMP=THIS IS 1ST DELTA FOUND = 0 (X OR Y)
1423  0795 1E 60              BSET    7,MENFLG      ;BOTH X&Y DELTAS ARE 0, SET FLG
1424  0797 1C 60       DELT4A: BSET   6,MENFLG      ;SET 1ST ZERO DELTA FLG
1425  0799 20 1E              BRA     DELT8
1426  079B 22 1B       DELT5: BHI     DELT9         ;JMP=2 OR GREATER, ACTUAL=CALCULATED (NO AVERAGING)
1427  079D B6 4E              LDA     CARRY         ;DROP THRU= 1 ½ DIVIDED DELTA ≤ 2, DO AVERAGING CHECK
1428  079F 44                 LSRA
1429  07A0 44                 LSRA
1430  07A1 44                 LSRA
1431  07A2 44         DELT6: LSRA                   ;SHIFT CARRY BIT(S) TO LOWEST ORDER LOCATIONS
1432  07A3 3A 4F              DEC     DIVFLG        ;(TOTAL OF 7 SHIFTS=DIV BY 2, 6=DVBY4, 5=DVBY8, 4=DVBY16)
1433  07A5 2A FE              BPL     DELT6
1434  07A7 E1 50              CMP     MAXCRY        ;CARRY ≤ MAX ALLOWED FOR SEL DIVIDE?(AS SHOWN IN ABOVE TBL)
1435  07A9 22 0D              BHI     DELT9         ;JMP=YES, SO ACTUAL=CALCULATED (NO AVERAGING)
1436  07AB B7 4E              STA     CARRY         ;SAVE SHIFTED CARRY COUNT
1437  07AD A6 01              LDA     #BIT0         ;BEGIN CALC OF "AVERAGED" DELTA
1438  07AF 3A 4E       DELT7: DEC     CARRY
1439  07B1 2B 03              BMI     DELT8         ;JMP=DONE (ACCUM=AVERAGED DELTA)
1440  07B3 48                 LSLA                  ;ADJUST DELTA AS PER CARRY (SHOWN IN ABOVE TABLE)
1441  07B4 20 F9              BRA     DELT7
1442  07B6 B7 4D       DELT8: STA     LSBDA         ;SAVE CALCULATED (AVERAGED) DELTA
1443  07B8 81         DELT9: RTS
1444
1445                  ; ******** DECODE THE PEN SWITCH STATUS ******
1446                  ;INFO FOR THE STATUS OF THE PEN SWITCHES (PEN DOWN, AND 2 SIDE SWITCHES) IS
1447                  ;PROVIDED BY THE FREQ OF THE PEN SIGNAL. THIS FREQUENCY IS READ FROM THE MAX
1448                  ;'Y' LINE DURING THE INTRPT (IRQ) ROUTINE. IT IS DECODED HERE, WITH THE
1449                  ;APPROPRIATE BITS IN "STAFLG" THEN SET TO INDICATE THE CURRENT PEN SWITCH STAT.
1450                  ;NOTE: IF PEN IS ATTACHED, THEN PEN SWITCH STAT IS AVAILABLE FROM PORTD, BC-2.
1451                  ;************************************************************************
1452  07B9 06 28 49   PSWSTA: BRSET  3,GENFLG,PSWEX1 ;JMP=DOING 2ND MOUSE DELTAS,DON'T UPDATE STA
1453  07BC 0F 06 06           BRCLR  7,PORTC+DDR,PSW0 ;JMP=PEN IS DETACHED (DECODE FREQ)
1454  07BF B6 03              LDA    PORTD         ;PEN IS ATTACHED, GET PEN SWITCH STATUS FROM PORTD
1455  07C1 A4 07              AND    #(BIT0).OR.(BIT1).OR.(BIT2)
1456  07C3 20 35              BRA    PSWEX
1457                  ;
1458  07C5 03 2E 3E   PSW0: BRCLR   1,GENFLG,PSWEX1 ;JMP=1ST TIME IN PROX,"CURFQ" NOT VALID
1459  07C8 B6 5D              LDA    CURFQ
1460  07CA 97                 TAX                  ;SAVE CURRENT FREQ (FROM MAX "Y" LINE) IN "X"
1461  07CB 05 2E CB           BRCLR  2,GENFLG,PSW3 ;JMP=THIS IS THE 2ND TIME IN PROX, CALC SW STATUS
1462  07CE B0 5E              SUB    PRVFQ         ;CHK IF FREQUENCY IS STABLE
1463  07D0 2A 01              BPL    PSW1          ;JMP=CURRENT FREQ - PREV FREQ IS "POS"
1464  07D2 40                 NEGA                 ;ADJUST FOR NEGATIVE NUMBER
1465  07D3 44         PSW1: LSRA                   ;DIV BY 2 (TO DISCOUNT FREQ JITTER)
1466  07D4 27 07              BEQ    PSW4          ;JMP=NO CHG IN FREQ, SO THIS IS VALID SWITCH INFO
1467  07D6 BF 5E              STX    PRVFQ         ;FREQ IS CHANGING(SKEWING), WAIT FOR IT TO STABILIZE
1468  07D8 81                 RTS
1469  07D9 BF 5E       PSW3: STX    PRVFQ         ;SAVE CURFQ AS PRVFQ
1470  07DB 14 2E              BSET   2,GENFLG      ;SET FLG, 2ND TIME (OR MORE) IN PROX
1471  07DD 4F         PSW4: CLRA                   ;PREPARE TO DECODE THE PEN SWITCH STATUS
1472  07DE A3 E9              CPX    #CNTSNO
1473  07E0 24 18              BHS    PSWEX         ;JMP=NO PEN SWITCHES DOWN (ALL OFF)
1474  07E2 A3 E1              CPX    #CNTS2
1475  07E4 24 12              BHS    PSW7          ;JMP=SW2 DOWN
1476  07E6 A3 D9              CPX    #CNTS3
1477  07E8 24 0A              BHS    PSW6          ;JMP=SW3 DOWN
1478  07EA AA 01              ORA    #BIT0         ;-SET BIT, SW1 (PEN) DOWN-
1479  07EC A3 CF              CPX    #CNTS1
1480  07EE 24 0A              BHS    PSWEX         ;JMP=SW1 (PEN) DOWN ONLY
1481  07F0 A3 C9              CPX    #CNTS12
1482  07F2 24 04              BHS    PSW7          ;JMP=SW1 & SW2 DOWN
1483  07F4 AA 04       PSW6: ORA    #BIT2         ;-SET BIT, SW3-
1484  07F6 20 02              BRA    PSWEX
1485  07F8 AA 02       PSW7: ORA    #BIT1         ;-SET BIT, SW2-
1486                  ;
1487  07FA 1B 2E      PSWEX: BCLR   6,GENFLG      ;CLR "PEN SWITCH STATUS CHKED" FLG
1488  07FC 97                 TAX
1489  07FD B8 52              EOR    STAFLG        ;HAS SWITCH STATUS CHANGED SINCE PREV SCAN?
1490  07FF 27 04              BEQ    PSWEX1        ;JMP=NO
1491  0801 BF 52              STX    STAFLG        ;SAVE NEW STATUS
1492  0803 1C 2E              BSET   6,GENFLG      ;SET "STATUS CHANGED" FLG
1493  0805 81         PSWEX1: RTS
1494
1495                  ;******** DIVIDE 16 BITS BY 8 BITS, RETURN WITH 8 BIT QUOTIENT **********
1496                  ;NOTE: ROUTINE WORKS ONLY IF QUOTIENT IS GUARANTEED LESS THAN 256 ($100)
1497                  ;       IN THIS PROGRAM, THE QUOTIENT IS ALWAYS ≤ 128 ($80 OR LESS)
```

```
1498  004C              DIVSLO   SET    TEMP+0    ;USES THIS LOCATION TO SHIFT "DIVISOR" INTO
1499  004D              DIVSOR   SET    TEMP+1    ;ENTER W/ 8 BIT DIVISOR IN 'TEMP+1'
1500  004E              LSB      SET    TEMP+2    ;ENTER W/ LEAST SIGNIFICANT BYTE OF DIVIDEND IN 'TEMP+2'
1501  004F              MSB      SET    TEMP+3    ;ENTER W/ MSB OF DIVIDEND IN 'TEMP+3'
1502  0050              CNT      SET    TEMP+4    ;USES THIS LOCATION AS A BIT COUNTER REG
1503                             ;EXIT ROUTINE WITH QUOTIENT IN REG "X". SETS X=255 IF DIVISOR IS 0.
1504                             ;************************************************************
1505  0806 A6 0A        DIV8:    LDA    #$0A
1506  0808 E7 50                 STA    CNT       ;BIT COUNTER
1507  080A E6 4D                 LDA    DIVSOR
1508  080C 26 03                 BNE    DIV81     ;JMP=DIVISOR NOT 0
1509  080E AE FF                 LDX    #$FF      ;SET TO 255 (ERROR)
1510  0810 81                    RTS
1511  0811 2B 05        DIV81:   BMI    DIV82     ;JMP=SIGNIFICANT DIVISOR BIT FOUND
1512  0813 3C 50                 INC    CNT       ;INC BIT COUNTER
1513  0815 49                    ROLA             ;SEARCH FOR MOST SIGNIFICANT DIVISOR BIT
1514  0816 20 F9                 BRA    DIV81
1515  0818 B7 4D        DIV82:   STA    DIVSOR    ;SAVE DIVISOR (IF DIVISOR BIT7 WASN'T SET (DIVISOR
1516                                              ;IS < $80), THEN THIS VALUE IS ROTATED SUCH THAT B7=SET
1517  081A 3F 4C                 CLR    DIVSLO    ;CLEAR REG TO SHIFT DIVISOR INTO
1518  081C 5F                    CLRX             ;CLEAR 'QUOTIENT' REG
1519  081D E6 4E        DIV83:   LDA    LSB       ;GET DIVIDEND
1520  081F B0 4C                 SUB    DIVSLO    ;SUBTRACT CURRENT DIVISOR
1521  0821 B7 4E                 STA    LSB
1522  0823 E6 4F                 LDA    MSB
1523  0825 E2 4D                 SBC    DIVSOR    ;(DO LSB, THEN MSB)
1524  0827 24 09                 BCC    DIV84     ;JMP=THIS DIVISOR VALUE DIVIDES INTO THE REMAINING DIVIDEND
1525  0829 B6 4E                 LDA    LSB       ;DIVISOR WILL NOT DIVIDE INTO DIVIDEND
1526  082B BB 4C                 ADD    DIVSLO    ;SET LSB BACK TO PREV VALUE
1527  082D B7 4E                 STA    LSB       ;(MSB NOT SAVED YET, SO IT'S OK)
1528  082F 58                    LSLX             ;SHIFT "0" BIT INTO QUOTIENT
1529  0830 20 04                 BRA    DIV85
1530  0832 B7 4F        DIV84:   STA    MSB       ;SAVE NEW MSB (AFTER SUBTRACT)
1531  0834 99                    SEC
1532  0835 59                    ROLX             ;SHIFT "1" BIT INTO QUOTIENT
1533  0836 49           DIV85:   ROLA             ;THIS SAVES BIT7 OF QUOTIENT FOR WHEN DONE. NOT NEEDED
1534                                              ;FOR THIS PROGRAM, SINCE B7 SHOULD ALWAYS BE 0, BUT DONE IN CASE
1535                                              ;THIS SUBRTN IS EVER CALLED TO CALC A COMPLETE 8 BIT QUOTIENT.
1536  0837 34 4D                 LSR    DIVSOR    ;SHIFT DIVISOR TO CHK NEXT LEAST SIG BIT FOR DIVIDE
1537  0839 36 4C                 ROR    DIVSLO
1538  083B 3A 50                 DEC    CNT
1539  083D 26 DE                 BNE    DIV83     ;JMP=NOT DONE
1540  083F 44                    LSRA             ;LAST DIVIDE (SUBTRACT) WAS FOR "ROUND" BIT. ADJUST BACK TO
1541  0840 56                    RORX             ;PROPER QUOTIENT
1542  0841 24 01                 BCC    DIV86     ;JMP=BELOW MID POINT, DON'T INCR QUOTIENT
1543  0843 5C                    INCX             ;ADJ QUOTIENT TO NXT LARGER INTEGER ("ROUND" UP)
1544  0844 81           DIV86:   RTS
1545  0845                       END

ASSEMBLER ERRORS       0
ASSEMBLER WARNINGS     0

CROSS REFERENCE

LABEL      VALUE     REFERENCE
ACT1       061D      1117 -1119
ACT2       061E      -1120 1123
ACT3       0625      1118 -1127
ACTIVE     0611      999 -1115
ADJDCC     0003      -207  773  832
ADJF1      0636      1133 -1135
ADJF2      0639      -1136 1141
ADJF3      0641      1135 -1140
ADJPF1     0631      1119 1127 -1132
BINHI      004F      -1209 1223 1235 1239 1243 1247
BINLO      004E      -1208 1220 1236 1238 1243 1247
BIT0       0001      -200  1063 1066 1069 1073 1330 1437 1455
                     1478
BIT1       0002      -209  592  1330 1455 1465
BIT2       0004      -210  1329 1455 1483
BIT3       0008      -211  1074
BIT4       0010      -212  260  712
BIT5       0020      -213  235  245
BIT6       0040      -214  225  247  712  907  1185
BIT7       0080      -215  233  712  1330
BITCNT     002B      -136  389  563  572  579  594
BUD12      0004      -216  1081
BUD24      0002      -217  1079
BUDCNT     002A      -135  390  558  561  636
BUDTIM     0029      -133  560  635  1082
CALC       04B6      856  -904
CALC1      04BF      -908  980
CALC10     0521      965  -970
CALC11     0523      967  969  -971
CALC12     052E      972  -978
CALC3      04D1      917  -919
CALC4      04DC      920  -926
CALC5      04E0      925  -930
CALC6      04E8      932  -934
CALC7      05C2      948  -951
CALC9      0514      959  -963
CARRY      004E      -1394 1399 1416 1427 1436 1438
CHR10      000A      -219  1076 1095
CHR5       0005      -218  1068 1096
```

| | | | | | | | | |
|---|---|---|---|---|---|---|---|---|
| CHRFCR | 002C | -138 | 586 | 1078 | 1101 | 1344 | | |
| CM | 0050 | -1502 | 1506 | 1512 | 1538 | | | |
| CMR | 004D | -1207 | 1227 | 1245 | 1250 | | | |
| CNTS1 | 00CF | -223 | 1479 | | | | | |
| CNTS12 | 00C9 | -224 | 1481 | | | | | |
| CNTS2 | 00D1 | -221 | 1474 | | | | | |
| CNTS3 | 00D5 | -222 | 1476 | | | | | |
| CNTSNO | 00E9 | -220 | 1472 | | | | | |
| CURBIN | 0044 | -151 | 956 | 991 | 995 | 1010 | 1012 | 1040 | 1120 |
| | | 1136 | 1137 | 1138 | 1139 | 1400 | 1403 | | |
| CURFC | 005D | -177 | 674 | 1459 | | | | |
| DATEI1 | 0040 | -225 | 377 | | | | | |
| DATEI2 | 0006 | -226 | 655 | 666 | | | | |
| DCGBIT | 001F | -227 | 460 | 462 | 461 | 466 | 502 | 771 | 774 |
| | | 776 | | | | | | | |
| DDR | 0004 | -48 | 380 | 382 | 383 | 385 | 1001 | 1062 |
| | | 1065 | 1453 | | | | | |
| DECHI | 0051 | -1211 | 1225 | 1240 | 1249 | | | |
| DECLC | 0050 | -1210 | 1229 | 1237 | 1244 | | | |
| DECTBL | 06F9 | 1228 | -1264 | | | | | |
| DELT2 | 077D | 1408 | -1411 | | | | | |
| DELT3 | 077F | 1405 | 1410 | -1412 | | | | |
| DELT4 | 0785 | -1415 | 1418 | | | | | |
| DELT4A | 0797 | 1422 | -1424 | | | | | |
| DELT5 | 079B | 1420 | -1428 | | | | | |
| DELT6 | 07A2 | -1431 | 1433 | | | | | |
| DELT7 | 07AF | -1438 | 1441 | | | | | |
| DELT8 | 07B6 | 1425 | 1439 | -1442 | | | | |
| DELT9 | 07B8 | 1413 | 1426 | 1435 | -1443 | | | |
| DELTA | 0765 | 1157 | 1299 | -1398 | | | | |
| DIVE | 0806 | 946 | -1505 | | | | | |
| DIVE1 | 0811 | 1508 | -1511 | 1514 | | | | |
| DIVE2 | 0818 | 1511 | -1515 | | | | | |
| DIVE3 | 081D | -1519 | 1539 | | | | | |
| DIVE4 | 0832 | 1524 | -1530 | | | | | |
| DIVE5 | 0836 | 1529 | -1533 | | | | | |
| DIVE6 | 0844 | 1542 | -1544 | | | | | |
| DIVFLG | 004F | -1390 | 1417 | 1432 | | | | |
| DIVSLO | 004C | -1498 | 1517 | 1520 | 1526 | 1537 | | |
| DIVSOR | 004D | -1499 | 1507 | 1515 | 1523 | 1536 | | |
| DVBY16 | 0008 | -231 | | | | | | |
| DVBY2 | 0007 | -228 | 1295 | | | | | |
| DVBY4 | 000A | -229 | 1153 | | | | | |
| DVBY8 | 000C | -230 | | | | | | |
| EVAL | 0380 | 697 | -711 | | | | | |
| EVAL1 | 039D | 716 | -720 | | | | | |
| EVAL10 | 03DE | 724 | 742 | -763 | | | | |
| EVAL11 | 03E6 | 727 | -767 | | | | | |
| EVAL12 | 03FC | 770 | -778 | | | | | |
| EVAL13 | 03FE | 775 | 777 | -779 | | | | |
| EVAL14 | 0402 | 766 | -781 | | | | | |
| EVAL15 | 040A | 772 | -785 | | | | | |
| EVAL4 | 03AD | 732 | -734 | | | | | |
| EVAL5 | 03AF | 713 | 717 | 718 | -735 | | | |
| EVAL6 | 03B1 | 731 | -736 | | | | | |
| EVAL7 | 03B9 | 737 | -740 | | | | | |
| EVAL7A | 03C4 | 721 | -747 | | | | | |
| EVAL8 | 03CE | 723 | 740 | 745 | -749 | | | |
| EVAL9 | 03DA | 730 | -758 | | | | | |
| EVEX | 0417 | 735 | 739 | 748 | 752 | 755 | 757 | 759 | 784 |
| | | -793 | | | | | | | |
| EVEX0 | 0415 | 785 | -791 | | | | | |
| EVEX1 | 044A | 810 | -817 | | | | | |
| EVEX10 | 04AE | 865 | -869 | | | | | |
| EVEX2 | 044D | 809 | -819 | | | | | |
| EVEX3 | 0451 | 808 | -821 | | | | | |
| EVEX4 | 0453 | 796 | 807 | 816 | -822 | 870 | | |
| EVEX5 | 0454 | 814 | -825 | 864 | | | | |
| EVEX5A | 046D | 831 | -838 | | | | | |
| EVEX5B | 0473 | 828 | -841 | | | | | |
| EVEX6 | 0476 | 794 | -844 | | | | | |
| EVEX7 | 0499 | 855 | -859 | | | | | |
| EVEX8 | 04A8 | 854 | 857 | 860 | 862 | -866 | | |
| EVEX9 | 04AC | 858 | 859 | -868 | | | | |
| EVFLG | 0027 | -95 | 457 | 504 | 631 | 711 | 717 | 718 | 719 |
| | | 723 | 730 | 731 | 733 | 734 | 738 | 742 | 746 |
| | | 747 | 751 | 752 | 782 | 785 | 791 | 807 | 808 |
| | | 809 | 810 | 815 | 817 | 821 | 825 | 854 | 855 |
| | | 857 | 859 | 860 | 868 | 904 | | | |
| EVSCN | 0026 | -94 | 767 | 767 | 800 | 847 | | |
| FCSCN | 005F | -180 | 646 | 649 | 663 | 671 | | |
| FCSRST | 0009 | -232 | 648 | | | | | |
| FRQBIT | 0060 | -233 | | | | | | |
| FRQBI2 | 0007 | -234 | 645 | 656 | 665 | | | |
| GENFLG | 0028 | -117 | 396 | 732 | 783 | 795 | 799 | 812 | 846 |
| | | 856 | 866 | 867 | 869 | 870 | 989 | 999 | 1000 |
| | | 1002 | 1003 | 1117 | 1118 | 1124 | 1125 | 1177 | 1291 |
| | | 1324 | 1325 | 1351 | 1452 | 1458 | 1461 | 1470 | 1487 |
| | | 1492 | | | | | | | |
| GRDBI1 | 0020 | -235 | 377 | | | | | |
| GRDBI2 | 0005 | -236 | 521 | 657 | | | | |
| INIT | 0180 | 279 | -360 | | | | | |
| INIT1 | 0183 | -363 | 364 | 366 | | | | |
| INIT2 | 0189 | -367 | 369 | | | | | |
| INIT3 | 01AC | 383 | -385 | | | | | |

| | | | | | | | | | |
|---|---|---|---|---|---|---|---|---|---|
| INITF | 01D2 | -433 | 444 | 447 | 449 | 452 | 454 | 465 | 469 |
| | | 508 | | | | | | | |
| INP1 | 01E9 | -437 | 439 | | | | | | |
| INP10 | 023B | 479 | 482 | -485 | | | | | |
| INP11 | 0250 | 493 | -495 | | | | | | |
| INP12 | 0252 | 494 | -496 | | | | | | |
| INP13 | 025C | 457 | -501 | | | | | | |
| INP14 | 0266 | 484 | -506 | | | | | | |
| INP15 | 026D | 487 | -509 | | | | | | |
| INP16 | 0279 | 512 | -515 | | | | | | |
| INP17 | 027B | 514 | -516 | | | | | | |
| INP2 | 01F3 | 446 | -450 | | | | | | |
| INP3 | 01FD | 441 | -455 | | | | | | |
| INP4 | 0216 | 461 | -466 | | | | | | |
| INP6 | 021A | 463 | 466 | -468 | | | | | |
| INP7 | 021E | 458 | -470 | | | | | | |
| INP8 | 0220 | -471 | 474 | | | | | | |
| IRC | 028A | 275 | -558 | | | | | | |
| IRC1 | 02A3 | 565 | -570 | | | | | | |
| IRC2 | 02A7 | 564 | -572 | | | | | | |
| IRC3 | 02C1 | 576 | -586 | | | | | | |
| IRC4 | 02C9 | 567 | -590 | | | | | | |
| IRC5 | 02D1 | 569 | -594 | | | | | | |
| IRCD1 | 02F2 | 610 | -613 | | | | | | |
| IRCD2 | 0309 | 616 | -625 | | | | | | |
| IRCDEX | 032E | 605 | -640 | | | | | | |
| IRCDIA | 02DF | 559 | 562 | 571 | 574 | 585 | 589 | 596 | 597 |
| | | 598 | -604 | | | | | | |
| IRCEX | 0371 | 273 | 274 | 278 | -685 | | | | |
| IRCEXA | 0367 | 630 | -679 | | | | | | |
| IRCEXB | 036B | 639 | 669 | -681 | | | | | |
| IRCEXC | 036D | 619 | 624 | 632 | 653 | 672 | 675 | -683 | |
| IRCF1 | 033C | 647 | -654 | | | | | | |
| IRCF2 | 034F | 645 | -663 | | | | | | |
| IRCF3 | 0357 | 657 | 662 | -667 | | | | | |
| IRCF4 | 035B | 664 | -670 | | | | | | |
| IRCFRC | 0329 | 608 | -645 | | | | | | |
| LSE | 004E | -1500 | 1519 | 1521 | 1525 | 1527 | | | |
| LSEDA | 004D | -1395 | 1402 | 1407 | 1414 | 1442 | | | |
| LSESUM | 004C | -428 | 450 | 451 | 472 | 476 | 477 | 491 | 507 |
| | | 510 | | | | | | | |
| LSETBL | 0080 | -289 | 976 | | | | | | |
| MAXC16 | 0004 | -240 | | | | | | | |
| MAXC2 | 0001 | -237 | 1297 | | | | | | |
| MAXC4 | 0002 | -238 | 1155 | | | | | | |
| MAXC8 | 0003 | -239 | | | | | | | |
| MAXCRY | 0050 | -1388 | 1434 | | | | | | |
| MEMORY | M 0000 | 0 | | | | | | | |
| MEN10 | 05AE | 1033 | -1046 | | | | | | |
| MEN1A | 053F | 988 | -991 | | | | | | |
| MEN1B | 054D | 993 | 998 | | | | | | |
| MEN1C | 0550 | 994 | -999 | | | | | | |
| MEN1D | 055A | 989 | -1003 | 997 | | | | | |
| MEN2 | 055D | 1002 | -1005 | | | | | | |
| MEN3 | 0563 | 990 | -1007 | | | | | | |
| MEN4 | 0568 | 1005 | -1010 | | | | | | |
| MEN5 | 0580 | 1015 | -1022 | | | | | | |
| MEN6 | 0586 | 1023 | -1026 | | | | | | |
| MEN6A | 0588 | -1027 | 1046 | | | | | | |
| MEN7 | 0589 | 1014 | -1028 | | | | | | |
| MEN8 | 0596 | 1001 | 1006 | 1028 | 1031 | -1034 | 1036 | 1039 | 1042 |
| | | 1044 | 1100 | 1102 | | | | | |
| MEN9 | 0599 | 1011 | -1036 | | | | | | |
| MENCNT | 0061 | -192 | 987 | 1020 | 1024 | 1048 | | | |
| MENFLG | 0060 | -182 | 988 | 1006 | 1007 | 1008 | 1015 | 1016 | 1017 |
| | | 1018 | 1026 | 1028 | 1029 | 1034 | 1036 | 1037 | 1046 |
| | | 1047 | 1115 | 1159 | 1176 | 1306 | 1323 | 1398 | 1406 |
| | | 1421 | 1422 | 1423 | 1424 | | | | |
| MENTBL | 05BA | 1051 | -1053 | | | | | | |
| MENTIM | 0012 | -241 | 1019 | | | | | | |
| MENU | 0534 | -987 | | | | | | | |
| MODFLG | 0062 | -199 | 598 | 1077 | 1080 | 1085 | 1087 | 1090 | 1092 |
| | | 1095 | 1098 | 1100 | 1128 | 1133 | 1135 | 1180 | |
| MOS1 | 0701 | 1291 | -1293 | | | | | | |
| MOS2 | 0705 | -1295 | 1322 | | | | | | |
| MOS3 | 0718 | 1301 | -1304 | | | | | | |
| MOS4 | 071A | 1303 | -1305 | | | | | | |
| MOS5 | 0722 | 1306 | -1309 | | | | | | |
| MOS6 | 0742 | 1323 | -1325 | | | | | | |
| MOS7 | 074B | 1328 | -1330 | | | | | | |
| MOS8 | 074F | 1324 | -1333 | | | | | | |
| MOUSE | 06FC | 872 | 1129 | -1291 | | | | | |
| MSB | 004F | -1501 | 1522 | 1530 | | | | | |
| MSEDA | 004C | -1396 | 1412 | | | | | | |
| MSESUM | 004D | -427 | 453 | 471 | 506 | | | | |
| MSEL1A | 05CA | 1053 | -1062 | | | | | | |
| MSEL1B | 05D0 | 1057 | -1065 | | | | | | |
| MSEL1C | 05D4 | 386 | 1064 | -1068 | | | | | |
| MSEL1D | 05E4 | 1070 | 1075 | -1077 | | | | | |
| MSEL1E | 05E8 | -1079 | 1091 | 1093 | | | | | |
| MSEL1F | 05EF | 1080 | -1082 | | | | | | |
| MSEL2A | 05F2 | 1054 | -1065 | | | | | | |
| MSEL2B | 05F5 | 1056 | -1067 | | | | | | |
| MSEL3A | 05F8 | 1055 | -1090 | | | | | | |
| MSEL3B | 05FC | 1059 | -1092 | | | | | | |

| | | | | | | | | |
|---|---|---|---|---|---|---|---|---|
| NSEL4A | 060C | 1056 | -1095 | | | | | |
| NSEL4B | 0606 | 1060 | -1098 | | | | | |
| NSEL4C | 060A | 1097 | -1100 | | | | | |
| NARG | 0000 | 0 | | | | | | |
| NOM | 0008 | -242 | 478 | | | | | |
| PCONO | 0050 | -243 | 492 | | | | | |
| PCON1 | 0020 | -244 | 511 | | | | | |
| PORTA | 0000 | -8 | 373 | 375 | 401 | 430 | 434 | 520 | 568 |
| | | 570 | 577 | 590 | 620 | 623 | 634 | 637 | 658 |
| | | 661 | | | | | | | |
| PORTB | 0001 | -15 | 378 | 380 | 521 | 627 | 645 | 655 | 656 |
| | | 657 | 665 | 666 | | | | | |
| PORTC | 0002 | -23 | 381 | 382 | 383 | 1001 | 1062 | 1065 | 1453 |
| PORTD | 0003 | -42 | 385 | 1454 | | | | | |
| PROX0 | 0053 | -158 | 496 | 764 | 788 | 840 | | | |
| PROX1 | 0054 | -159 | 516 | 780 | 826 | | | | |
| PROXTV | 0057 | -164 | 499 | 715 | 765 | 802 | 849 | | |
| PRVEIN | 0048 | -153 | 1121 | 1156 | 1162 | 1163 | 1168 | 1169 | 1172 |
| | | 1313 | 1314 | 1316 | 1317 | 1401 | 1404 | | |
| PRVFC | 005D | -179 | 1462 | 1467 | 1469 | | | | |
| PSW0 | 07C5 | 1453 | ←1458 | | | | | | |
| PSW1 | 07D3 | 1463 | -1465 | | | | | | |
| PSW3 | 07D9 | 1461 | →-1469 | | | | | | |
| PSW4 | 07DD | 1466 | -1471 | | | | | | |
| PSW6 | 07F4 | 1477 | -1483 | | | | | | |
| PSW7 | 07F8 | 1479 | 1482 | -1485 | | | | | |
| PSWEX | 07FA | 1456 | 1473 | 1480 | 1484 | -1487 | | | |
| PSWEX1 | 0805 | 1452 | 1458 | 1490 | -1493 | | | | |
| PSWSIA | 07E9 | 905 | -1452 | | | | | | |
| RDT1 | 064A | -1142 | 1177 | | | | | | |
| RNG0 | 0059 | -167 | 488 | 519 | 766 | 838 | | | |
| RNG1 | 005A | -170 | 509 | 778 | 830 | 833 | 835 | | |
| RNGBIT | 0020 | -245 | 486 | 769 | 771 | 774 | 776 | | |
| RNGBIZ | 0005 | -246 | 487 | 500 | 804 | 814 | 851 | 862 | |
| RORST | 00C0 | -249 | 518 | 621 | 659 | | | | |
| RSTBIT | 0040 | -247 | 372 | | | | | | |
| RSTBIZ | 0006 | -248 | 401 | 634 | 637 | | | | |
| SAT0 | 00DE | -250 | 397 | 803 | 850 | | | | |
| SAT1 | 00F0 | -251 | 605 | 852 | | | | | |
| SATTV | 005B | -165 | 398 | 726 | 806 | 853 | | | |
| SCNCNT | 0020 | -81 | 392 | 604 | 607 | 661 | | | |
| SPARE | 0372 | 522 | -691 | 698 | | | | | |
| SPARE1 | 0375 | -693 | 696 | | | | | | |
| SPARE2 | 037C | 694 | -697 | | | | | | |
| STAFLG | 0052 | -156 | 990 | 1005 | 1179 | 1326 | 1489 | 1491 | |
| TABLET | 0645 | 1128 | -1153 | 1175 | | | | | |
| TBLT2 | 0661 | 1159 | -1166 | | | | | | |
| TBLT3 | 066B | 1165 | -1171 | | | | | | |
| TBLT4 | 0679 | 1176 | -1179 | | | | | | |
| TEPTR | 004C | -1206 | 1217 | 1230 | 1248 | 1257 | | | |
| TCREG | 0009 | -69 | 371 | 610 | 611 | 650 | 652 | 654 | |
| TDBUF | 0010 | -80 | 445 | 614 | 714 | 736 | 744 | 754 | 758 |
| | | 811 | | | | | | | |
| TDINP | 0021 | -84 | 394 | 438 | 613 | 617 | 626 | 693 | |
| TDOUTP | 0022 | -85 | 395 | 435 | 440 | 442 | 456 | 691 | 793 |
| | | 796 | 845 | | | | | | |
| TDREG | 0008 | -51 | 376 | 609 | 673 | 684 | | | |
| TEMP | 004C | -155 | 420 | 423 | 427 | 428 | 901 | 909 | 915 |
| | | 918 | 919 | 930 | 931 | 933 | 934 | 936 | 939 |
| | | 940 | 944 | 945 | 951 | 966 | 970 | 974 | 977 |
| | | 1154 | 1156 | 1160 | 1164 | 1166 | 1170 | 1206 | 1207 |
| | | 1208 | 1209 | 1210 | 1211 | 1293 | 1296 | 1298 | 1300 |
| | | 1302 | 1305 | 1307 | 1309 | 1310 | 1312 | 1315 | 1318 |
| | | 1368 | 1390 | 1394 | 1395 | 1396 | 1498 | 1499 | 1500 |
| | | 1501 | 1502 | | | | | | |
| TFLAG | 004D | -423 | 446 | 448 | 458 | 461 | 468 | 505 | |
| TFORM1 | 067E | -1183 | | | | | | | |
| TFORM4 | 069F | 1180 | -1213 | | | | | | |
| TFRM41 | 06A9 | -1219 | 1259 | | | | | | |
| TFRM42 | 06B8 | -1228 | 1251 | | | | | | |
| TFRM43 | 06C4 | -1234 | 1241 | | | | | | |
| TFRM44 | 06C7 | 1233 | -1236 | | | | | | |
| TFRM45 | 06E6 | 1246 | -1252 | | | | | | |
| TFRM46 | 06F4 | 1256 | -1260 | | | | | | |
| TMPBUF | 003A | -149 | 1161 | 1167 | 1171 | 1186 | 1187 | 1188 | 1189 |
| | | 1190 | 1191 | 1192 | 1193 | 1194 | 1195 | 1196 | 1197 |
| | | 1198 | 1214 | 1218 | 1255 | 1256 | 1311 | 1331 | 1346 |
| TPORTA | 004F | -420 | 431 | 433 | 459 | 464 | 467 | 480 | 483 |
| | | 485 | 487 | 500 | 501 | 503 | 517 | | |
| XMAX | 0025 | -93 | 820 | 979 | | | | | |
| XMIT | 0750 | 1199 | 1262 | 1319 | -1341 | 1343 | | | |
| XMIT1 | 0756 | 1341 | -1344 | | | | | | |
| XMIT2 | 0759 | -1346 | 1349 | | | | | | |
| XMLEN | 0050 | -252 | 1313 | 1032 | 1045 | | | | |
| XMLOCO | 0000 | -253 | ←1013 | | | | | | |
| | | | ←1030 | | | | | | |
| XMLOC1 | 00A0 | -254 | 1035 | 1031 | | | | | |
| XMLOC2 | 0140 | -255 | 1038 | 1041 | 1043 | | | | |
| XMTBUF | 0030 | -147 | 561 | 1347 | | | | | |
| XMTFLG | 002D | -140 | 562 | 583 | 588 | 591 | 593 | 597 | 608 |
| | | 632 | 651 | 679 | 1341 | 1350 | | | |
| XMTPTR | 002F | -145 | 388 | 575 | 580 | 587 | | | |
| XMTREC | 002E | -144 | 560 | 582 | 599 | | | | |
| XPROX | 0055 | -162 | 497 | 721 | 789 | 827 | 841 | 848 | |

| | | | | | | | | | |
|---|---|---|---|---|---|---|---|---|---|
| XRLC | 005B | -173 | 489 | 660 | 768 | 775 | 787 | 814 | 829 |
| | | 836 | 833 | 851 | | | | | |
| XYRAX | 0051 | -901 | 908 | 920 | 952 | 959 | 965 | 980 | |
| YRAX | 0023 | -88 | 749 | 756 | 819 | 906 | | | |
| YRAX1 | 0024 | -92 | 670 | 750 | | | | | |
| YRIDX | 04L1 | -256 | 992 | 996 | | | | | |
| YPHCX | 0056 | -163 | 498 | 801 | | | | | |
| YRNG | 005C | -174 | 490 | 622 | 804 | 862 | | | |

We claim:

1. In a digitizing system including a digitizing tablet with a digitizing surface and grid conductors in the digitizing surface for receiving electrical signals from a signal source, the improvement comprising:
   (a) a cordless pen, having a conductive stylus including a conductive barrel portion and a conductive tip for producing electrical signals such that capacitive coupling between the conductive tip and the grid conductors causes electrical signals to be produced in the grid conductors in response to electrical signals on the conductive tip;
   (b) a tubular conductor disposed coaxially about and spaced from the conductive stylus, the tip of the conductive stylus extending outward beyond an end of the tubular conductor;
   (c) an oscillator circuit inside the cordless pen for producing an AC voltage, and means for applying the AC voltage between the conductive stylus and the tubular conductor, the size of the tubular conductor being sufficiently large that the stray capacitance of the tubular conductor is sufficiently greater than the stray capacitance of the conductive stylus to cause the tubular conductor to be an effective virtual ground in order to enable the electrical signal on the tip of the stylus to be effectively capacitively coupled to the grid conductors; and
   (d) means within the cordless pen for supplying electrical power to the oscillator circuit without physical connection to any external power source.

2. In a digitizing system as recited in claim 1, the improvement comprising a first switch which is activated by pressing the tip of the stylus against the digitizing surface and which is connected to the conductive stylus and to the oscillator circuit, and means responsive to the first switch for increasing the frequency of the AC voltage from a first frequency to a second frequency, and means for discriminating the second frequency to produce a first signal indicative of the state of the first switch, wherein the first signal represents a first command which is a pen down command.

3. In a digitizing system as recited in claim 2, the improvement comprising a first control button on the cordless pen and a second switch responsive to the first control button, and means responsive to the second switch for causing the oscillator circuit to change the frequency of the AC signal to a third frequency, and means for discriminating the third frequency to produce a second signal indicative of the state of the second switch, wherein the second signal represents a second command produced by pressing the first button.

4. In a digitizing system as recited in claim 3, the improvement comprising a second button on the cordless pen and a third switch responsive to the second button, and means responsive to the third switch for causing the oscillator to change the frequency of the AC signal to a fourth frequency, and means for discriminating the fourth frequency to produce a third signal indicative of the state of the third switch and representing a third command produced by pressing the second button.

5. In a digitizing system as recited in claim 1, the improvement comprising a plurality of batteries in said electrical power supplying means.

6. In a digitizing system as recited in claim 5, the improvement comprising a CMOS voltage booster circuit including first and second CMOS inverters, and circuit means connected to the output of the first CMOS inverter for capacitively boosting positive and negative transitions of the output voltage produced by the first CMOS amplifier and applying the boosted signals to the positive and negative power supply terminals, respectively, of the second CMOS inverter to enable the second CMOS inverter to produce boosted positive and negative voltage levels of the AC signal applied to the conductive stylus.

7. In a digitizing system as recited in claim 6, the improvement comprising a voltage regulator including a zener diode, an output transistor, and a feedback resistor connected between the collector and base of the output transistor and also connected to a voltage produced by the batteries, the output transistor, feedback resistor, and zener diode operating to produce a regulated output voltage to supply power to the oscillator circuit, the regulated output voltage being determined by the breakdown voltage of the zener diode, the digitizing circuit further incuding a timeout circuit responsive to the output of the oscillator circuit for producing a power off signal a predetermined amount of time after being reset by actuation of one of said first, second, and third switches, one terminal of the zener diode being connected to the base of the transistor and the other terminal being responsive to the timeout signal to reduce the reverse bias across the zener diode to a level substantially less than its breakdown voltage, to thereby reduce leakage current through the zener diode when the cordless pen is not being used.

8. In a digitizing system as recited in claim 1, the improvement comprising an insulative housing surrounding the tubular conductor to reduce variation in stray capacitance of the tubular conductor due to conductivity of the hand of a person holding the cordless pen.

9. In a digitizing system as recited in claim 1, the improvement comprising means in the digitizing tablet for multiplexing the signals on selected grid conductors to an amplifier input conductor, adjustable gain amplifying means for amplifying the multiplexer signals, analog-to-digital conversion means for converting the amplified signals to digital numbers representative of the amplitude of the corresponding grid conductor signals, and means for automatically adjusting the gains of the gain amplifying means to cause the gain to be in a predetermined range that allows accurate analog-to digital conversion.

10. In a digitizing system as recited in claim 9, the improvement comprising a plurality of spaced minor conductors disposed parallel to and between each pair of the grid conductors, each of the minor conductors being connected to the adjacent minor conductors or grid conductors by a predetermined resistance to cause signals capacitively coupled to the minor conductors to contribute to major grid conductor signals multiplexed to the amplifier input conductor.

11. In a digitizing system as recited in claim 4, the improvement comprising means for determining from the state of one of the second and third switches whether the digitizing system is to operate in a digitizing mode or a mouse mode.

12. In a digitizing system as recited in claim 11, the improvement comprising means responsive to the mode determining means for computing an amount of and direction of change in the coordinates of the cordless pen if the present mode is the mouse mode, means for formatting the computed change in a predetermined mouse mode format and outputting the formatted change to an external buffer if the present mode is the mouse mode, and means for formatting the coordinates of the cordless pen in a predetermined coordinate format and outputting the formatted coordinates to an external buffer if the present mode is the digitizing mode.

13. In a digitizing system as recited in claim 10, the improvement comprising processor means for storing digital numbers representative of the signal levels of the grid conductors, means for selecting location numbers corresponding to the three grid conductors having signal levels A, B, and C, whereas B is the highest signal level, A is the second highest signal level, and C is the third highest signal level, and means for computing an adjustment to the location number of the grid conductor having the greatest signal level B in accordance with the equation $$\frac{A - C}{\frac{3B + A}{4} - C}$$

14. A computer input device comprising:
(a) a digitizing tablet including coordinate producing means for producing digital information representative of the coordinates of an interactive device, such as a pen or cursor, that interacts with the digitizing tablet to enable the coordinate producing means to produce the digital information;
(b) a separate keyboard aparatus including a plurality of depressable keys and adapted to be positioned on the digitizing tablet;
(c) a plurality of interactive means each responsive to a respective one of the keys for interacting with the digitizing tablet when the keyboard apparatus is positioned on the digitizing tablet and that key is depressed to enable the coordinate producing means to produce digital coordinate information representative of the locations of each of the interactive means when the key to which that interactive means is responsive is depressed,
whereby the digitizing tablet and the keyboard apparatus operate together as a computer keyboard, and if the keyboard is removed, the digitizer tablet is used as a digitizer tablet in conjunction with a pen or cursor device to produce digital information representative of the location of the pen or cursor device.

15. A computer input device comprising:
(a) a digitizing tablet including coordinate producing means for producing the coordinates of a signal source in response to a signal produced by the signal source located adjacent to a digitizing surface of the digitizing tablet;
(b) a separate keyboard apparatus including a plurality of depressable keys and adapted to be positioned on the digitizing surface;
(c) a plurality of transmitting means each responsive to a respective one of the keys for each acting as a signal source by transmitting a signal to an adjacent location of the digitizing surface when the keyboard apparatus is positioned on the digitizing surface and that key is depressed, the coordinate producing means producing digital coordinate information representative of the locations of each of the transmitting means when the key to which that transmitting means is responsive is depressed,
whereby the digitizing tablet and the keyboard apparatus together operate as a computer keyboard, and if the keyboard is removed, the digitizer tablet is used as a digitizer tablet in conjunction with a pen or cursor device that functions as the localized signal source.

16. The computer input device of claim 15 wherein the keyboard apparatus includes an oscillator and also includes a plurality of switching means for electrically coupling an output signal produced by the oscillator to each of the individual transmitting means in response to depression of the key to which that transmitting means is responsive.

17. The computer input device of claim 16 wherein the keyboard apparatus includes a ground plane, each of the keys being disposed above the ground plane, each of the transmitting means extending below the ground plane when the key to which that transmitting means is depressed, to thereby enable the digitizing tablet to effectively receive the signal transmitted by that transmitting means and thereby enable the coordinate producing means to produce the coordinates of that transmitting means.

18. The computer input device of claim 17 wherein each of the switching means includes (i) a first conductive plate coupled to the oscillator and functioning as a first plate of a parallel plate capacitor, (ii) a second conductive plate connected to one of the keys and functioning as the other plate of the parallel plate capacitor, (iii) means for electrically coupling the second conductive plate to the transmitting means corresponding to that key, and means for causing the separation between the first and second conductive plates to decrease.

19. The computer input device of claim 18 wherein the digitizing tablet includes first and second orthogonal sets of insulated conductors which act as antennas to receive signals capacitively coupled from the tips of the plungers of depressed keys.

20. The computer input device of claim 19 wherein the ground plane includes a plurality of apertures and each of the individual transmitting means includes a plunger extending through one of the apertures and having a tip which is moved nearly to the digitizing surface when that key is depressed,
the depressing of the corresponding key both increasing coupling of the oscillator signal to the plunger and moving the tip of the plunger close to the digitizing surface, and thereby increasing the level of the signal capactively coupled from the tip of the plunger to the insulated conductors which act as antennas.

21. The computer input device of claim 19 including means for raising each of the plungers upwardly through the corresponding aperture when the key corresponding to that plunger is released.

22. The computer input device of claim 16 including a cordless power source for supplying power to the oscillator, whereby the keyboard apparatus can be removed from the digitizing tablet by lifting it off of the digitizing tablet without disconnecting any electrical connectors.

23. In a digitizing system including a digitizing surface and grid conductors in the digitizing surface for receiving electrical signals from a signal source, the improvement comprising:
(a) a cordless pen, having a conductive stylus including a conductive tip for producing electrical signals to be capacitively coupled between the conductive tip and the grid conductors causes electrical signals to be produced in the grid conductors in response to electrical signals on the conductive tip;
(b) a virtual ground conductor disposed adjacent to and spaced from the conductive stylus;
(c) an oscillator circuit inside the cordless pen for producing an AC voltage, and means for applying the AC voltage between the conductive stylus and the virtual ground conductor, the stray capacitance of the virtual ground conductor being substantially greater than the stray capacitance of the conductive stylus; and
(d) means within the cordless pen for supplying electrical power to the oscillator circuit without physical connection to any external power source, whereby the virtual ground provided by the virtual ground conductor makes it possible for the conductive tip to produce AC signals of sufficient amplitude that the capacitive coupling produces predetermined signal levels in the nearest grid conductor when the conductive tip is near the digitizing surface.

24. A method of digitizing the coordinates of a preselected point on a digitizing surface with grid conductors therein, the method comprising the steps of:
(a) producing an AC signal and applying it between first and second ungrounded conductors by means of an AC signal producing circuit in a pen;
(b) applying the AC signal, by means of the first and second ungrounded conductors, between a conductive stylus in the pen and a virtual ground conductor that has a much larger capacitance than the conductive stylus, the virtual ground conductor also being included in the pen;
(c) positioning the pen so that a conductive tip of the stylus is close to the preselected point of the digitizing surface, and capacitively coupling the AC signal on the conductive tip to the grid conductors near the preselected point; and
(d) measuring the levels of signals capacitively coupled onto the grid conductors from the conductive tip and using the measured signal levels to determinate which grid conductors have the largest signals capacitively coupled thereon, to thereby determine the coordinates of the conductive tip of the pen.

25. The method of claim 24 wherein the pen includes a first switch, the method including the steps of actuating the first switch, changing the frequency produced by the AC signal producing circuit from a first frequency to a second frequency in response to the actuating of the first switch, and decoding the second frequency from a signal capacitively coupled from the conductive tip onto one of the grid conductors to produce a first signal indicative of a command produced by the actuation of the first switch.

26. The method of claim 24 including amplifying the signals capacitively coupled from the conductive tip onto the grid conductors, converting the amplified signals to digital numbers having values representative of the grid conductor signal levels, and using a microprocessor to compare the digital signal values of the grid conductors to a predetermined threshold, and using the microprocessor to automatically adjust the gain of the amplification of the grid conductor signals so that the amplitude of one of the amplified signals exceeds the threshold value, before the converting of the amplified signal levels to the digital numbers.

27. The method of claim 26 including providing a plurality of spaced minor grid conductors in the digitizing surface disposed parallel to and between each pair of the grid conductors and resistively coupling each of the minor conductors to adjacent grid conductors by a predetermined amount of resistance, and coupling signals that are capacitively coupled from the conductive tip of the pen to the minor conductors to the adjacent grid conductors, the method further including using the microprocessor to compute an adjustment to the location of the grid conductor having the greatest signal level in accordance with the equation $$\frac{A - C}{\frac{3B + A}{4} - C}$$

wherein B is a number representative of the highest grid conductor signal level, A is a number representative of the second highest grid conductor signal level, and C is a number representative of the third highest grid conductor signal level.

28. A method of inputting information from a keyboard into a computer, the method comprising the steps of:
(a) pressing a first key of a keyboard;
(b) selectively coupling predetermined AC signal to a first conductive element associated with the first key in response to the depressing of the first key;
(c) capacitively coupling the AC signal from the first conductive element to a predetermined region of a digitizing tablet and more particularly to grid conductors disposed in a surface of the digitizing tablet in order to produce grid conductor signal levels indicative of the closeness of the various grid conductors to the first conductive element;
(d) measuring the levels of the grid conductor signals capacitively coupled thereon from the first conductive element to determine a coordinate of the first conductive element;
(e) transmitting the coordinate to a computer and operating the computer to compare the coordinate with a stored menu to thereby determine the identity of the depressed key; and
(f) repeating steps (a) through (e) for a second key of the keyboard.

29. The method of claim 28 including removing the keyboard from the digitizer tablet and using the digitizer tablet and capacitively coupling signals from a cursor to the grid conductors to digitize a coordinate of the cursor.

30. The method of claim 28 including capacitively coupling signals that identify the type of the keyboard from the keyboard to the grid conductors, decoding those signals and transmitting the decoded results to the computer, and using the decoded results in the computer to select the stored menu.

31. The method of claim 28 including moving the first conductive element closer to the digitizing surface in response to the pressing of the first key.

32. An apparatus for digitizing the coordinates of a point on a digitizing surface with grid conductors therein, the apparatus comprising:
   (a) a pen having a conductive stylus with a conductive tip;
   (b) means in the pen for producing an AC signal and applying it between first and second ungrounded conductors;
   (c) a virtual ground conductor disposed in the pen and having a much larger capacitance than the conductive stylus; and
   (d) means for applying the AC signal, by means of the first and second ungrounded conductors, between the conductive stylus and the virtual ground conductor;
   (e) means for measuring the levels of signals capacitively coupled onto the grid conductors from the conductive tip; and
   (f) means for processing the measured signal levels to determine which grid conductor has the largest signal capacitively coupled thereon, to thereby determine a coordinate of the conductive tip of the pen.

33. The apparatus of claim 32 wherein the pen includes a first switch, means for manually actuating the first switch, means for changing the frequency produced by the AC signal producing means from a first frequency to a second frequency in response to the actuating of the first switch, and means for decoding the second frequency from a signal capacitively coupled from the conductive tip onto one of the grid conductors to produce a first signal indicative of a command produced by the actuation of the first switch.

34. The apparatus of claim 32 including a plurality of batteries contained within the pen and supplying power to the AC signal producing means.

35. An apparatus for digitizing the coordinates of a point on a digitizing surface with a conductive means therein for receiving pen signals capacitively coupled thereto, the apparatus comprising:
   (a) a pen having a conductive stylus with a conductive tip;
   (b) means in the pen for producing an AC signal and applying it between first and second ungrounded conductors;
   (c) a virtual ground conductor disposed in the pen and having a much larger capacitance than the conductive stylus;
   (d) means for applying the AC signal, by means of the first and second ungrounded conductors, between the conductive stylus and the virtual ground conductor;
   (e) means for measuring the levels of signals capacitively coupled to the conductive pen signal receiving means from the conductive tip; and
   (f) means for processing the measured signal levels to determine a coordinate of the conductive tip of the pen.

36. An apparatus for digitizing the coordinates of a point on a digitizing surface with a conductive means therein for receiving transducer signals capacitively coupled thereto, the apparatus comprising:
   (a) a transducer having a conductive member with a conductive end portion;
   (b) means in the transducer for producing an AC signal and applying it between first and second ungrounded conductors;
   (c) a virtual ground conductor disposed in the transducer and having associated therewith a much larger capacitance than the conductive member;
   (d) means for applying the AC signal, by means of the first and second ungrounded conductors, between the conductive member and the virtual ground conductor;
   (e) means for measuring the levels of signals capacitively coupled to the conductive transducer signal receiving means from the conductive end portion; and
   (f) means for processing the measured signal levels to determine a coordinate of the conductive end portion of the transducer.

37. A method of digitizing the coordinates of a preselected point on a digitizing surface with grid conductors therein, the method comprising the steps of:
   (a) producing an AC signal and applying it between first and second ungrounded conductors by means of an AC signal producing circuit in a transducer;
   (b) applying the AC signal, by means of the first and second ungrounded conductors, between a conductive antenna member in the transducer and a virtual ground conductor that has a much larger capacitance than the conductive antenna member, the virtual ground conductor also being included in the transducer;
   (c) positioning the transducer so that a preselected portion of the conductive antenna member is close to the preselected point of the digitizing surface, and capacitively coupling the AC signal on the preselected portion of the conductive antenna member to the grid conductors near the preselected point; and
   (d) measuring the levels of signals capacitively coupled onto the grid conductors from the preselected portion of the conductive antenna member and using the measured signal levels to determinate which grid conductors have the largest signals capacitively coupled thereon, to thereby determine the coordinates of the preselected portion of the conductive antenna member.

38. The method of claim 37 wherein the transducer includes a first switch, the method including the steps of actuating the first switch, changing the frequency produced by the AC signal producing circuit from a first frequency to a second frequency in response to the actuating of the first switch, and decoding the second frequency from a signal capacitively coupled from the preselected portion of the conductive antenna member onto one of the grid conductors to produce a first signal indicative of a command produced by the actuation of the first switch.

* * * * *